United States Patent
Andrushkiw et al.

(10) Patent No.: US 8,265,359 B2
(45) Date of Patent: Sep. 11, 2012

(54) COMPUTER-AIDED CYTOGENETIC METHOD OF CANCER DIAGNOSIS

(75) Inventors: Roman Andrushkiw, Maplewood, NJ (US); Natalya V. Boroday, Kiev (UA); Dmitriy A. Klyushin, Kyiv (UA); Yuriy I. Petunin, Kyiv (UA)

(73) Assignee: New Jersey Institute of Technology, Newark, NJ (US)

( * ) Notice: Subject to any disclaimer, the term of this patent is extended or adjusted under 35 U.S.C. 154(b) by 1050 days.

(21) Appl. No.: 12/141,671

(22) Filed: Jun. 18, 2008
(Under 37 CFR 1.47)

(65) Prior Publication Data
US 2009/0214096 A1 Aug. 27, 2009

Related U.S. Application Data

(60) Provisional application No. 60/936,215, filed on Jun. 18, 2007.

(51) Int. Cl.
*G06K 9/00* (2006.01)
(52) U.S. Cl. ........................................................ 382/128
(58) Field of Classification Search .................... 382/128
See application file for complete search history.

(56) References Cited

OTHER PUBLICATIONS

Klyushin, Dmitri A., Yuri I. Petunin, Roman I. Andrushkiw, Natalya V. Boroday, and Karelia P. Ganina. "Cancer Diagnostic Method Based on Pattern Recognition of DNA Changes in Buccal Epithelium in the Pathology of the Thyroid and Mammary Glands." Center for Applied Mathematics and Statistics (2002). Web.*
Andrushkiw, R. I., Yu. I. Petunin, L. I. Ostapchenko, N. V. Boroday, Y. V. Lozovskaya, V. F. Chekhun, and I. V. Dosenko. "Computer-Aided Cytogenetical Method of Breast Cancer Dagnosis. Part I—Decision Rule." (2006). Web.*
Petunin, Yuri I., Dmitry A. Kljushin, and Roman I. Andrushkiw. "Nonlinear Algorithm of Pattern Recognition for Computer-Aided Diagnosis of Breast Cancer." Nonlinear Analysis, Theory, Methods & Applications 30.8 (1997): 5431-436. Web.*

* cited by examiner

*Primary Examiner* — Clayton E Laballe
*Assistant Examiner* — Dennis Hancock
(74) *Attorney, Agent, or Firm* — Paul R. Matri, Esq.

(57) ABSTRACT

The present invention relates to noninvasive diagnostic systems for cancer detection comprising RGB-imaging of cancer cells, buccal epithelium cells and uses of the system for drug discovery. The present invention provides novel algorithms for the detection of malignancy associated changes of buccal epithelial cells based on RGB analysis.

6 Claims, 3 Drawing Sheets

COMPUTER-AIDED CYTOGENETIC METHOD OF CANCER DIAGNOSIS

CROSS REFERENCE

This application claims priority under Title 35, United States Code 119(e) from Provisional Application Ser. No. 60/936,215 filed on Jun. 18, 2007.

FIELD OF INVENTION

The present invention relates to noninvasive diagnostic systems for cancer detection comprising RGB-imaging of cancer cells, buccal epithelium cells and uses of the system for drug discovery.

BACKGROUND

1. Breast Cancer

Breast cancer, a cancer that starts in the cells of the breast, is the second most common type of cancer after lung cancer (10.4% of all cancer incidence) and the fifth most common cause of cancer death. It is the most common cancer amongst women, with an incidence rate greater than twice that of colorectal cancer and cervical cancer and approximately triple that of lung cancer. Several well-established factors have been associated with an increased risk of breast cancer, including family history, nulliparity, early menarche, advanced age, and a personal history of breast cancer (in situ or invasive). Patients initially suspected of having breast cancer generally undergo further confirmation of the diagnosis, evaluation of stage of disease, and selection of therapy. When tumor tissue is surgically removed, estrogen receptor (ER) and progesterone receptor (PR) status are determined. Clinical trials have established that screening with mammography, with or without clinical breast examination, may decrease breast cancer mortality.

Breast cancer commonly is treated by various combinations of surgery, radiation therapy, chemotherapy, and hormone therapy. Prognosis and selection of therapy may be influenced by the age and menopausal status of the patient, the stage of the disease, the histologic and nuclear grade of the primary tumor, the ER and PR status of the tumor, the measures of proliferative capacity of the tumor and HER2/neu gene amplification encoding a cell-surface membrane receptor.

Although certain rare inherited mutations predispose women to develop breast cancer, prognostic data on mutation carriers who have developed breast cancer are conflicting. Since criteria for menopausal status vary widely, some studies have substituted age older than 50 years as a surrogate for the postmenopausal state.

A possible genetic contribution to breast cancer risk is indicated by the increased incidence of these cancers among women with a family history, and by the observation of rare families in which multiple family members are affected with breast cancer, in a pattern compatible with autosomal dominant inheritance of cancer susceptibility. Formal studies of families (linkage analysis) have subsequently proven the existence of autosomal dominant predispositions to breast cancer and have led to the identification of several highly penetrant genes as the cause of inherited cancer risk in many cancer-prone families. Mutations in these genes are rare in the general population and are estimated to account for no more than 5% to 10% of breast cancer cases overall. It is likely that other genetic factors contribute to the etiology of some of these cancers.

Breast cancer is classified into a variety of histologic types, some of which have prognostic importance. For example, favorable histologic types include mucinous, medullary, and tubular carcinoma.

Pathologically, breast cancer can be a multicentric and bilateral disease. Bilateral disease is somewhat more common in patients with infiltrating lobular carcinoma. Patients who have breast cancer should have bilateral mammography at the time of diagnosis to rule out synchronous disease.

The role of magnetic resonance imaging (MRI) in screening and follow-up continues to evolve. Having demonstrated an increased detection rate of mammographically occult disease, the selective use of MRI for additional screening is being suggested. Because only 25% of MRI-positive findings represent malignancy, pathologic confirmation prior to treatment action is recommended. Whether this increased detection rate will translate into improved treatment outcome is unknown.

Patients should continue to have regular breast physical examinations and mammography to detect either recurrence in the ipsilateral breast in those patients treated with breast-conserving surgery or a second primary cancer in the contralateral breast. The risk of a primary breast cancer in the contralateral breast is approximately 1% per year. Patient age younger than 55 years at the time of diagnosis or lobular tumor histology appear to increase this risk to 1.5%. The development of a contralateral breast cancer is associated with an increased risk of distant recurrence.

Several treatment options for breast cancer include hormone replacement therapy, reconstructive surgery for patients who choose to undergo a total mastectomy, and radiation therapy.

1.1. Risk Factors for Breast Cancer

Risk factors for breast cancer include family history, autosomal dominant inheritance, age, reproductive and menstrual history, hormone therapy, radiation exposure, mammographic breast density, alcohol intake, physical activity, anthopometric variables, and a history of benign breast disease. There is no one factor that is diagnostic and predictions of likelihood have not been proved reliable.

1.1.1. Family History

In cross-sectional studies of adult populations, 5% to 10% of women have a mother or sister with breast cancer, and about twice as many have either a first-degree relative or a second-degree relative with breast cancer. The risk conferred by a family history of breast cancer has been assessed in both case-control and cohort studies, using volunteer and population-based samples, with generally consistent results. In a pooled analysis of 38 studies, the relative risk (RR) of breast cancer conferred by a first-degree relative with breast cancer was 2.1 (95% confidence interval [CI], 2.0-2.2). Risk increases with the number of affected relatives and age at diagnosis.

When using family history to assess risk, the accuracy and completeness of family history data must be taken into account. A reported family history may be erroneous, or a person may be unaware of relatives affected with cancer. In addition, small family sizes and premature deaths may limit the information obtained from a family history. Breast cancer on the paternal side of the family usually involves more distant relatives than on the maternal side and thus may be more difficult to obtain. When comparing self-reported information with independently verified cases, the sensitivity of a history of breast cancer is relatively high, at 83% to 97%.

1.1.2. Autosomal Dominant Inheritance

Autosomal dominant inheritance of breast cancer is characterized by transmission of cancer predisposition from generation to generation, through either the mother's or the father's side of the family with an inheritance risk of 50%, i.e., when a parent carries an autosomal dominant genetic predisposition, each child has a 50:50 chance of inheriting the predisposition. Although the risk of inheriting the predisposition is 50%, not everyone with the predisposition will develop cancer because of incomplete penetrance and/or gender-restricted or gender-related expression. Both males and females can inherit and transmit an autosomal dominant cancer predisposition. A male who inherits a cancer predisposition and shows no evidence of it can still pass the altered gene on to his sons and daughters.

Breast cancer is a component of several autosomal dominant cancer syndromes. The syndromes most strongly associated breast cancer are BRCA1 or BRCA2 mutation syndromes. Breast cancer also is a common feature with Li-Fraumeni syndrome due to TP53 mutations; of Cowden syndrome due to PTEN mutations; and with mutations in CHEK2. Other genetic syndromes that may include breast cancer as an associated feature include heterozygous carriers of the ataxia telangiectasia (AT) gene and Peutz-Jeghers syndrome.

The family characteristics that suggest hereditary breast cancer predisposition includes cancers typically occurring at an earlier age than in sporadic cases (defined as cases not associated with genetic risk) and two or more primary cancers in a single individual. These cancers could be multiple primary cancers of the same type (e.g., bilateral breast cancer) or primary cancer of different types (e.g., breast and ovarian cancer in the same individual).

1.1.3. Age

Cumulative risk of breast cancer increases with age, with most breast cancers occurring after age 50 years. Breast cancer tends to occur at an earlier age than in sporadic cases in women with a genetic susceptibility.

1.1.4. Reproductive and Menstrual History

Breast cancer risk increases with early menarche and late menopause, and is reduced by early first full-term pregnancy. Several studies have suggested that the influence of these factors on risk in BRCA1/BRCA2 mutation carriers appear to be similar to noncarriers.

1.1.5. Oral Contraceptives

Oral contraceptives may produce a slight increase in breast cancer risk among long-term users, but this appears to be a short-term effect. In a meta-analysis of data from several studies, the risk of breast cancer associated with oral contraceptive use did not vary according to a family history of breast cancer.

1.1.6. Hormone Replacement Therapy

Data exist from both observational and randomized clinical trials regarding the association between postmenopausal hormone replacement therapy (HRT) and breast cancer. A meta-analysis of data from 51 observational studies indicated a RR of breast cancer of 1.35 (95% CI, 1.21-1.49) for women who had used HRT for 5 or more years after menopause. The Women's Health Initiative (WHI), a randomized controlled trial of about 160,000 postmenopausal women, investigated the risks and benefits of HRT. The estrogen-plus-progestin arm of the study, which randomized more than 16,000 women to receive combined HRT or placebo, was halted early because health risks exceeded benefits. Adverse outcomes prompting closure included significant increase in both total (245 vs. 185 cases) and invasive (199 vs. 150 cases) breast cancers (RR=1.24; 95% CI, 1.02-1.5, P<0.001) and increased risks of coronary heart disease, stroke, and pulmonary embolism. Similar findings were seen in the estrogen-progestin arm of the prospective observational Million Women's Study in the United Kingdom. The risk of breast cancer was not elevated, however, in women randomly assigned to estrogen-only versus placebo in the WHI study (RR=0.77; 95% CI, 0.59-1.01). Eligibility for the estrogen-only arm of this study required hysterectomy, and 40% of these patients also had undergone oophorectomy, which potentially could have impacted breast cancer risk.

The association between HRT and breast cancer risk among women with a family history of breast cancer has not been consistent; some studies suggest risk is particularly elevated among women with a family history, while others have not found evidence for an interaction between these factors. The increased risk of breast cancer associated with HRT use in the large meta-analysis did not differ significantly between subjects with and without a family history. The WHI study has not reported analyses stratified on breast cancer family history, and subjects have not been systematically tested for BRCA1/2 mutations. Short-term use of hormones for treatment of menopausal symptoms appears to confer little or no breast cancer risk. The effect of HRT on breast cancer risk among carriers of BRCA1 or BRCA2 mutations has been studied only in the context of bilateral risk-reducing oophorectomy, in which short-term replacement does not appear to reduce the protective effect of oophorectomy on breast cancer risk.

1.1.7. Radiation Exposure

Observations in survivors of the atomic bombings of Hiroshima and Nagasaki and in women who have received therapeutic radiation treatments to the chest and upper body document indicate increased breast cancer risk as a result of radiation exposure. The significance of this risk factor in women with a genetic susceptibility to breast cancer is unclear.

Preliminary data suggest that increased sensitivity to radiation could be a cause of cancer susceptibility in carriers of BRCA1 and BRCA2 mutations, and in association with germline ATM and TP53 mutations. Since BRCA1/2 mutation carriers are heterozygotes, however, radiation sensitivity might occur only after a somatic mutation has damaged the normal copy of the gene.

The possibility that genetic susceptibility to breast cancer occurs via a mechanism of radiation sensitivity raises questions about radiation exposure. It is possible that diagnostic radiation exposure, including mammography, poses more risk in genetically susceptible women than in women of average risk. Therapeutic radiation could also pose carcinogenic risk. A cohort study of BRCA1 and BRCA2 mutation carriers treated with breast-conserving therapy, however, showed no evidence of increased radiation sensitivity or sequelae in the breast, lung, or bone marrow of mutation carriers. Conversely, radiation sensitivity could make tumors in women with genetic susceptibility to breast cancer more responsive to radiation treatment. Studies examining the impact of mammography and chest x-ray exposure in BRCA1 and BRCA2 mutation carriers have had conflicting results.

1.1.8. Alcohol Intake

The risk of breast cancer increases by approximately 10% for each 10 g of daily alcohol intake (approximately 1 drink or less) in the general population. One study of BRCA1/BRCA2 mutation carriers found no increased risk associated with alcohol consumption.

1.1.9. Physical Activity and Anthropometry

Weight gain and being overweight are commonly recognized risk factors for breast cancer. In general, overweight women are most commonly observed to be at increased risk of postmenopausal breast cancer and at reduced risk of premenopausal breast cancer. Sedentary lifestyle may also be a risk factor. These factors have not been evaluated systematically in women with a positive family history of breast cancer or in carriers of cancer-predisposing mutations, but one study suggested a reduced risk of cancer associated with exercise among BRCA1 and BRCA2 mutation carriers.

1.1.10. Benign Breast Disease and Mammographic Density

Benign breast disease (BBD) is a risk factor for breast cancer, independent of the effects of other major risk factors for breast cancer (age, age at menarche, age at first live birth, and family history of breast cancer). There may also be an association between benign breast disease and family history of breast cancer.

An increased risk of breast cancer has also been demonstrated for women who have increased density of breast tissue as assessed by mammogram, and breast density may have a genetic component in its etiology.

1.1.11. Other Factors

Other risk factors, including those that are only weakly associated with breast cancer and those that have been inconsistently associated with the disease in epidemiologic studies (e.g., cigarette smoking), may be important in subgroups of women defined according to genotype. For example, some studies have suggested that certain N-acetyl transferase alleles may influence female smokers' risk of developing breast cancer. One study found a reduced risk of breast cancer among BRCA1/2 mutation carriers who smoked, but an expanded follow-up study failed to find an association.

2. Models for Prediction of Breast Cancer Risk

Models to predict an individual's lifetime risk for developing breast cancer are available, however these models have limited utility. Models also exist to predict an individual's likelihood of having a BRCA1 or BRCA2 mutation. Not all models can be applied appropriately for all patients. Each model is appropriate only when the patient's characteristics and family history are similar to the study population on which the model was based. Table 1 (Characteristics of the Gail and Claus Models) summarizes the salient aspects of the risk assessment models and is designed to aid in choosing the one that best applies to a particular individual.

Two models for predicting breast cancer risk, the Claus model and the Gail model, are used widely in research studies and clinical counseling. Both have limitations, and the risk estimates derived from the two models may differ for an individual patient. These models, however, represent the best methods currently available for individual risk assessment.

It is important to note that these models will significantly underestimate breast cancer risk for women in families with hereditary breast cancer susceptibility syndromes. In those cases, Mendelian genetic inheritance risks would apply. A 3-generation cancer family history is taken before applying any model. Generally, the Claus or Gail models should not be the sole model used for families with one of the following characteristics: three individuals with breast or ovarian cancer (especially when one or more breast cancers are diagnosed before age 50 years); a woman who has both breast and ovarian cancer; and Ashkenazi Jewish ancestry with at least one case of breast or ovarian cancer (as these families are more likely to have a hereditary cancer susceptibility syndrome).

TABLE 1

| Characteristics of the Gail and Claus Models* | Gail Model | Claus Model |
| --- | --- | --- |
| Data derived from | Breast Cancer Detection Demonstration Project (BCDDP) Study | Cancer and Steroid Hormone (CASH) Study |
| Study population | 2,852 cases, age ≧35 years<br>In situ and invasive cancer<br>3,146 controls<br>Caucasian<br>Annual breast screening | 4,730 cases, age 20-54 years<br>Invasive cancer<br>4,688 controls<br>Caucasian<br>Not routinely screened |
| Family history characteristics | First-degree relatives with breast cancer | First-degree or second-degree relatives with breast cancer<br>Age of onset in relatives |
| Other characteristics | Current age<br>Age at menarche<br>Age at first live birth<br>Number of breast biopsies<br>Atypical hyperplasia in breast biopsy<br>Race (included in the most current version of the Gail model) | Current age |
| Strengths | Incorporates:<br>Risk factors other than family history | Incorporates:<br>Paternal as well as maternal history<br>Age at onset of breast cancer<br>Family history of ovarian cancer |
| Limitations | Underestimates risk in hereditary families<br>Number of breast biopsies without atypical hyperplasia may cause inflated risk estimates<br>Does not incorporate:<br>Paternal family history of breast cancer | May underestimate risk in hereditary families<br>May not be applicable to all combinations of affected relatives<br>Does not include risk factors other than family history |

TABLE 1-continued

| Characteristics of the Gail and Claus Models* | Gail Model | Claus Model |
|---|---|---|
| | or any family history of ovarian cancer<br>Age at onset of breast cancer in relatives<br>All known risk factors for breast cancer | |
| Best application | For individuals with no family history of breast cancer or 1 first-degree relative with breast cancer at ≧age 50 years<br>For determining eligibility for chemoprevention studies | For individuals with 0, 1, or 2 first-degree or second-degree relatives with breast cancer |

The Gail model has been found to be reasonably accurate at predicting breast cancer risk in large groups of white women who undergo annual screening mammography. While the model is reliable in predicting the number of breast cancer cases expected in a group of women from the same age-risk strata, it is less reliable in predicting risk for individual patients. Risk can be overestimated in: nonadherent women (i.e., does not adhere to screening recommendations), and women in the highest risk strata. Risk could be underestimated in the lowest risk strata. Earlier studies suggested risk was overpredicted in younger women and underpredicted in older women. More recent studies using the modified Gail model (which is currently used) found it performed well in all age groups. Further studies are needed to establish the validity of the Gail model in minority populations.

A study of 491 women aged 18 to 74 years with a family history of breast cancer compared the most recent Gail model to the Claus model in predicting breast cancer risk. The two models were positively correlated (r=0.55). The Gail model estimates were higher than the Claus model estimates for most participants.

The Gail model is the basis for the Breast Cancer Risk Assessment Tool, a computer program that is available from the NCI. This version of the Gail Model estimates only the risk of invasive breast cancer.

The Tyrer-Cuzick model incorporates both genetic and non-genetic factors. A three generation pedigree is used to estimate the likelihood that an individual carries either a BRCA1/BRCA2 mutation or a hypothetical low penetrance gene. In addition, the model incorporates personal risk factors such as parity, body mass index, height, and age at menarche, menopause and first live birth. Both genetic and nongenetic factors are combined to develop a risk estimate. Although powerful, the model at the current time is less accessible to primary care providers than the Gail and Claus models. The BOADICEA model examines family history to estimate breast cancer risk, and also incorporates both BRCA1/2 and non-BRCA1/2 genetic risk factors. Therefore, existing models leave room for improvement. It is desirable to have a model more predictive for humans that is more accessible.

3. Breast Cancer Screening 3.1 Screening by Mammography

Based on fair evidence, screening mammography in women aged 40 to 70 years decreases breast cancer mortality. The benefit is higher for older women, in part because their breast cancer risk is higher. The description of the evidence regarding mammography screening includes: a) study design (meta-analysis of individual data from four randomized controlled trials (RCTs) and three additional RCTs); b) internal validity (validity of RCTs varies from poor to good; internal validity of meta-analysis is good); c) consistency (fair); d) magnitude of effects on health outcomes (relative breast cancer-specific mortality is decreased by 15% for follow-up analysis and 20% for evaluation analysis). Absolute mortality benefit for women screened annually starting at age 40 years is 4 per 10,000 at 10.7 years. The comparable number for women screened annually starting at age 50 years is approximately 5 per 1000. Absolute benefit is approximately 1% overall but depends on inherent breast cancer risk, which rises with age. And e) external validity (good). Based on solid evidence, screening mammography may lead to the following harms (Table 2):

TABLE 2

| Harms of Screening Mammography | Study Design | Internal Validity | Consistency | Magnitude of Effects | External Validity |
|---|---|---|---|---|---|
| Treatment of insignificant cancers (overdiagnosis, true positives) can result in breast deformity, lymphedema, thromboembolic events, new cancers, or chemotherapy-induced toxicities. | Descriptive population-based, autopsy series and series of mammary reduction specimens | Good | Good | Approximately 33% of breast cancers detected by screening mammograms represent overdiagnosis. | Good |
| Additional testing (false-positives) | Descriptive population-based | Good | Good | Estimated to occur in 50% of women screened annually for 10 years, 25% of whom will have | Good |

TABLE 2-continued

| Harms of Screening Mammography | Study Design | Internal Validity | Consistency | Magnitude of Effects | External Validity |
|---|---|---|---|---|---|
| False sense of security, delay in cancer diagnosis (false-negatives) | Descriptive population-based | Good | Good | biopsies. 6% to 46% of women with invasive cancer will have negative mammograms, especially if young, with dense breasts, or with mucinous, lobular, or fast-growing cancers. | Good |
| Radiation-induced mutations can cause breast cancer, especially if exposed before age 30 years. Latency is more than 10 years, and the increased risk persists lifelong. | Descriptive population-based | Good | Good | Between 9.9 and 32 breast cancers per 10,000 women exposed to a cumulative dose of 1 Sv. Risk is higher for younger women. | Good |

3.2 Screening by Clinical Breast Examination

Based on fair evidence, screening by clinical breast examination reduces breast cancer mortality. The description of the evidence regarding clinical breast examination screening includes: a) study design (RCT, with inference); b) internal validity (good); c) consistency (poor); d) magnitude of effects on health outcomes (breast cancer mortality was the same for women aged 50 to 59 years undergoing screening clinical breast examinations with or without mammograms); and e) external validity (poor). Based on solid evidence, screening by clinical breast examination may lead to the following harms (Table 3):

TABLE 3

| Harms of Screening Clinical Breast Examination | Study Design | Internal Validity | Consistency | Magnitude of Effects | External Validity |
|---|---|---|---|---|---|
| Additional testing (false-positives) | Descriptive population-based | Good | Good | Specificity in women aged 50 to 59 years ranged between 88% and 96%. | Good |
| False reassurance, delay in cancer diagnosis (false-negatives) | Descriptive population-based | Good | Fair | Of women with cancer, 17% to 43% had a negative clinical breast examination. | Poor |

3.3 Screening by Breast Self-Examination

Based on fair evidence, teaching breast self-examination does not reduce breast cancer mortality. The description of the evidence regarding breast self-examination screening includes: a) study design (one RCT, case-control trials, and cohort evidence); b) internal validity (good); c) consistency (fair); d) magnitude of effects on health outcomes (no difference in breast cancer mortality was seen after 10 years in Shanghai factory workers randomly assigned to receive breast self-examination instruction and reinforcement, compared with the control group. Forty percent of the women enrolled, however, were younger than 40 years); and e) external validity (poor).

4. Fibroadenoma

Fibroadenoma of the breast is an encapsulated benign tumor characterized by proliferation of both glandular and stromal elements. A fibroadenoma is a benign tumor and surgery may not necessarily be needed when the diagnosis is certain (especially in a younger woman). When the diagnosis is in doubt (and particularly in older women) the tumor generally is surgically removed. Larger fibroadenomas generally are also removed. No medications are used for the treatment of fibroadenoma.

A fibroadenoma is usually diagnosed through clinical examination, ultrasound, mammography and often a biopsy sample of the lump. Their incidence declines with increasing age, and they generally appear before the age of 30 years, probably partly as a result of normal estrogenic hormonal fluctuation. Fibroadenoma is found most often in teenagers and the incidence is increased slightly in those taking hormonal contraception. A fibroadenoma commonly is not associated with fibrocystic breast disease and has no known links to cancer. Usually the tumor is solitary, multiple tumors accounting for 10-15% of all fibroadenoma cases. The tumor is not fixed to the adjacent skin, muscle, or lymph nodes, so it is mobile within the breast on palpation. Fibroadenoma commonly is found immediately adjacent to the areola, though rarely directly behind the nipple. The tumors are slightly more common on the left breast than on the right, possibly for reasons associated with blood flow or arm and shoulder activity, most people being right-handed.

Some malignant breast tumors can be mistaken for a fibroadenoma, thus it is important for them to be diagnosed by a physician. On average, when the diagnostic pathway has been completed, about 5% of these lumps are diagnosed a malignant tumor, and not as a fibroadenoma.

Early diagnosis and the use of screening methods focusing on the detection of pre-clinical stages of cancer and tumor development are important tools of cancer therapy.

5. Tumor-Associated Pathological Processes

Sufficient scientific evidence has accumulated to formulate a theory of interrelation between a tumor and an organism, which appeared in the first half of the 20$^{th}$ century in a series of fundamental works (Balicky, K. P., and Veksler, I. H., *Naukova Dumka*, Kyiv, 1975; Begg, R. *Uspihy v izuchemmia raka*, izdatelstvo inostrannoy literatury, Moskow, 5:314-373, 1960; Kavetsky, R. E., *Naukova Dumka*, p. 235, Kyiv, 1977; Kavetsky, R. E., *Naukova Dumka*, Kyiv, 1981; Umansky, Yu. A., *Naukova Dumka* p. 240, Kyiv, 1974).

The central idea of this theory is that malignant processes in cells of the organism are due to violations of the regulatory influences on a cell by the organism's control systems (nervous, endocrine, immune) under the impact of exogenous and endogenous environmental factors. The second postulate of the theory recognizes the fact that two-sided interrelations exist between the tumor and an organism, which are realized via these systems. Moreover, a neoplasm is a local manifestation of systemic disease of the whole organism, which occurs under the influence of various diverse factors and is commonly called cancer.

Although a neoplastic process in its early stage is a "local process", clinical and experimental data indicate that pathological disturbances of physiological processes in time affect not only the original local center, but also other tissues and organs. It follows that a pathological process, which initially was localized to a single organ, with time tends to expand to a systemic disease that causes changes in the physiological processes of other organs, leading to a disturbance of the homeostasis of the organism as a whole.

5.1 Pathological Processes

The interrelations between a malignant tumor and an organism are diverse and often contradictory. On the one hand, the organism provides the necessary external environment and sufficient conditions for the existence and growth of a tumor, while at the same time the organism struggles, with varying degree of success, to counteract the development of a tumor. This struggle is usually characterized by a high aggressiveness potential of the tumor and limited defensive resources of the organism. The development of a neoplastic process in an organism results from a systemic impact of a tumor on the organism. This impact has a number of distinct factors, due to the fact that different types of tumors affect distant organs and tissues in different ways. Despite the variety of oncological diseases that may differ with regard to the origin, localization and biological properties, their long-term effect on the organism is usually fatal, unless measures are taken to stop the disease. The cause of death may be obvious: fatal hemorrhage, lesion of vital organs, malignant transformation of cells, etc.

Local manifestations of a tumor are often "fuzzy" and may not appear to affect the vital functions of the organism. Since our understanding of the mechanisms of interaction between a tumor and an organism is still incomplete, it often is difficult to find a relation between a metabolic disturbance in the organism and the biological characteristics of the tumor causing the disturbance. Tumor cells acquire new properties during the transformation process, which affect their behavior in the organism and their relations with other cells and the organism. This, in turn, has an effect on the transformation process of the cells. For example, a violation of the membranes' properties (the starting point of transformation process) changes the behavior of the affected cells and their relation with the surrounding cells. This leads to a weakening of "contact inhibition", which is one of the main components of intercellular regulation involved in cell multiplication. Due to a tumor's aggressive growth, which requires nutrient and energy resources and the properties of isoenzymatic spectrum for high competitiveness, the tumor becomes a "trap" for nutrients, causing their deficiency in the organism (for example, deficiency of nitrogen, glucose and many vitamins). As is well known, tumors obtain nitrogen not only from food, but also from the products of cell protein. They actively utilize glucose for albumin synthesis and nucleic acids, creating its deficit in the organism. Thus, tumors act as hypoglycemic factors, straining the compensating system which supports the carbohydrate balance in the organism. Similarly, tumors disrupt not only carbohydrate, but also nitric, lipid, salt and acid-base balances. On the one hand, tumors cause deficiency of certain compounds, while at the same time promotes the production of biologically active non-inorganic substances. This results in an even greater disturbance of the metabolic process.

A tumor can produce various growth and antigen factors [e.g., growth factors α and β, factor of tumor necrosis, prostaglandins A 1 and A 2, cytokines, interferons α and β, and others. Upon entering the blood stream, these factors exert mitotic influence on the cells of distant organs that are equipped with corresponding receptors. The second form of influence of a tumor on the cells of distant organs is the secretion of entopic hormones, which are not inorganic to such cells. For example, the cells of a lung tumor can secrete adrenocorticotrophic hormone, insulin and glucagon. A manifestation of the generalized influence of a tumor on an organism is known as paraneoplastic syndrome. It may take various forms: immunosupression, heightened blood coagulability, myodistrophy, certain rare dermatoses, reduced glucose tolerance, acute hypoglycemia, and others.

Biochemical blood tests on patients suffering from oncological diseases make it possible in a number of cases to determine the existence and localization of a tumor, its proliferation, and the functional state of the vital organs. Such tests are based on the analysis of whole protein, bilirubin, alanine aminotransferase, glucose, urine and other substances.

The metabolic peculiarities of tumor cells provide useful means of identifying tumor markers. These markers can be found in the form of various proteins (enzymes, hormones, antigens) and metabolites. Their concentration correlates with tumor mass, proliferation activity and, in some cases, with the degree of malignancy of the tumor. A tumor may lose certain isoenzymes or, conversely, synthesize others that are natural for embryonic tissue, such as, e.g., cancer embryonic antigen. A tumor may undergo changes in the activity of lysosomal and membrane-bound enzymes, and proceed with the synthesis of ectopic isoenzymes and hormones. Among the markers produced by a tumor one should mention the following: α-fetoprotein (hepatocellular carcinoma), cancer embryonic antigen (cancer of large intestine, cancer of pancreas, lung cancer), tissue polypeptide antigen (cancer of urinary bladder, cancer of prostatic gland, cancer of kidneys), chorionic gonadotropin (tumors of trophoblast).

Other markers associated with a tumor include the following: proteins of acute phase inflammation (ceruloplasmin), haptoglobin, α 2-globulins, C-reactive protein, certain enzymes (lactate dehydrogenase, creatine kinase), glutathione-S-transferase and immune complexes.

For many years the main attention in the investigation of the organism's reaction to malignant tumor growth was focused on immunological aspects. It is well known that violations of immune homeostasis play an important role in the pathogenesis of various oncological diseases, causing the development of a secondary immunodeficiency state. On the other hand, it was discovered that certain products from tumor cells promote suppression of the immune system and bring about progression of nonspecific and antigen-specific (with respect to antigens of tumor tissue) immunosuppression i.e., a system of natural nonspecific resistance that eliminates a small number (from 1 to 1000) tumor cells. This system contains natural killers, which are large granular lymphocytes (LGL) that constitute 1-2.5% of the total population of peripheral lymphocytes and do not depend on thymus and macrophages. In addition, there is a specific anti-tumor immune system, which exists with the help of humoral factors produced by immunocompetent cells. Interleukins and other cytokines participate at all stages of the systemic and local immune reaction to tumor antigens.

Recent decades have witnessed a series of discoveries which revealed the extent of the complexity of the interactions among control systems, at a level where the effect takes place. This was particularly significant for the problem of malignant transformation of cells, and the growth and metastasizing of neoplasms. Of special importance were the studies that demonstrated the possibility of synthesis, or biotransformation of biologically active substances, by almost all cells of an organism.

Investigations of malignant growth led to the discovery of the phenomenon of autocrine stimulation. It was discovered that the interrelations between a tumor and an organism are not fulfilled separately by each regulatory system (nervous, endocrine, immune), but by means of regulation by these systems of the metabolic processes taking place in the tumor. The activity of these systems, aimed at supporting homeostasis and ensuring control over the stability of an organism's internal environment, is based on the principle of antagonism.

The study of the influence of a tumor on various organs and systems of an organism is an important subject of current research. To obtain data about the interrelations between a tumor and an organism, it is logical to search for cytogenetic, biophysical, cytochemical and immunological markers that characterize the state of somatic non-malignant cells (fibroblasts of skin, lymphocytes of peripheral blood and epitheliocytes of buccal epithelium). In recent years attempts were made to study the state of the organism in terms of changes in the composition of peripheral blood, since these cell elements are objective indicators of the violation of homeostasis of an organism under various pathological states. Cytogenetic changes appear in the lymphocytes of patients with a malignant neoplasm. These changes are characterized by an elevated level of structural aberration of the chromosomes and elevated frequency of structural chromatic interchanges (SCI), as well as by dispersion of the spectrum of polymorphous variants of C-segments, in comparison with those of healthy people. During tumor growth, the tendency toward increase of DNA content and heterogeneity of chromatin in the interphase nuclei of lymphocytes becomes quite apparent.

5.1.1. Buccal Epithelium

The interrelations between a tumor and the host organism are very complex, and are conditioned by many interactions that exist between a tumor and the organism's control systems (nervous, endocrine, immune) under the influence of exogenous and endogenous factors, which cause corresponding reactions in the host organism. Considering the broad complex of indicators of homeostasis, important information about the influence of a tumor on the organism may be gained from the study of the functional state of BE which, as mentioned before, has a close anatomical-physiological connection with various organs and systems of the organism. This is confirmed by the fact that many diseases of internal organs are accompanied by changes in BE, which may appear there prior to the appearance of other clinical symptoms of the disease in the organism.

Buccal epithelium (BE) is a fine indicator of the severity of pathological processes (including neoplastic). It therefore is of particular interest to the study of interrelations between a tumor and the organism. This is due to the fact that BE differs significantly from other mucous membranes by its morphological and histochemical features. One of the main characteristics of BE is its ability to keratinize. The epithelium of the oral cavity plays an important role in the actualization of protective mechanisms. In particular, it has high enzymatic activity, an abundance of glycogen in non-keratinized epithelium, high intensity of metabolic interchange processes, and the ability to reorganize itself quickly.

5.1.2 Morphofunctional Properties of Buccal Epithelium

The epithelium covers 80% of the surface area of the oral cavity (approximately 172 cm$^2$ in adults) (the remaining 20% is covered by teeth). Its structure is heterogeneous and varies with location. With regard to morphofunctional properties, investigators distinguish three types of BE, i.e., masticatory epithelium, lining epithelium, and specialized epithelium. Masticatory epithelium covers the hard palate and gums. Lining epithelium covers cheeks, the bottom of oral cavity, lips, alveolar foramina, oral surface of the soft palate and the ventral surface of the tongue. The lining epithelium is a multilayered squamous epithelium whose cells are connected by desmosomes. Buccal epithelium comprises keratinized and non-keratinized epithelium. The latter, as a rule, forms a thicker layer than the former. In non-keratinized epithelium there are three layers: basal, spinous and superficial. The basal (growth, germinal) layer consists of cylindrical cells. Under fission these cells are arranged one above the other, moving upwards. Glycogen is accumulated in these cells. The cytoplasm of basal cells is distinguished by basophilia, which is caused by the presence of RNA. Nuclei of these cells are oval, easily stained by primary dyes and are rich in chromatin. The basal layer is the source for the formation of all other layers of epithelium, which are above the basal layer. In particular, above the basal layer is the spinous layer, which consists of several rows of polygonal cells with round nuclei and light basophilic cytoplasm. The surface layer is formed by oblate-shaped cells with a vesicular or pyknotic nucleus, containing granules of glycogen, small separate keratohyaline granules and cytokeratinous filaments. In these cells the content of the organelles is smaller than in the cells of spinous layer, plasmolema is reinforced and intercellular spaces are reduced.

According to cytological classification, BE contains basal, parabasal, intermediate and surface cells. Smears of normal BE contain mostly intermediate cells. Their proportion with respect to the total number of cells varies between 52 and 80 percent, with a mean of 69.9±1.1%. These cells have a round or ellipsoidal nucleus with a well-defined image of the nuclear chromatin of reticular type. The cytoplasm is dense and, as a rule, homogeneous. According to their morphofunctional properties, the population of intermediate cells is heterogeneous: some cells have basophilic cytoplasm containing considerable amount of RNA. These cells originate from the lower zone of the spinous layer and serve a germinal function. Their proportion varies between 2.5 and 18 percent. The majority of intermediate cells are characterized by a coarse image of the nuclear chromatin, and a cytoplasm that contains an insignificant quantity of RNA. The intermediate cells from the upper zone of the spinous layer serve basically a defensive function; their proportion varies between 46.5 and 81 percent.

Buccal epithelium is the most important barrier against antigens, allergens, carcinogens and microorganisms. Its defensive function involves non-specific, as well as specific, mechanisms. Nonspecific mechanisms include the epithelial layer (as a physical barrier); the non-specific antimicrobial humoral factors, produced by the epithelium and secreted by the salivary glands; non-specific cellular defensive reactions produced by neutrophilic granulocytes, monocytes and macrophages. In addition to these cells, BE contains specific lymphocytes that are related in the majority to T-cells, and serve as their helpers. Intraepithelial lymphocytes are subject in many cases to apoptosis. A significant portion of them control the phenotype of memory cells. In this connection, it is conjectured that the absence of immune reaction in BE serves as a defensive mechanism which protects the lymphocytes from excessive stimulation by exogenous antigens.

The barrier property of BE is strengthened by the action of its cells that produce peptides with a wide range of antimicrobial activity including cationic protein, calprotectins, β-defensine and lingual animicrobial peptide. A leading factor of humoral immunity is the presence in the saliva of secretory immunoglobulins of class A (sIgA), which prevents the attachment of microorganisms to the epithelium and facilitates their removal by the saliva. In addition, saliva contains high concentrations of anti-microbial substances (lysozyme, lactoferrin) and protects BE from mechanical, chemical and thermal injuries. Specific cellular immune mechanisms arise from the interaction between antigen-presenting and various subpopulations of lymphocytes.

The basic antigen-presenting cells of BE are dendritic cells, among which the cells of Langerhans have been the most studied. These cells are characterized on their surface by high levels of constitutive expression of molecules belonging to the major histocompatibility complex class II (MHCII). In addition, these cells are characterized by an actively expressed ability to initiate immune reactions by stimulating clones of dormant antigenspecific T-cells. These cells secrete β (1)-integrin-adhesive molecules, which allow them to be attached to laminin and fibronectin and to migrate through basal membrane into BE and back. Furthermore, these cells have receptors CD1+, glycoprotein CD4, and high-affinity membrane receptor IgE, the latter of which plays an important role in the induction and support of allergic reactions and inflammation. Langerhans cells produce a colony-stimulating factor of granulocytes and monocytes; a factor of tumor necrosis a; interleukin 1 and 6, which provide activation of T-lymphocytes that secrete interleukin-2 and macrophage inflammatory protein. In addition to Langerhans cells, BE contains dendritic antigen-presenting cells with phenotype CD36 (OKM5+), which are similar to microphages by ultrastructural characteristics.

BE frequently is the subject of diagnostic investigations because the violation of barrier functions of buccal epithelium result in development of pathological processes. BE is exposed constantly to mechanical injuries, to the influence of a wide range of temperature and pH variation, and to toxic and harmful substances.

Support of the integrity and barrier properties of epithelium is secured by the following processes:
1. regeneration—continuous formation of cells in basal layer, due to fission of low differentiated precursors;
2. differentiation—changes in morphofunctional properties of cells, with simultaneous shifting to upper layers;
3. desquamation—elimination of cells that are damaged and contain microbes on their surfaces (keratinized scales) from the surface of the epithelium.

Fissionable cells that synthesize DNA in buccal epithelium can be found in the basal layer and to some extent also in the lower sections of the spinous layer, clustering at the bottom of the epithelial ridges. The proliferating pool typically is 9.8 percent of the total and increases proportionally to the degree of dysplasia, during the pre-tumor and tumor processes. The reconstruction rate of epitheliocytes in non-keratinized BE is, as a rule, higher than in the keratinized. The renewal period of epithelium in gums is equal to 41-57 days, 10-12 days in hard palate and 25 days in cheeks (10-14 or even 5-9 days according to some sources). The renewal rate of BE increases sharply when it is subjected to trauma, irritating factors or certain diseases. The proliferating activity in BE is stimulated by the epidermal growth factor, interleukins 1 and 6, retinoic acid, hypophysical factors, and the transforming growth factor α. This activity is inhibited by chalones, adrenalin and transforming growth factor β.

To gain a better understanding of the nature of the processes in BE, it is important to examine the metabolic properties of cells. Of special importance is the histochemical representation of the localization and content of enzymes, particularly phosphorylase and succinate dehydrogenase. Phosphorylase is instrumental in the interchange of glycogen, causing its inverse disintegration with the formation of glucose-1-phosphoric acid. Succinate dehydrogenase, one of the most important acidic enzymes of the Krebs cycle, is strongly fixed in the mitochondria of cells that take part in the processes of intra-cellular breathing. High activity of succinate dehydrogenase occurs in the cells of basal and spinous layers of BE.

Different regions of epithelium can be distinguished by their character with respect to metabolic processes. The decrease in the number of mitochondria and the reduction of succinate dehydrogenase on the surface of spinous layers can be explained by the prevalence of anaerobic acidic processes. The distribution of phosphorylase in BE is closely connected with the location of deposition of glycogen, in whose synthesis and resynthesis the enzyme takes part. The content of glycogen changes with age. The highest amount of glycogen is found in children up to the age of one year, and in persons aged 25 to 50. At other age levels its amount is insignificant, and after age 70 glycogen appears only in some epitheliocytes.

5.2 Structural Organization of Genetic Material in Interphase Nuclei

To understand the function of the cell's genome functions requires knowledge of the regularities and principles of structural organization of the chromatin in interphase nuclei.

The concept "chromatin" was introduced by investigators in their study of interphase nuclei of cells of higher animals, carried out under a light microscope. As used herein, the term "chromatin" refers to the complex of two classes of albumins (histone and non-histone) of chromosomes, which contain nuclear DNA of cells of eukaryotes.

The most studied are structural albumins of chromosomes, in particular, histones that are characteristic of eukaryotic cells only. Results of electron microscope imaging, combined with cytological and biochemical studies, show that chromatin, similarly to metaphase chromosomes, consists primarily of deoxynucleproteidic complex. To designate chromatin of various density, the following terms are used: heterochromatic and euchromatic regions, heterochromatin and euchromatin. The terms "heterochromatin" and "euchromatin" reflect the transcriptional activity of cells, whereas terms "compact", "granular", "dense", "nongranular", and "decondensed", describe morphological properties of chromatin.

At present, chromatin is divided in two types:
1. Constitutive chromatin, which is located at the same sites of two homological chromosomes. It contains highly specialized genes that function in certain periods of ontogenesis. The constitutive heterochromatin plays an important part in the process of cell differentiation.
2. Facultative chromatin, which is located in one of the homological chromosomes and is a spiral euchromatin. Its molecular content does not differ from the constitutive type. Facultative heterochromatization can occur in any site of the chromosomes during the cell cycle.

The existence of a third kind of heterochromatin, which is intermediate between heteroand euchromatin, was suggested by S. W. Brown. The heterochromatin of the Y-chromosome of a guinea pig may serve as an example.

It is believed that condensed granularly-packaged structures behave as genetically more inert systems. Diffusive non-condensed structures, located in the center of the nucleus, constitute the genetically active part of the genome. A certain part of chromatin condenses into heterochromatin in all cells of the organism (constitutive heterochromatin).

During mitosis, constitutive chromatin appears in the form of blocks of C-chromatin on chromosomes 19, 1, 6, 16, and later on chromosomes 2, 8, 9, 4. The majority of constitutive heterochromatin contains series of simple, dual sequences (satellite DNA).

As a rule, it is not possible to distinguish between constitutive and facultative chromatin using traditional methods of analysis of interphase nuclear architectonics. However, new techniques have appeared (use of the G-method, staining by ethylene blue and preceded by acid hydrolysis 1N HCl) that allow detection of constitutive chromatin.

Various new approaches have been considered for estimating the ordering of spatial organization of genetic material in interphase nuclei.

According to the latest classification, the chromatin of interphase nuclei has two forms:
1. Active chromatin is the part of chromatin that contains active genes and is in a decondensed state. It was proved that this chromatin is very sensitive to the action of the nuclease and, unlike heterochromatin, degrades at once. Also, it was established that the partial unwinding of two convolutions of the spiral of DNA takes place in the nucleosomes of active chromatin. These structural changes improve the effectiveness of transcription.
Active chromatin is characterized by special biochemical properties:
   a) histone H1 is not closely attached to the major part of the active chromatin;
   b) four histones that form nucleosomes are characterized by a high level of acetylating lysine remains that are arranged along amides of these proteins. Acetyl groups are joined to them with the help of the enzyme of histone acetylase and are released by histone deacetylase;
   c) nucleosomes in the active chromatin connect two similar chromosomal albumins, HMG14 and HMG17. These albumins exist only in active chromatin and are characterized by their conservation of amino acid sequences.
Each of the above properties can play an important role in the deployment of chromatin for transcription, but they still need to be confirmed experimentally.
2. Heterochromatin is a part of chromatin that, unlike active chromatin, is more condensed and inactive to transcription. In mammals and some other higher eukaryotes, DNA surrounding the centromere contains simple recurrent nucleotide sequences. It is precisely such "satellite DNA's" that make the main body of heterochromatin in these organisms.

On the basis of data from stereoscopic studies, it was established that there is an interrelation between chromatin of interphase cells and the nuclear matrix, which plays an important role in the processes of replication and transcription of a genetic system. Also, it was discovered that in a complex with a nuclear matrix, there exists a replicating DNA and the sites of a genome that are actively transcribed.

5.2.2 Malignancy-Associated Changes in Buccal Epithelium

A number of diseases of internal organs are accompanied by changes in BE, which may occur prior to other clinical symptoms of the disease. Nowadays, it is accepted that pathological changes in BE are connected with diseases of various organs as well as disturbances in exchange processes, including hormonal exchange, and conditions of the nervous and immune systems. Significant changes in BE can be observed also during puberty, at pregnancy, after castration, and during climax. Macro- and microscopical changes of BE appear in clinical and experimental studies upon introduction of estrogens, use of hormonal contraceptives, and androgens. During menopause, patches of leukoplakia may appear in BE, which has been related to a change in the production of sexual steroid hormones in the late decades of a woman's life. Also, BE undergoes changes as a result of disturbances in the vitamin balance or metabolism. Since BE has a large concentration of receptors which receive and transmit disturbances from external and internal environment, the interrelation between BE and the function of peripheral and central nervous systems is of particular importance. Indeed, it has been shown that it is precisely through the nervous and vascular systems that the interrelations between BE and internal organs is implemented.

As a rule, symptomatic irritation of BE is accompanied by diseases of the gastrointestinal tract. Etiologic and pathogenetic dependence has been noted between chronic nonspecific diseases of the respiratory system and BE. Especially distinct changes of BE were observed in children with acute pneumonia, manifested by trophic disturbances in epithelia. Changes in BE also are noted in cases of diseases of the urinary tract and the cardiovascular system.

The interrelation of BE with hematogenous organs is established as early as embryogenesis; therefore, pathological processes in various parts of BE often provide first indications of a disturbance in the hematogenous system. In acute leucosis, changes of BE are observed in 30-80% of patients. Similarly, in diffusive diseases of connective tissue, such as systemic dermatosclerosis or systemic lupus erythematosis, disturbances in BE also are observed.

Endocrinology diseases are quite complex with regard to the clinical manifestation of their effect on the functions of particular endocrine organs. This effect often is reflected in pathological changes in BE. For example, pathological changes in BE occur as a result of pancreatic diabetes. In the case of a chronic secondary disease, such as late complications in allogenic transplantation of marrow, damage to BE occurs in the form of heightened keratinization. Similarly, pathological changes in BE have been observed during the course of periodontal disease.

In recent years, the results from the analysis of cells of BE have been used under experimental clinical conditions to screen people for early forms of disease. This method is noninvasive and offers a convenient approach for screening large segments of the population with regard to their general condition. Some investigators have used the absence of electronegative nuclei in BE cells and the speed of the nuclei under micro-electrophoresis as indicators, to reveal the functional state of the individual, biological age, susceptivity to fatigue, impact of harmful environmental factors, and the condition of perodontium. Other investigators were able to obtain estimates of the genetic effects caused by environmental pollution, and also the genotoxicity of xenobiotics, by using a method based on the number of micronuclei in epitheliocytes. A heightened level of cells with micronuclei was detected in epithelial exfoliative cells of the oral cavity of patients suffering from various types of allergosis.

The increase in the level of micronuclei can be considered a "dosimeter" of various pathological states of the organism. When a person is subjected to the action of various genotoxic carcinogens and formaldehyde (due to smoking or chewing various mixtures of tobacco or betel) the proportion of exfoliative cells with micronuclei is increased by several orders of magnitude in comparison with the control population. Following chemotherapy or ionized irradiation, the proportion of micronuclei in the oral cavity of patients with oncological diseases is increased. For example, in parts of India where chewing of various carcinogenic substances is common, the level of micronuclei in exfoliative cells of the natives is increased. There is a strong correlation between the level of exfoliative cells containing micronuclei and the amount of other cytogenetic disturbances in the lymphocytes of peripheral blood (sisterly chromatid exchanges and chromosomal aberrations) in persons who are exposed to the action of the mutagens.

The state of chromatin and SH-groups has been used to estimate the degree of differentiation of cells of BE in cases of stomach and duodenum ulcer. The quantitative and functional state of BE is characterized by indices of maturity, intoxication, differentiation, and karyopyknotic index. Change in the nature of differentiation, which is typical for some area of BE, indicates local or systemic disturbances. The presence of cell atypism points, with high probability, to the development of pretumor and tumor changes in BE and, in 96% of cases, permits reliable diagnosis of these diseases by the cytological method. Changes in the differentiation of BE also can result from metabolic and hormonal disturbances, from the action of mechanical factors, and from chemical substances.

The idea has been suggested about the possibility of using quantitative cytospectrophotometry to detect changes linked to malignant growth, to diagnose such tumors (including cases of early forms of cancer) and to estimate the prognosis of the course of this process. B. Palcic et al. (1994) have reported that, with the help of quantitative cytological study of the content of DNA and the texture of chromatin in the nucleus, it is possible to reveal changes linked to the presence of malignancy, termed by H. Nieburgs (1995) "malignancy associated changes" (MAC). These changes appear in the normal cells of macroscopically unaltered areas located at some distance from the malignant tumor. Most likely, they originate as a reaction of normal cells to the growth caused by malignant transformation in a particular organ (lungs, cervix, mammary gland). Based on research data, it was hypothesized that changes connected with tumors are evidenced clearly in the vicinity of malignant tumors, but only weakly, or not at all, near tumors not characterized by progressive growth. Upon removal of the tumor, changes linked to malignancy disappeared; incomplete removal, however, had no influence on these changes.

In the 1960s many studies were done concerning the content of X-chromatin in somatic cells, which revealed its labile property under various functional changes and general somatic pathology in the organism. In the presence of a tumor in the organism one observes significant changes in the content of X-chromatin in BE and in the neutrophils of peripheral blood. It was demonstrated that changes in the quantity of cells with X-chromatin are conditioned by disturbances of the functional state of heterocyclic X-chromosome.

Of particular interest were studies showing changes in the epitheliocytes of BE in patients who had tumors. Thus in 1962, H. Nieburgs et al. reported on a characteristic redistribution of chromatic masses in the somatic cells of 77% of oncological patients, and called these changes malignancy-associated changes (MAC). The cells were characterized by increased dimensions of the nuclei of epitheliocytes, increased dimensions of the zones of "bound" chromatin which were surrounded by bright zones. The same changes were observed in the cells of liver, kidneys, and other organs.

E. Obrapalska et al. (1962) reported evidence of MAC in buccal epithelium in 74% of the patients with malignant tumors. Similar changes in the cells of BE were evident in the presence of pre-tumor and tumor processes in the organism. Increase in the content of DNA was observed in the nuclei of epitheliocytes of patients with malignant melanomas, compared with healthy women. At the same time, decrease in the number of chromatinpositive cells (X-chromatins) was found in malignant melanoma patients, compared with patients having benign nevi and in control patients. Women with breast cancer were reported to have an increased content of DNA and an increase in the size of interphase nuclei of BE. However, some authors reported no significant difference in DNA content in BE epitheliocytes of men with epithelioma of bronchi, as compared with healthy men, based on cytospectrophotometric determination of this index.

Trials have been performed on the feasibility of using changes in BE to characterize the influence of a tumor on the state of BE. Ogden et al. (1974) did a study to characterize and substantiate the possibility of tumor influence on the functional state of BE. The objective was to obtain data for characterizing the processes that occurred in the organs that were distant from a tumor, and to discover a pattern in these processes. The study showed disturbances in BE, which were characterized by changes in the nuclear material, heterogeneity of chromatic substances, and changes of nuclear membranes. These disturbances occurred in 77% of patients who had tumors in various locations (carcinomas, lymphomas). The criteria for estimating the malignancy-associated changes in the above study was based on cytophotometric investigations of the content of DNA, dimensions of nuclei and cytoplasm of tumor cells, and the character of the distribution of chromatin in the nuclei. Although the authors were unable to identify specific patterns associated with the tumor process (except for increased nuclear size of tumor cells and change in the nuclearcytoplasmic ratio), their study did not rule out the possibility that the observed disturbances could be related to the influence of tumors on the functional state of buccal epithelium.

Traditional methods of genetic analysis of DNA genome are based on blood analysis. In the last few years, methods based on the analysis of cells of BE have become prevalent. It was observed that in benign hyperplastic processes there is a significant increase in the quantity of Langerhans cells, compared with normal BE, whereas in malignant tumors the quantity of cells decreases rapidly with decrease in the level of their differentiation.

The need for reliable and non-invasive tools for early detection and diagnosis of both benign and malignant disorders continues to be unmet.

5.3 Computer-Aided Diagnosis of Tumors: Principles and Techniques

Morphological changes or disturbances in the functioning of interphase nuclei of cells provide key links in the process of cell adaptation and ontogenesis, as well as in early (preclinical) stages of pathogenesis of many diseases. The initial effect of this information takes place in the chromatin of interphase nuclei of cells, one of whose important characteristics is structural organization. Hence, finding the characteristics of interphase nuclei of cells offer the possibility of evaluating functional changes of the genetic apparatus of cells. Moreover, indicators of structural organization of chromatin may be utilized as markers of these disturbances, under various pathological states of the organism, including the presence of tumors.

Of great importance to the understanding of the structural-functional organization of a genome are the topoisomerases found in the nuclear matrix, which create single- and double-stranded discontinuities in DNA. Topoisomerase is localized on DNA sites, which are complexly linked with the nuclear matrix. Also located there is RNA-polymerase II, which takes part in transcription, and the molecules of DNA-polymerase.

The sites of DNA that correspond to places of initiation of replication are associated with the nuclear matrix during the whole period of the cell cycle. Thus, the marker which is associated with DNA during the S-period remains associated with the matrix during G 2-phase and in S-period of the next cycle. The forks of replication, which are linked with the nuclear matrix in the S-period, are freed from it after completion of replication.

The chromosomes are arranged in interphase and metaphase by direct DNA-albumin interactions and interrelations with the matrix elements of the nucleus.

Investigations of computer-aided methods of cancer diagnosis primarily have been based on of morphological and densiometric indexes of interphase nuclei of buccal epithelial cells.

5.3.1 Morpho- and Densitometric Parameters of Buccal Epithelium

Scanning cytospectrophotometers and image analyzers are used widely to evaluate the functional state of a cell and its components and, most of all, to study the morphology of chromatin of interphase nuclei. Various analytic techniques have been proposed for processing and estimating digital images of interphase chromatin, which include finding distinct features of chromatin structure and using statistical indicators.

The scanning method allows quantitave analysis of the texture and spatial distribution of the cell's genetic material, which depends on the biophysical properties of DNA and can be detected by a stochiometric reaction with an acridine orange or Feulgen stain. To obtain quantitative data, the following cytospectrophotometers commonly are used: MCFU-2MT (LOMO, Russia), "Protva" (Pushkino, Russia), OCM, MAX-1000 (Nizhni Novgorod, Russia), Videotest (St. Petersburg, Russia) as well as "Axiomat-100", "Axiomat-200" (Zeiss, Germany), SMP-0,1, SMP-0,5 ("Opton"), Optiphot (Nikon, Japan), and also whole systems with computer maintenance—Cyto-Savant System (Canada), FACS-can flow cytometry (Becton, USA), CYDOK (Carl H. Hilgers, Germany), CAS 200. Depending on the problems posed, and technical capability of the hardware used under specific conditions, the primary information, or so-called "portrait of a cell", may be presented as a digital matrix, as a half-tone or pseudocolor topogram, or as a pseudorelief. The data then undergoes mathematical processing and the construction of histograms and contourgrams, which allow taking into account the characteristics of the cell on the basis of morpho- and densitometric parameters that characterize the structural features of the nucleus and chromatin.

Cytospectrophotometric analysis of an interphase nucleus provides morpho- and densitometric parameters, which characterize various structural elements of chromatin and its textural features. Morphometric parameters give information concerning the area, volume, perimeter, diameter, and shape (ellipse/sphere and perimeter/area), and provide a number of indices that characterize the chromatin substance of the nucleus (quantity of granules, their size, spacing between granules, and other related indices). Densitometric parameters characterize the minimum, maximum, mean and integral optical density of the nucleus as a whole, and are concerned primarily with a specific granular or non-granular structure. The number of these parameters can be quite large (under one hundred). The main focus is directed on a comprehensive analysis of structural features of chromatin, which characterize the more condensed areas of an interphase nucleus (namely, the over-spiral segment of DNA strands). To register the contrast of nuclear texture and the level of condensation of chromatin, a number of coefficients and parameters have been proposed, that objectively reflect the heterogeneity of the absorbing material. Besides conventional parameters, a number of coefficients have been used which are described (see Fukushima, N., et al., *Jpn. J Cancer Res.* 88(3):328-333, 1997; Weyn, B., et al., *Cytometry.* 35(1):23-29, 1999; Avtandilov, G. G., et al., *Klin. Labor. Diagnostika.* 10:34-35, 1997). Textural indicators seem to have been neglected and, as a result, their parameters have hardly been investigated to date (see Knychalska-Karwan, Z., and Szafraniec J. *Czasop. Stomatol.* 23(6):715-720, 1970; Ogden, G. R., et al., *Cancer.* 65(3):477-480, 1990; Zhukotsky, A. V., et al., *Biophyzika.* 5921:83, 1983; Doudkine, A. K., et al., *Pathologica.* 87(2):286-299, 1995).

Among the most sensitive indicators of structural changes in heterochromatin are the following: area of the cell nucleus, coefficient of variation of integral optical density, proportion of condensed chromatin, ratio of the square of the sum of all perimeters to the overall area of all chromatin granules, and the relative amounts of mean density chromatin in parts of the nucleus.

Parameters used in the characterization of a cell should be able to characterize many aspects of the cell. However, the majority of investigations until now were devoted to morphological or densitometrical parameters only.

Recent advances in sampling theory have provided the mathematical basis for multi-scale image processing with new analyzing functions and effective algorithms for the purpose of determining the parameters of chromatin texture in the diagnostics and classification of invasive breast cancer (Aubele, M., et al., *Int. J Cancer,* 63(1):7-13, 1995). The sampling index was introduced as an indicator of chromatin texture in semiautomatic classification of textural and densito-morphological indicators. The sampling indices were compared with classic morphological and densitometric indicators and parameters of adjacency, which at present provide the most complete characterization of the texture of chromatin. Every nucleus utilized three densitometric parameters (integral optical density, mean optical density, standard deviation of optical density); eleven morphometric parameters (area, perimeter, compactness, mean, elliptical, maximum and minimum diameters, ratio of lengths of sides, circular factor, dimensionality, symmetry factor) and fourteen textural parameters (5 impulse parameters and 9 adjacency parameters). Testing was accomplished with the help of the automated diagnostic and classification method, based on K-nearest neighbor (Knn) classification, which surpasses classic statistical techniques. In the classification of benign and malignant tumors of the mammary gland, using densitometric parameters and sampling indices, the level of recognition was 76.1% for individual cells and 100% for the entire population of cells, which is higher than that reported in other studies (Leel-Ossy, L., et al., *Clin. Neuropathol.* 16(5):273, 1997; Poulin, N., et al., *Cytometry,* 16(3):227-235, 1994).

5.3.2 Modern Cytometric Methods

Of particular theoretical and practical importance are the papers on mathematical simulation and development of effective algorithms of pattern recognition (see Stein, G. I., et al., *Tsitologiya.* 40(10):913-916, 1998; Wolberg, W. H., et al., *Arch. Surg.* 130(5):511-517, 1995; Dufer, Y., et al., *Biomed. Pharmacother.* 47(2):131-135, 1993; Andrushkiw, R. L., et al., *Nonlinear Analysis.* 30:5431-5436, 1997). Based on the analysis of current literature, several directions in computer image processing can be identified: measurement techniques (manual or semiautomatic data gathering, and fully automated measurements); three-dimensional graphic reconstruction of serial microscopic sections; digital image filtration. There is a large variety of devices designed for digital image processing. In biological research, image analyzers are widely applied and make use of television and computer technology. The software of such systems allows the crawling and dark currents of the camera to be taken into account, to enhance the visual quality of the images, to make cuts according to brightness, to compare images with one another, and to automatically join them together. Furthermore, the system is capable of obtaining a complex of morphometric, stereological, and photometric parameters; to perform analysis of their changes over time; to do statistical processing of the obtained data with construction of tables, histograms, and charts. The technical progress, connected with the improvement in microscopic, television, and computer technology has become the basis for the creation of photometric image analyzers of micro and macro objects, which are applied in medicine. The method of obtaining morphometric and densitometric parameters, which characterize morphofunctional properties of cells on the basis of cytospectrophotometric analysis, is called computer microtelephotometry (see Stein, G. I., et al., *Tsitologiya.* 40(10):913-916, 1998).

Modern cytometric methods may vary, depending on different ways of staining chromatin regions, differences in computer techniques in digital image processing, and differences in videomicroscopy. These methods enable the solution of complicated scientific problems by studying the chromatin and heterochromatin of the nucleus as indicators of the functional state of the cells and the condition of their genetic apparatus. The spatial characteristics of DNA patterns also contain information that is indispensable for early detection and prognosis of many diseases, including those connected with disturbance of cell structures in various systems of the organism, and various types of cancer. Parametric changes in the spatial distributions of chromatin and the geometry of chromatin regions in normal and tumor cells may reflect changes in active regions of genes. Quantitative measurements of spatial arrangement of DNA in the nuclei of these cells make it possible to receive new data about the genomes of higher organisms.

Using cytometric methods a step forward may be taken in this direction by getting a wide spectrum of measurements of various characteristics of cells, including the sizes and form of nuclei, the DNA content in the nuclei of cells, and the geometrical and structural properties associated with the spatial distribution of chromatin. Currently, one can find in the literature more than 100 different descriptors, used in the analysis of the properties of the nuclei and chromatin as indicators to characterize cytogenetic structural elements (see Andrushkiw, R., et al., *Computer-Aided Cytogenetic Method of Cancer Diagnosis*, Nova Science Publishers, Inc., 1$^{st}$ ed., 2007, incorporated in its entirety herein by reference). Cytometric methods may facilitate the construction of information systems for automated treatment, collection and statistical analysis of cytogenetic data, as well as for structural analysis of the characteristics of interphase condensed chromatin and evaluation of the functional state of genome of cells.

Advances in the development of more effective algorithms of pattern recognition, together with improvements in scanning methods, hold great promise for the future. These methods, in combination with electron-microscopic, molecular-biological, cytogenetic, and biochemical techniques, may create the capacity to learn more about the nature, pattern, and topology of DNA arrangement in the cell, and open new opportunities for the study and understanding of the connection between morphological features of the cell and changes in the functioning of the genome. This has great significance in applications of oncology to differential diagnostics of pre-tumor processes, and differential diagnosis of benign and malignant tumors.

The present invention provides methods for differential diagnosis of malignant neoplasms and benign processes, utilizing RGB-image analysis of malignancy-associated changes of DNA in the nuclei of buccal epitheliocytes.

6. Red-Green-Blue (RGB) Color Model

The red-green-blue (RGB) color model is an additive color model in which red, green, and blue light are added together in various ways to reproduce a broad array of colors.

The term "color" as used herein refers to the quality of an object or substance with respect to light reflected or absorbed by the object or substance. The three characteristics of color are hue, intensity, and value. "Hue" refers to a gradation, tint, or variety of a color. "Intensity", "chroma", and "saturation" are used interchangeably to refer to the strength or sharpness of a color. A color is full in intensity only when pure and unmixed. "Value" refers to a degree of lightness or darkness in a color.

The RGB color model primarily is utilized for the sensing, representation, and display of images in electronic systems, such as televisions and computers, although it has also been used in conventional photography.

RGB is a device-dependent color space. Different devices detect or reproduce a given RGB value differently, since the color elements (such as phosphors or dyes) and their response to the individual R, G, and B levels vary from manufacturer to manufacturer, or even in the same device over time. Thus some kind of color management of a RGB value is used to define the same color across devices.

Typical RGB input devices are color TV, video cameras, image scanners, and digital cameras. Typical RGB output devices are TV sets of various technologies (CRT, LCD, plasma, etc.), computer and mobile phone displays, video projectors, multicolor LED displays, and large screens as JumboTron, etc. Color printers, on the other hand, are usually not RGB devices, but subtractive color devices (typically CMYK color model).

Additive Primary Colors

Three colored light beams (one red, one green, and one blue) must be superimposed (for example by emission from a black screen, or by reflection from a white screen) to form a color with RGB. Each of the three color light beams is referred to as a component of that color, and each beam can have an arbitrary intensity, from fully off to fully on, in the mixture.

The RGB color model is additive in the sense that the three colored light beams are added together, and their light spectra add, wavelength for wavelength, to form the final color's spectrum.

The darkest color (no light, considered the black) results from zero intensity for each component. Full intensity of each component results in a white. The quality of this white depends on the nature of the primary light sources, but when properly balanced, the result is a neutral white matching the system's white point. When the intensities for all the components are the same, the result is a shade of gray, darker or lighter depending on the intensity. When the intensities are different, the result is a colorized hue, more or less saturated depending on the difference of the strongest and weakest of the intensities of the primary colors employed.

When one of the components has the strongest intensity, the color is a hue near this primary color (reddish, greenish, or bluish), and when two components have the same strongest intensity, then the color is a hue of a secondary color (a shade of cyan, magenta or yellow). A secondary color is formed by the sum of two primary colors of equal intensity: cyan is green+blue, magenta is red+blue, and yellow is red+green. Every secondary color is the complement of one primary color; when a primary and its complementary secondary color are added together, the result is white; cyan complements red, magenta complements green, and yellow complements blue.

The RGB color model itself does not define what is meant by red, green, and blue calorimetrically, thus the results of mixing them are not specified as absolute, but relative to the primary colors. When the exact chromaticities of the red, green, and blue primaries are defined, the color model then becomes an absolute color space, such as sRGB or Adobe RGB.

Physical Principles for the Choice of Red, Green, and Blue

The choice of primary colors is related to the physiology of the human eye. Good primaries are stimuli that maximize the difference between the responses of the cone cells of the human retina to light of different wavelengths, and that thereby make a large color triangle.

The normal three kinds of light-sensitive photoreceptor cells in the human eye (cone cells) respond most to yellow (long wavelength or L), green (medium or M), and violet (short or S) light (peak wavelengths near 570 nm, 540 nm and 440 nm, respectively). The difference in the signals received from the three kinds of cells allows the brain to differentiate a wide gamut of different colors, while being most sensitive (overall) to yellowish-green light and to differences between hues in the green-to-orange region.

For example, suppose that orange light (approximately 577 nm to 597 nm) enters the eye and strikes the retina. These wavelengths would activate both the medium and long wavelength cones of the retina to a different extent—the long-wavelength cells will have a greater response. The difference in the response may be detected by the brain and associated with the concept that the light is orange. In this example, the orange appearance of objects is simply the result of light from the object entering the eye and stimulating the relevant kinds of cones simultaneously but to different degrees.

Use of the three primary colors is not sufficient to reproduce all colors; only colors within the color triangle defined by the chromaticities of the primaries may be reproduced by additive mixing of non-negative amounts of those colors of light.

RGB Devices

RGB and Displays

One common application of the RGB color model is the display of colors on a cathode ray tube (CRT), liquid crystal display (LCD), plasma display, or LED display such as a television, a computer's monitor, or a large scale screen. Each pixel on the screen is built by driving three small and very close but still separated RGB light sources. At common viewing distance, the separate sources are indistinguishable, which tricks the eye to see a given solid color. All the pixels together arranged in the rectangular screen surface conforms the color image.

During digital image processing each pixel can be represented in the computer memory or interface hardware (for example, a graphics card) as binary values for the red, green, and blue color components. When properly managed, these values are converted into intensities or voltages via gamma correction to correct the inherent nonlinearity of some devices, such that the intended intensities are reproduced on the display.

Video Framebuffer

A framebuffer is a digital device for computers which stores in the so-called video memory (conformed by an array of Video RAM or similar chips) the digital image to be displayed on the monitor. Driven by software, the central processing unit (CPU), or other specialized chips, write the appropriate bytes in the video memory to conform the image sent by an electronic video generator to the monitor. Modern systems encode pixel color values by devoting some bits groupings for each of the RGB separate components. RGB information can be either carried by the pixel bits themselves or in a separate Color Look-Up Table (CLUT) if indexed color graphic modes are used.

By using an appropriate combination of red, green, and blue intensities, many colors can be displayed. Current typical display adapters use up to 24-bits of information for each pixel: 8-bit per component multiplied by three components. With this system, 16,777,216 (256³ or 2²⁴) discrete combinations of R, G and B values are allowed, providing thousands of different (though not necessarily distinguishable) hue, saturation, and lightness shades.

Nonlinearity

Gamma Correction

In classic cathode ray tube (CRT) devices, the brightness of a given point over the phosphorescent screen due to the impact of accelerated electrons is not proportional to the voltage applied to electrons in their RGB electron guns, but to an expansive function of that voltage. The amount of this deviation is known as its gamma value (γ), the argument for a power law function, which closely describes this behavior. A linear response is given by a gamma value of 1.0, but actual CRT nonlinearities have a gamma value around 2.0 to 2.5.

Similarly, the intensity of the output on TV and computer display devices is not directly proportional to the R, G, and B applied electric signals (or file data values which drive them through Digital-to-Analog Converters (DAC)). On a typical standard 2.2-gamma CRT display, an input intensity RGB value of (0.5, 0.5, 0.5) only outputs about 22% of that when displaying the full (1.0, 1.0, 1.0), instead of at 50%. A gamma correction is used in encoding the image data to obtain the correct response, and possibly further corrections may be part of the color calibration process of the device. Gamma affects black-and-white TV as well as color. In standard color TV, signals are already broadcast in a gamma-compensated fashion by TV stations.

Display technologies different from CRT (such as LCD, plasma, LED, etc.) may behave nonlinearly in different ways. When intended to display standard TV and video shows, displays are built in a such way that they behave in gamma like an older CRT TV monitor. In digital image processing, gamma correction can be applied either by the hardware or by the software packages used.

Other input/output RGB devices also may have nonlinear responses, depending on the technology employed. Nonlinearity (whether gamma-related or not) is not part of the RGB color model in itself, although different standards that use RGB can also specify the gamma value and/or other nonlinear parameters involved.

Numeric Representations

A color in the RGB color model may be described by indicating how much of each of the red, green, and blue is included. The color may be expressed as an RGB triplet (r,g,b), each component of which can vary from zero to a defined maximum value. If all the components are at zero the result is black; if all are at maximum, the result is the brightest representable white.

These ranges may be quantified in several different ways: a) from 0 to 1, with any fractional value in between; this representation is used in theoretical analyses, and in systems that use floating-point representations; b) each color component value also may be written as a percentage, from 0% to 100%; c) in computing, the component values are often stored as integer numbers in the range 0 to 255, the range that a single 8-bit byte may offer (by encoding 256 distinct values); and d) high-end digital image equipment may deal with the integer range 0 to 65,535 for each primary color, by employing 16-bit words instead of 8-bit bytes.

For example, the full intensity red is written in the different RGB notations (Table 4) as:

TABLE 4

| Notation | RGB triplet |
|---|---|
| Arithmetic | (1.0, 0.0, 0.0) |
| Percentage | (100%, 0%, 0%) |
| Digital 8-bit per channel | (255, 0, 0) |
| Digital 16-bit per channel | (65535, 0, 0) |

In many environments, the component values within the ranges are not managed as linear (i.e., the numbers are non-linearly related to the intensities that they represent), as in digital cameras and TV broadcasting and receiving due to gamma correction, for example. Linear and nonlinear transformations often are dealt with via digital image processing. Representations with only 8 bits per component are considered sufficient if gamma encoding is used, but sometimes even 8-bit linear is used.

Geometric Representation

Since colors usually are defined by three components, not only in the RGB model, but also in other color models such as, for example, CIELAB and Y'UV, then a three-dimensional volume is described by treating the component values as ordinary cartesian coordinates in a euclidean space. For the RGB model, this is represented by a cube using non-negative values within a 0-1 range and assigning black to the origin at the vertex (0, 0, 0), and with increasing intensity values running along the three axis up to white at the vertex (1, 1, 1), diagonally opposite black.

An RGB triplet (r,g,b) represents the three-dimensional coordinate of the point of the given color within the cube or its faces or along its edges. This approach allows computations of the color similarity of two given RGB colors by simply calculating the distance between them: the shorter the distance, the higher the similarity. Out-of-gamut computations can be performed this way, too.

Digital Representations

The RGB color model is the most common way to encode color in computing, and several different binary digital representations are in use. The main characteristic of all of them is the quantization of the possible values per component (technically a sample) by using only integer numbers within some range, usually from 0 to a some power of two minus one (2n-1) to fit them into some bit groupings.

As usual in computing, the values may be represented either in decimal and in hexadecimal notation as well, as is the case of HTML colors text-encoding convention.

The 24-Bit RGB Representation

RGB values encoded in 24 bits per pixel (bpp) are specified using three 8-bit unsigned integers (0 through 255) representing the intensities of red, green, and blue. This representation is the current mainstream standard representation for the so-called truecolor and common color interchange in image file formats such as JPEG or TIFF. It allows more than 16 million different combinations (hence the term "millions of colors" some systems provide for in this mode), many of them indistinguishable to the human eye.

The above definition uses a convention known as full-range RGB. Color values also are often scaled from and to the range 0.0 through 1.0. Specially they are mapped from/to other color models and/or encodings. The 256 levels of a primary usually do not represent equally spaced intensities, due to gamma correction. Neither an exact mid point, for example, 127.5, nor other non-integer values, can be offered as bytes do not hold fractional values, so these need to be rounded or truncated to a nearby integer value. For example, Microsoft considers the color "medium gray" to be the (128,128,128) RGB triplet in its default palette. The effect of such quantization (for every value, not only the midpoint) is usually not noticeable, but may build up in repeated editing operations or colorspace conversions. Typically, RGB for digital video is not full range. Instead, video RGB uses a convention with scaling and offsets such that (16, 16, 16) is black, (235, 235, 235) is white, etc. For example, these scalings and offsets are used for the digital RGB definition in the CCIR 601 standard.

Beyond the 24-Bit RGB

32-Bit Graphic Mode

The so-called 32 bpp display graphic mode is identical in precision to the 24 bpp mode; there still are only eight bits per component, and the eight extra bits often are not used at all. The reason for the existence of the 32 bpp mode is the higher speed at which most modern 32-bit (and better) hardware may access data that is aligned to byte addresses evenly divisible by a power of two, compared to data not so aligned.

32-Bit RGBA (RGB Plus Alpha Channel)

With the need for compositing images came a variant of 24-bit RGB which includes an extra 8-bit channel for transparency, thus resulting also in a 32-bit format. The transparency channel commonly is known as the alpha channel (thus the format is called RGBA). Since it does not change anything in the RGB model, RGBA is not a distinct color model, it is only a representation that integrates transparency information along with the color information. This extra channel allows for alpha blending of the image over another, and is a feature of the PNG format.

48-Bit RGB

High precision color management typically uses up to 16 bits per component, resulting in 48 bpp. This makes it possible to represent 65,536 tones of each color component instead of 256. This primarily is used in professional image editing, such as, for example, Adobe Photoshop, for maintaining greater precision when a sequence of more than one image filtering algorithms is used on the image. With only 8 bits per component, rounding errors tend to accumulate with each filtering algorithm that is employed, distorting the end result. This is sometimes also called 16-bit mode due to the precision by component, not to be confused with 16-bit Highcolor which is a more limited representation.

Limited Representations Below 24-Bit RGB

RGB Arrangements for 8-Bit Indexed Color

Display adapters and image file formats using indexed-color techniques limit the simultaneously available colors per image up to 256, 8 bits per pixel. The selected colors are arranged into a palette, and the actual image pixels values do not represent RGB triplets, but mere indices into the palette, which in turn stores the 24-bit RGB triplets for every color in the image, so colors are addressed indirectly.

Every image may have its own color selection (or adaptive palette) when indexed color is employed. However, this scheme has the inconvenience that two or more indexed-color images with incompatible palettes cannot properly be displayed simultaneously where the 256-color limitation is imposed by the system's hardware. One solution is to use an intermediate master palette which comprises a full RGB selection with limited levels to the red, green, and blue components, in order to fit it at all within 256 color entries.

Usual limited RGB repertoires include 6×6×6 levels with 216 combinations, 6×7×6 levels with 252 combinations, 6×8×5 levels with 240 combinations and 8×8×4 levels with the full 256 combinations.

3-Bit RGB

The minimum RGB binary representation is 3-bit RGB, one bit per component. Typical for early color terminals in the 1970's, it is still used today with the Teletext TV retrieval service.

Colors in Web-Page Design

Web Colors

Colors used in web-page design commonly are specified using RGB. Initially, the limited color depth of most video hardware led to a limited color palette of 216 RGB colors, defined by the Netscape Color Cube. However, with the predominance of 24-bit displays, the use of the full 16.7 million colors of the HTML RGB color code no longer poses problems for most viewers.

In short, the web-safe color palette consists of the 216 combinations of red, green, and blue where each color can take one of six values (in hexadecimal): #00, #33, #66, #99, #CC or #FF (based on the 0 to 255 range for each value discussed above) (i.e., 6 cubed=216). These hexadecimal values=0, 51, 102, 153, 204, 255 in decimal, which=0%, 20%, 40%, 60%, 80%, 100% in terms of intensity. This seems fine for splitting up 216 colors into a cube of dimension 6. However, lacking gamma correction, the perceived intensity on a standard 2.5 gamma CRT/LCD is only: 0%, 2%, 10%, 28%, 57%, 100%. The majority of the colors produced are very dark.

The RGB color model for HTML was formally adopted as an Internet standard in HTML 3.2, however it had been in use for some time before that.

Color Management

Proper reproduction of colors, especially in professional environments, requires color management of all the devices involved in the production process, many of them using RGB. Color management results in several transparent conversions between device-independent and device-dependent color spaces (RGB and others, as CMYK for color printing) during a typical production cycle, in order to ensure color consistency throughout the process. Along with the creative processing, such interventions on digital images may damage the color accuracy and image detail, especially where the gamut is reduced. Professional digital devices and software tools allow for 48 bpp (bits per pixel) images to be manipulated (16 bits per channel), to minimize any such damage.

ICC-compliant applications, such as, for example, Adobe Photoshop, use either the Lab color space or the CIE 1931 color space as a Profile Connection Space when translating between color spaces.

RGB Model and Luminance-Chrominance Formats Relationship

All luminance-chrominance formats used in the different TV and video standards such as YIQ for NTSC, YUV for PAL, YDBDR for SECAM, and YPBPR for composite video use color difference signals, by which RGB color images may be encoded for broadcasting/recording and later decoded into RGB again to display them. These intermediate formats were needed for compatibility with pre-existent black-and-white TV formats. Also, those color difference signals need lower data bandwidth compared to full RGB signals.

Similarly, current high-efficiency digital color image data compression schemes such as JPEG and MPEG store RGB color internally in YCBCR format, a digital luminance-chrominance format based on YPBPR. The use of YCBCR also allows to perform lossy subsampling with the chroma channels (typically to 4:2:2 or 4:1:1 ratios), which it aids to reduce the resultant file size.

Early diagnosis and the use of screening methods focusing on the detection of pre-clinical stages of cancer and tumor development are important tools of cancer therapy.

The need for reliable and non-invasive tools for early detection and diagnosis of both benign and malignant disorders continues to be unmet.

Investigations of computer-aided methods of cancer diagnosis primarily have been based on of morphological and densiometric indexes of interphase nuclei of buccal epithelial cells.

The present invention provides novel algorithms for the detection of malignancy associated changes of buccal epithelial cells based on RGB analysis.

SUMMARY

In one aspect, the present invention provides a method for computer-aided diagnosis of breast cancer based on analysis of malignancy associated changes in buccal epithelium, the method comprising a first step (a) and a second step (b) wherein the first step (a) comprises: i) obtaining at least one training scanogram from a sample of buccal epithelium obtained from a patient with confirmed breast cancer or confirmed fibroadenomatosis; ii) for each training scanogram computing the ratio of model class volumes; iii) constructing a confidence region; iv) determining if a ratio of an investigated sample belongs to the confidence region, wherein if the ratio does belong, then I=1; and wherein the second step (b) comprises: i) computing a relief index; ii) constructing a confidence region; iii) such that if relief index of an investigated sample belongs to the confidence region, then J=1; wherein I and J are indicators; wherein if I=1 and J=1, then a breast cancer, else not breast cancer, and thereby determining a diagnosis of breast cancer based on the analysis. In one embodiment, the scanogram further comprises a digital image of interphase nuclei. In another embodiment, the interphase nuclei of the sample are stained. In another embodiment, the interphase nuclei is stained with a Feulgen staining method. In another embodiment, the investigated sample is a sample of buccal epithelium obtained from a patient potentially having a selected malignancy wherein the sample is not from diseased tissue. In another embodiment, the selected malignancy is breast cancer or fibroadenomatosis. In one aspect, the present invention provides a computer-controlled system comprising a digital imager that provides a scanogram of a cell, and an operably linked controller comprising computer-implemented programming implementing a method for computer-aided diagnosis of breast cancer based on analysis of malignancy associated changes in buccal epithelium, the method comprising a first step (a) and a second step (b) wherein the first step (b) comprises: a) obtaining at least one training scanogram from a sample of buccal epithelium obtained from a patient with confirmed breast cancer or confirmed fibroadenomatosis; b) for each training scanogram computing the ratio of model class volumes; c) constructing a confidence region; d) determining if a ratio of an investigated sample belongs to the confidence region, wherein if the ratio does belong, then I=1; and wherein the second step comprises: a) computing a relief index; b) constructing a confidence region; c) if relief index of an investigated sample belongs to the confidence region, then J=1; wherein I and J are indicators; wherein if I=1 and J=1, then a breast cancer, else not breast cancer, and whereby a diagnosis of breast cancer based on analysis of malignancy associated changes in buccal epithelium is determined. In one embodiment, the scanogram further comprises a digital image of interphase nuclei. In another embodiment, the interphase nuclei of the sample are stained. In another embodiment, the interphase nuclei is stained with a Feulgen staining method. In another embodiment, the investigated sample is a sample of buccal epithelium obtained from a patient potentially having a selected malignancy wherein the sample is not from diseased tissue. In another embodiment, the selected malignancy is breast cancer or fibroadenomatosis. In another aspect, the present invention provides a method for computer-aided breast cancer diagnosis, the method comprising the steps: a) obtaining a RGB-image of a scanogram from a sample of buccal epithelium obtained from a patient with confirmed breast cancer patient or confirmed fibroadenomatosis; b) computing 112 indexes, wherein the indexes comprise vector indexes and scalar indexes; c) constructing confidence ellipsoids for breast cancer and fibroadenomatosis on vector indexes; d) constructing confidence intervals of breast cancer and fibroadenomatosis on scalar indexes, wherein i) the number N of falling out of ellipsoids is computed, ii) if the number exceeds 1 then breast cancer, and iii) if (N+M for fibroadenomatosis <if N+M for breast cancer), then fibroadenomatosis; and wherein i) the number M of falling out of intervals is computed, ii) if the number exceeds 3, then breast cancer, iii) if (N+M for fibroadenomatosis $\geq$if N+M for breast cancer), then breast cancer, thereby determining a diagnosis of breast cancer or fibroadenomatosis. In one embodiment, the scanogram further comprises a digital image of interphase nuclei. In another embodiment, the interphase nuclei of the sample is stained with a Feulgen staining method. In another embodiment, the scanogram is from a patient potentially having a selected malignancy wherein the sample is not derived diseased tissue. In another embodiment, the selected malignancy is breast cancer or fibroadenomatosis. In another aspect, the present invention provides a computer-controlled system comprising a digital imager that provides a scanogram of a cell, and an operably linked controller comprising computer-implemented programming implementing a method for computer-aided breast cancer diagnosis, the method comprising the steps: a) obtaining a RGB-image of a scanogram from a sample of buccal epithelium obtained from a patient with confirmed breast cancer patient or confirmed fibroadenomatosis; b) computing 112 indexes, wherein the indexes comprise vector indexes and scalar indexes; c) constructing confidence ellipsoids for breast cancer and fibroadenomatosis on vector indexes; d) constructing confidence intervals of breast cancer and fibroadenomatosis on scalar indexes, wherein i) the number N of falling out of ellipsoids is computed, ii) if the number exceeds 1 then breast cancer, and iii) if (N+M for fibroadenomatosis <if N+M for breast cancer), then fibroadenomatosis; and wherein i) the number M of falling out of intervals is computed, ii) if the number exceeds 3, then breast cancer, iii) if (N+M for fibroadenomatosis $\geq$if N+M for breast cancer), then breast cancer, thereby determining a diagnosis of breast cancer or fibroadenomatosis. In one embodiment, the scanogram further comprises a digital image of interphase nuclei. In another embodiment, the interphase nuclei of the sample is stained with a Feulgen staining method. In another embodiment, the scanogram is from a patient potentially having a selected malignancy and the sample is not from a diseased tissue. In another embodiment, the selected malignancy is breast cancer or fibroadenomatosis. In another aspect, the present invention provides a method for the differential diagnosis of breast cancer and fibroadenomatosis, the method comprising the steps: a) measuring scanograms of interphase nuclei of samples of buccal epithelium obtained from a patient with confirmed breast cancer patient or confirmed fibroadenomatosis; b) measuring scanogram indices; c) constructing a correlation matrix; d) finding numbers $N_{BC}$ and $N_{FAM}$ of falling out beyond the confidence intervals constructed for breast cancer and fibroadenomatosis, wherein BC=breast cancer and FAM=fibroadenomatosis; and e) making a diagnosis regarding the presence or absence of breast cancer or fibroadenomatosis. In one embodiment, the interphase nuclei of the samples are stained with a Feulgen staining method. In another embodiment, the scanogram is from a patient potentially having a selected malignancy wherein the sample is not derived from diseased tissue. In another embodiment, the scanogram is a training scanogram. In another embodiment, the training scanogram is a scanogram obtained from a patient with confirmed breast cancer or confirmed fibroadenomatosis. In another embodiment, the selected malignancy is breast cancer or fibroadenomatosis. In one aspect, the present invention provides a computer-controlled system comprising a digital imager that provides a scanogram of a cell, and an operably linked controller comprising computer-implemented programming implementing a method for the differential diagnosis of breast cancer and fibroadenomatosis, the method comprising the steps: a) measuring scanograms of interphase nuclei of samples of buccal epithelium obtained from a patient with confirmed breast cancer patient or confirmed fibroadenomatosis; b) measuring scanogram indices; c) constructing a correlation matrix; d) finding numbers $N_{BC}$ and $N_{FAM}$ of falling out beyond the confidence intervals constructed for breast cancer and fibroadenomatosis, wherein BC=breast cancer and FAM=fibroadenomatosis; and e) making a diagnosis regarding the presence or absence of breast cancer or fibroadenomatosis. In one embodiment, the interphase nuclei of the sample are stained with a Feulgen staining method. In another embodiment, the scanogram is from a patient potentially having a selected malignancy and the sample is not derived from diseased tissue. In another embodiment, the selected malignancy is breast cancer or fibroadenomatosis. In another embodiment, the scanogram is a training scanogram. In another embodiment, the training scanogram is a scanogram from a patient with confirmed breast cancer or confirmed fibroadenomatosis. In another aspect, the present invention provides a method for diagnosis of breast cancer and fibroadenomatosis, the method comprising the steps: a) obtaining scanograms from a sample of buccal epithelium from a confirmed breast cancer patient and/or a confirmed fibroadenomatosis patient; b) assigning a green component and a red component for each scanogram; c) finding the center; d) constructing concentric squares; e) computing the average p-statistics between the squares in breast cancer training samples and fibroadenomatosis training samples; f) finding minimal p-statistics and maximal p-statistics, wherein for an investigated scanogram, compute N(P), wherein if N(P)>0, then breast cancer; wherein if N(P)=0, then do not make any decision; wherein if N(P)<0, then fibroadenomatosis; thereby determining a diagnosis for breast cancer or fibroadenomatosis. In one embodiment, the scanogram further comprises a digital image of interphase nuclei from buccal epithelium. In another embodiment, the interphase nuclei is stained with a Feulgen staining method. In another aspect, the present invention provides a computer-controlled system comprising a digital imager that provides a scanogram of a cell, and an operably linked controller comprising computer-implemented programming implementing a method for diagnosis of breast cancer and fibroadenomatosis, the method comprising the steps: a) obtaining scanograms from a sample of buccal epithelium from a confirmed breast cancer patient and/or a confirmed fibroadenomatosis patient; b) assigning a green component and a red component for each scanogram; c) finding the center; d) constructing concentric squares; e) computing the average p-statistics between the squares in breast cancer training samples and fibroadenomatosis training samples; f) finding minimal p-statistics and maximal p-statistics, wherein for an investigated scanogram, compute N(P), wherein if N(P)>0, then breast cancer; wherein if N(P)=0, then do not make any decision; wherein if N(P)<0, then fibroadenomatosis; thereby determining a diagnosis for breast cancer or fibroadenomatosis. In one embodiment, the scanogram further comprises a digital image of interphase nuclei from buccal epithelium. In another embodiment, the interphase nuclei is stained with a Feulgen staining method.

DETAILED DESCRIPTION

Figure 1:
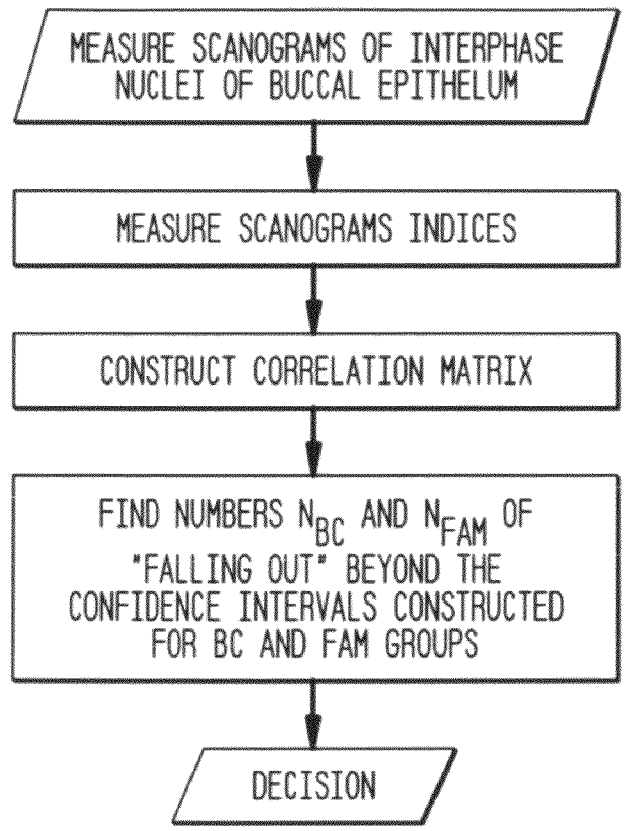
FIG. 1 shows a schematic diagram of the recognition algorithm.

The present invention provides methods for differential diagnosis of malignant neoplasms and benign processes, based on malignancy-associated changes of DNA in the nuclei of buccal epitheliocytes.

The terms "disease" or "disorder" as used herein refers to an impairment of health or a condition of abnormal functioning. The term "syndrome," as used herein, refers to a pattern of symptoms indicative of some disease or condition. The phrases "a patient having confirmed breast cancer" or "a patient having confirmed fibroadenomatosis" refer to patients with breast cancer or fibroadenomatosis whose diagnosis has been verified exactly by post-operative histological analysis of the ablated tumor. The term "training scanogram" as used herein refers to a sample of indexes of buccal epithelium obtained from a patient with confirmed breast cancer or confirmed fibroadenomatosis. Training scanograms may be used for comparison with a sample corresponding to an investigated patient (i.e., a patient whose diagnosis is under question). The terms "indicator" or "indicators" when used in describing indicator "I" and indicator "J" as used herein refer to a binary number. For example, indicator "I" is a binary number and may be 1 or 0. For example, indicator "J" is a binary number and may be 1 or 0.

Figure 4:
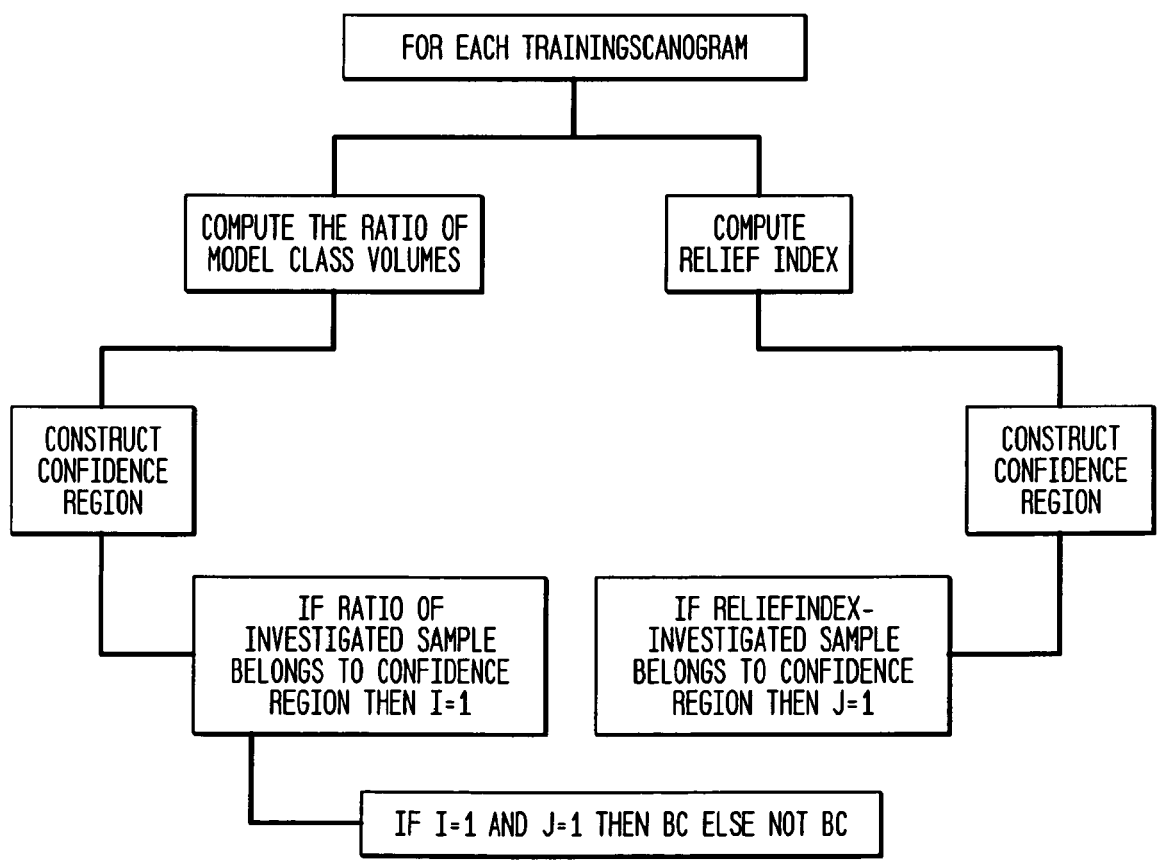
FIG. 4 shows a schematic diagram of new markers and decision rule.

In one aspect, a system for computer-aided diagnosis of breast cancer based on analysis of malignancy associated changes in buccal epithelium is provided. In another aspect, the present invention provides a computer-aided diagnosis method of breast cancer based on analysis of malignancy associated changes in buccal epithelium, the method comprising a first step (a) and a second step (b) wherein the first step (a) comprises: i) obtaining at least one training scanogram from a sample of buccal epithelium obtained from a patient with confirmed breast cancer or confirmed fibroadenomatosis; ii) for each training scanogram computing the ratio of model class volumes; iii) constructing a confidence region; iv) determining if a ratio of an investigated sample belongs to a confidence region wherein if the ratio does belong, then I=1; and wherein the second step (b) comprises: i) computing the relief index; ii) constructing a confidence region; iii) such that if relief index investigated sample belongs to confidence region then J=1, wherein I and J are indicators, wherein if I=1 and J=1, then breast cancer, else not breast cancer, and whereby a diagnosis of breast cancer based on analysis of malignancy associated changes in buccal epithelium is determined. In one embodiment, the scanogram further comprises a digital image of interphase nuclei. In another embodiment, the interphase nuclei of the sample are stained. In some such embodiments, the stain is from Feulgen staining. In another embodiment, the investigated sample is a sample of buccal epithelium obtained from a patient potentially having a breast cancer or fibroadenomatosis. In another embodiment, the investigated sample if from buccal epithelium. In another aspect, a computer-controlled system comprising a digital imager that provides a scanogram of a cell, and an operably linked controller comprising computer-implemented programming implementing a method for computer-aided diagnosis of breast cancer based on analysis of malignancy associated changes in buccal epithelium, the method comprising a first step (a) and a second step (b)

wherein the first step (a) comprises: i) obtaining at least one training scanogram from a sample of buccal epithelium obtained from a patient with confirmed breast cancer or confirmed fibroadenomatosis; ii) for each training scanogram computing the ratio of model class volumes; iii) constructing a confidence region; iv) determining if a ratio of an investigated sample belongs to a confidence region wherein if the ratio does belong, then I=1; and wherein the second step (b) comprises: i) computing the relief index; ii) constructing a confidence region; iii) such that if relief index investigated sample belongs to confidence region then J=1, wherein I and J are indicators, wherein if I=1 and J=1, then breast cancer, else not breast cancer, and whereby a diagnosis of breast cancer based on analysis of malignancy associated changes in buccal epithelium is determined. In one embodiment, the scanogram further comprises a digital image of interphase nuclei. In another embodiment, the interphase nuclei of the sample are stained. In some such embodiments, the stain is a result of Feulgen staining. In another embodiment, the investigated sample is a sample of buccal epithelium obtained from a patient potentially having breast cancer or fibroadenomatosis. FIG. 4 shows a schematic diagram of an algorithm of one embodiment of the present invention where new markers and decision rule are illustrated.

The term "confidence region" as used herein refers to a region to which the random value belong to given probability (confidence level).

To characterize the relief of the surface that corresponds to kth scanogram, the average slope of its slices with respect to the coordinates i and j is calculated:

$$R_k = \frac{1}{n^2}\left(\sum_{i=1}^{n}\sum_{j=1}^{n-1}|s_{i,j+1} - s_{i,j}| + \sum_{i=1}^{n-1}\sum_{j=1}^{n}|s_{i+1,j} - s_{i,j}|\right).$$

The relief index that characterizes a given patient is determined as the average of all scanograms $$R = \frac{1}{N}\sum_{k=1}^{N} R_k,$$

where N is the number of scanograms. By calculating the above indices for all scanograms from the training samples, we determine the corresponding confidence regions.

In some embodiments, two indicators, I and J, are used in place of the indicator "1" to facilitate the precise elucidation of the algorithm. The indicators I and J are binary numbers (0 or 1) so if I=1 and J=1 then a patient is diagnosed with breast cancer. The indicator I is equal to 1 if the ratio of modal class volumes belongs to corresponding confidence region and 0 otherwise, and J is an indicator (binary number) which is equal to 1 if relief index belongs to corresponding confidence region and 0 otherwise. So, if I=1 and J=1 then the point corresponding to a given patient belongs to the confidence region for breast cancer.

Statistical Investigation of Malignancy Associated Changes in Buccal Epithelium in the Case of Breast Cancer A description of a comparison of the indices characterizing the state of chromatin and DNA content in the epithelial cells of the mammary gland among themselves is provided. Women patients suffering from fibroadenoma, fibroadenomatosis, infiltrative lobular cancer, infiltrative ductal cancer, infiltrative ductal-lobular carcinoma, and scirrhus (see Kolosov et al. 1990) were considered. The number of patients and the number of cells taken from the mammary gland and from the buccal epithelium are shown in Table 4(i). Smears from various depths of the spinous layer were obtained (conventionally they were denoted as median and deep), after gargling and removing the superficial cell layer of the buccal mucous. The smears were dried under room temperature and fixed for 30 minutes in Nikiforov's mixture. Then, a Feulgen reaction was made with cold hydrolysis in 5 N HCl for 15 minutes, under temperature t=21-22° C. Optical density of the nuclei was registered by a cytospectrophotometer, using the scanning method with wave length 575 nm and probe 0.05 mcm. From 10 to 20 nuclei in each preparation were investigated. The DNA-fuchsine content in the nuclei of the epitheliocytes was defined as a product of density times area (in terms of conventional units). The scanograms obtained as a results of the investigations of the nuclei of the cells were analyzed by statistical methods.

TABLE 4(i)

Number of patients and cells taken for investigation

|  | Buccal epithelium | | Focus | |
| --- | --- | --- | --- | --- |
|  | Cells | Patients | Cells | Patients |
| Norm | 205 | 10 | 60 | 3 |
| Fibroadenoma (FA) | 120 | 6 | 130 | 6 |
| Fibroadnomatosis (FAM) | 220 | 11 | 220 | 11 |
| Infiltrative ductal cancer (IDC) | 260 | 13 | 260 | 13 |
| Infiltrative lobular cancer (ILC) | 180 | 9 | 180 | 9 |
| Infiltrative ductal-lobular cancer (IDLC) | 180 | 9 | 180 | 9 |
| Scirrhus | 80 | 4 | 88 | 4 |

The scanogram of the DNA distribution is a rectangular matrix $$R = \|r_{ij}\|_{i=\overline{1,m}}^{j=\overline{1,n}},$$

where $r_{ij}$ are values of pointwise optical density of chromatin in interphase nuclei of the cell expressed in terms of conventional unit of measure, and n,m are the numbers of points of the scanogram along vertical and horizontal axes, respectively. Usually the scanogram contains 8 or 9 rows and columns, hence it consists of 64 or 81 numbers (see Boroday, N., et al., *Exp. Oncol.* 26(2):158-160, 2004, incorporated in its entirety herein by reference).

For every scanogram, the following morpho- and densitometric indices that characterize the structural and textural peculiarities of chromatin are defined (see Kapantsyan et al 1988, Papayan et al 1982, Petunin et al 1990, Magakyan and Karalova 1989):

1. Area of nuclei.

$x_1$ is a number of the elements of the matrix R where $r_{ij} \geq 0.08$.

2. Area of condensed chromatin.

$x_2$ is a number of the elements of R where $r_{ij} \geq 0.35$.

4. Area of decondensed chromatin.

$x_3$ is a number of the elements of R where $0.08 \leq r_{ij} < 0.35$.

3. Area of strongly decondensed chromatin.

$x_4$ is a number of the elements of R where $0.08 \leq r_{ij} < 0.15$.

5. Specific area of condensed chromatin.

$$x_5 = \frac{x_2}{x_1}.$$

6. Specific area of decondensed chromatin.

$$x_6 = \frac{x_3}{x_1}.$$

7. Integral density.

$$x_7 = \sum_{\substack{i=1 \\ r_{ij} \geq 0.08}}^{m} \sum_{j=1}^{n} r_{ij},$$

where the inequality $r_{ij} \geq 0.08$ denotes that the summation is taken over indices i and j for which $$r_{ij} \geq 0.08.$$

8. Mean density.

$$x_8 = \frac{x_7}{nm - p},$$

where p is a number of the elements such that $r_{ij} < 0.08$.

9. Averaged sum of overfalls.

$$x_9 = \frac{1}{q} \sum_{k=1}^{q} v_k,$$

where q is a number of the elements such that $\min(r_{ij}, r_{i+1,j}, r_{i,j+1}, r_{i+1,j+1}) \geq 0.08$ $$v_k = \max(r_{ij}, r_{i+1,j}, r_{i,j+1}, r_{i+1,j+1}) - \min(r_{ij}, r_{i+1,j}, r_{i,j+1}, r_{i+1,j+1}), k = \overline{1, q}.$$

(The summation is taken over elements mentioned above).

10. General cluster index.

$$x_{10} = \frac{1}{q} \sum_{k=1}^{q} v_k^2.$$

11. Dispersion coefficient.

$$x_{11} = \left( \frac{\sum_{k=1}^{q} (v_k - x_9)^2}{q - 1} \right)^{1/2}.$$

12. Index of overfall variation.

$$x_{12} = x_9 + x_{11}.$$

13. Relief index.

$$x_{13} = \frac{\sum_{i=2}^{m} \sum_{j=1}^{n} |r_{ij} - r_{i-1,j}|}{(2mn - m + n - q)},$$

where q is a number of the points (i,j) such that $\max(r_{ij}, r_{i-1,j}) < 0.08$.

14. Textural coefficient.

$$x_{14} = \frac{x_{13}}{\varepsilon}, \varepsilon = \frac{\sum_{\substack{i=1 \\ r_{ij} \geq 0.08}}^{m} \sum_{j=1}^{n} (r_{ij} - x_7)}{mn - p},$$

where p is defined as for $x_8$.

15. Coefficient of mutual disposition.

$$x_{15} = \frac{a}{x_8^2 b},$$

where $a =$ $$\sum_{i=1}^{m} \sum_{j=1}^{n} \left( \sum_{k=1}^{m} \sum_{l=j+1}^{n} \frac{r_{ij} r_{kl}}{(k-i)^2 + (l-j)^2} + \sum_{k=i+1}^{m} \sum_{l=1}^{n} \frac{r_{ij} r_{kl}}{(k-i)^2 + (l-j)^2} \right),$$

$$b = \sum_{i=1}^{m} \sum_{j=1}^{n} \left( \sum_{k=1}^{m} \sum_{l=j+1}^{n} \frac{1}{(k-i)^2 + (l-j)^2} + \sum_{k=i+1}^{m} \sum_{l=1}^{n} \frac{1}{(k-i)^2 + (l-j)^2} \right),$$

moreover, the summation both for a and for b is taken over elements such that $$\min(r_{ij}, r_{kl}) > 0.875 \max_{i=1,2,\ldots n; j=1,2,\ldots m; r_{ij} \geq 0.08} r_{ij}.$$

Proximity Measures Between Samples

To compare general populations $G_x$ and $G_y$, the proximity measures between corresponding samples from these general populations are used.

The proximity measure (Petunin's statistics) is used for continuous general populations, i.e. when the distribution function of the values of the general population is continuous on the whole real line. Let $G_x$ and $G_y$ be general populations which have continuous hypothetical distribution functions $F_x(u)$ and $F_y(u)$, respectively. Suppose there are two samples $X = (x_1, x_2, \ldots, x_n)$ and $Y = (y_1, y_2, \ldots, y_m)$ from the general populations $G_x$ and $G_y$, such that the sample values are mutually independent. Consider the following criterion for the test of hypothesis H about equality of the distribution functions $F_x(u)$ and $F_y(u)$ on the basis of the samples X and Y. Let $x^{(1)} \leq \ldots \leq x^{(n)}$ be variational series constructed from the sample X, and x be a sample value from $G_x$ which does not depend on X. Then, on the basis of the results of the paper (see Madreimov and Petunin 1982)

$$p(x \in (x^{(i)}, x^{(j)})) = \frac{j-1}{n+1}, (i < j). \tag{4.4.1}$$

Assuming that the hypothesis H is true, then the probability of the random event $A_{ij}=(y_k \in (x^{(i)}, x^{(j)}))$ can be calculated (see formula 3.1, in Andrushkiw, R., et al., *Computer-Aided Cytogenetic Method of Cancer Diagnosis*, Nova Science Publishers, NY. 2007). Using the known sample Y, the frequency of the random event $A_{ij}$ and confidence limits $(p_{ij}^{(1)}, p_{ij}^{(2)})$ for the probability $p_{ij}$ corresponding to the given significance level $2\beta$: $B=\{p_{ij} \in (p_{ij}^{(1)}, p_{ij}^{(2)})\}$, $p(B)=1-2\beta$ are calculated.

These limits have been calculated by the formulae (see Van der Waerden 1957):

$$p_{ij}^{(1)} = \frac{h_{ij}m + \frac{1}{2}g^2 - g\sqrt{h_{ij}(1-h_{ij})m + \frac{1}{4}g^2}}{m+g^2}, \quad (4.1.2)$$

$$p_{ij}^{(2)} = \frac{h_{ij}m + \frac{1}{2}g^2 + g\sqrt{h_{ij}(1-h_{ij})m + \frac{1}{4}g^2}}{m+g^2},$$

where g satisfies condition $\Phi(g)=1-\beta$, $\Phi(u)$ is a function of the normal distribution (if m is small then according to "$3\sigma$ rule" $g=3$).

Let $N = \frac{1}{2}n(n-1)$ be the number of all confidence intervals $I_{ij}=(p_{ij}^{(1)}, p_{ij}^{(2)})$ and L the number of those intervals $I_{ij}$ which contain the probabilities $p_{ij}$; let $$h = \rho(F_x^*, F_y^*) = \frac{L}{N}$$

be the proximity measure between X and Y. Since h is the frequency of the random event $B=(p_{ij} \in I_{ij})$ with probability $p(B)=1-\beta$, setting $h_{ij}=h$, $m=N$ and $g=3$ in formulae (4.1.2), the confidence interval $I=(p^{(1)}, p^{(2)})$ for the probability $p(B)$, whose confidence level is equal approximately to 0.95 is obtained. A criterion for the test of hypothesis H, with significance level of approximately 0.05, may be formulated as follows: if the confidence interval $I=(p^{(1)}, p^{(2)}$ contains the probability $p(B)=1-\beta$, then hypothesis His accepted, otherwise it is rejected. The proximity measure h is called p-statistics (Petunin's statistics); it is a measure of the proximity $\rho(X,Y)$ between the samples X and Y. Note that the function $\rho(X,Y)$ of two variables X and Y is in general non-symmetric. The justification and investigation of this statistical test was given in the papers (see Petunin et al. 1984, Bairamov and Petunin 1991, Bairamov and Petunin 1990, Borodyansky et al. 1992).

Investigation of Nuclei of Cells of Primary Focus

At the first stage, the integral optical density of nuclei of the cells from the primary focus and from a normal mammary gland is compared (see Table 4(ii)).

Table 4(ii) shows that there exists a significant difference between the DNA content in the normal nuclei of the focus cells and the DNA content in these nuclei in the presence of the considered benign and malignant processes.

The same comparison was made for the buccal epithelium (see Table 4(iii)). The results represented in the Table 4(iii) show that in the epitheliocytes of buccal epithelium there exists significant difference between the patients suffering from various pathological processes and the norm. In this connection, a significant difference between samples of the integral density in the case of benign and malignant processes is observed, such that the values of the proximity measure between the samples corresponding to the norm and to benign processes (fibroadenoma and fibroadenomatosis) are greater than the values of the proximity measure between the samples corresponding to the norm and the malignant processes (infiltrative ductal cancer, infiltrative lobular cancer, infiltrative ductal-lobular cancer, scirrhus).

By comparing the data in Tables 4(ii) and 4(iii), the values of the proximity measure between the samples of the cells obtained from the focus, in the cases of the norm and pathologic processes, are less than the corresponding values of the proximity measures between the samples of cells taken from buccal epithelium.

TABLE 4(ii)

Proximity measure ρ corresponding to 5% significance level between integral densities of nuclei of cells from focus in the norm and in the presence of various pathologies

|         | Norm  | FA    | FAM   | IDC   | ILC   | IDLC  | Scirrhus |
|---------|-------|-------|-------|-------|-------|-------|----------|
| Norm    | 1.000 | 0.611 | 0.344 | 0.303 | 0.332 | 0.411 | 0.551    |
| FA      | 0.467 | 1.000 | 0.827 | 0.430 | 0.460 | 0.553 | 0.681    |
| FAM     | 0.364 | 0.957 | 1.000 | 0.622 | 0.614 | 0.761 | 0.776    |
| IDC     | 0.359 | 0.689 | 0.673 | 1.000 | 0.995 | 0.963 | 0.974    |
| ILC     | 0.312 | 0.632 | 0.549 | 0.979 | 1.000 | 0.965 | 0.988    |
| IDLC    | 0.379 | 0.704 | 0.707 | 0.908 | 0.954 | 1.000 | 0.984    |
| Scirrhus| 0.314 | 0.611 | 0.489 | 0.803 | 0.927 | 0.904 | 1.000    |

TABLE 4(iii)

Proximity measure ρ corresponding to 5% significance level between integral densities of nuclei of cells from buccal epitelium in the norm and in the presense of various pathologies

|         | Norm  | FA    | FAM   | IDC   | ILC   | IDLC  | Scirrhus |
|---------|-------|-------|-------|-------|-------|-------|----------|
| Norm    | 1.000 | 0.405 | 0.292 | 0.221 | 0.308 | 0.314 | 0.490    |
| FA      | 0.627 | 1.000 | 0.977 | 0.472 | 0.450 | 0.699 | 0.512    |
| FAM     | 0.636 | 0.996 | 1.000 | 0.467 | 0.468 | 0.676 | 0.525    |
| IDC     | 0.609 | 0.653 | 0.540 | 1.000 | 0.880 | 0.999 | 0.808    |
| ILC     | 0.607 | 0.518 | 0.424 | 0.783 | 1.000 | 0.733 | 0.994    |
| IDLC    | 0.614 | 0.763 | 0.644 | 0.983 | 0.757 | 1.000 | 0.686    |
| Scirrhus| 0.612 | 0.403 | 0.286 | 0.553 | 0.935 | 0.538 | 1.000    |

Investigation of Nuclei of Epitheliocytes of Buccal Epithelium

At the second stage, the proximity measures between the values of the indices of the epitheliocyte of buccal epithelium in patients suffering from cancer of mammary gland and the patients suffering from fibroadenomatosis are considered, as far as the last one as a rule is diffusive proliferative process which not infrequently is a background for malignancy.

Table 4(iv) lists the values of the above mentioned proximity measures and their lower and upper confidence limits, corresponding to 5% significance level. Analysis of the data from Table 4(iv) shows that the most significant deviation of the general populations is observed in the case of the following indices (listed in the order of increasing proximity measure, i.e. in the order of decrease of the deviation of the corresponding general populations): area of nuclei, area of condensed chromatin, specific area of condensed chromatin, specific area of decondensed chromatin, mean density, area of decondensed chromatin, area of strongly decondensed chromatin, integral density. Indices, for which the difference between corresponding general populations are not significant, are the following: averaged sum of overfalls, dispersion coefficient, index of overfall variation, coefficient of mutual disposition, general cluster index, relief index, textural coefficient.

It should be noted that the observed deviation between the histograms of the indices for cancer of the mammary gland (abbreviated CMG) and fibroadenomatosis (abbreviated FAM) does not always corresponds to the magnitude of the proximity measure. By actually computing the values of the proximity measures, regularities which are hidden from sight in the histograms are detected. Thus, from Table 4(iv), it follows that the most significant difference between the above pathologies can be detected by the series of indices based on the area of nuclei and optical density of chromatin, and the relations between condensed and decondensed chromatin. This agrees with the visual estimation of the textural state of chromatin of interphase nuclei.

TABLE 4(iv)

Proximity measure ρ corresponding to 5% significance level between indices of cells of buccal epithelium in case of breast cancer and fibroadenomatosis

| Number of index | Proximity measure | Lower confidence limit | Upper confidence limit |
|---|---|---|---|
| 1 | 0.169 | 0.162 | 0.175 |
| 2 | 0.425 | 0.416 | 0.433 |
| 3 | 0.648 | 0.640 | 0.656 |
| 4 | 0.689 | 0.681 | 0.697 |
| 5 | 0.441 | 0.432 | 0.449 |
| 6 | 0.455 | 0.446 | 0.463 |
| 7 | 0.698 | 0.690 | 0.705 |
| 8 | 0.572 | 0.563 | 0.580 |
| 9 | 0.834 | 0.828 | 0.840 |
| 10 | 0.952 | 0.948 | 0.955 |
| 11 | 0.836 | 0.829 | 0.842 |
| 12 | 0.916 | 0.911 | 0.921 |
| 13 | 0.972 | 0.970 | 0.975 |
| 14 | 0.993 | 0.992 | 0.995 |
| 15 | 0.917 | 0.912 | 0.921 |

Note.
The numbers of the indices are shown in accordance with the order of their description given above.

Comparison of Integral Density of Nuclei of Cells of Primary Focus and Buccal Epithelium Table 4(v) shows the main sample characteristics (sample value and sample variance) of the general populations of the indices of the cells of the primary focus and the cells of the buccal epithelium, and the values of the proximity measure between indices and their confidence limits corresponding to 5% significance level.

Analysis of the data from Table 4(v) shows that there exists an interrelation between the indices of the primary focus cells and the cells of buccal epithelium. Moreover, this interrelation is minimal in the absence of pathology and it tends to increase in the presence of various cancer pathologies.

TABLE 4(v)

Proximity measure ρ between the integral density of nuclei of cells from focus and buccal epithelium in the normal range and in the presence of various pathology, and its confidence limits corresponding to 5% significance level

| | $\bar{x}$ | $s_x^2$ | $\bar{y}$ | $s_y^2$ | ρ(x, y) | $\delta_1$ | $\delta_2$ |
|---|---|---|---|---|---|---|---|
| Norm | 6.866 | 0.877 | 7.561 | 5.901 | 0.204 | 0.177 | 0.234 |
| FA | 12.075 | 7.007 | 12.379 | 12.208 | 0.493 | 0.476 | 0.509 |
| FAM | 11.906 | 11.919 | 13.573 | 8.682 | 0.369 | 0.360 | 0.379 |
| IDC | 17.782 | 23.210 | 15.786 | 13.930 | 0.506 | 0.498 | 0.514 |

TABLE 4(v)-continued

Proximity measure ρ between the integral density of nuclei of cells from focus and buccal epithelium in the normal range and in the presence of various pathology, and its confidence limits corresponding to 5% significance level

| | $\bar{x}$ | $s_x^2$ | $\bar{y}$ | $s_y^2$ | ρ(x, y) | $\delta_1$ | $\delta_2$ |
|---|---|---|---|---|---|---|---|
| ILC | 20.281 | 25.887 | 17.611 | 15.891 | 0.363 | 0.351 | 0.374 |
| IDLC | 16.391 | 24.250 | 16.043 | 15.016 | 0.670 | 0.658 | 0.681 |
| Scirrhus | 22.243 | 12.889 | 18.817 | 17.439 | 0.662 | 0.639 | 0.685 |

Note:
$\bar{x}$, $\bar{y}$ are mean sample values of integral density in the nuclei of cells of buccal epithelium and focus, $s_x^2$, $s_y^2$ are sample variance values of integral density in the nuclei of the cells of buccal epithelium and focus, ρ(x, y) is the proximity measure between integral densities in the nuclei of cells of buccal epithelium and focus, and $\delta_1$, $\delta_2$ are the lower and upper confidence limits of the proximity measure.

Individual Comparison of the Indices of Tumor Cells with the Epitheliocytes of Buccal Epithelium The interrelations between the indices of the cells of the mammary gland and the indices of the cells of buccal epithelium were investigated. For each index $x_i$, i=1, 2, ..., 15 characterizing the scanogram of the nuclei of the interphase cells, the proximity measure between the general population consisting of the indices of the focus cells (cancerous cells in the case of a malignant tumor, or healthy cells of the mammary gland in other cases) and the general population of the indices of the cells of the bucal epithelium taken from the same patient were calculated.

Table 4(vi) shows the sample mean values of the indices $$\bar{x}_i = \frac{1}{n}\sum_{j=1}^{n} x_{ij},$$

where $x_{ij}$ are the index values corresponding to the index i of the cell j, their sample variances $$s_i^2 = \frac{1}{n}\sum_{j=1}^{n} (\bar{x}_i - x_{ij})^2,$$

the proximity measure between the general population of the indices of n cells (n=10) from the focus and from buccal epithelium, and also lower and upper confidence limits corresponding to 5% significance level.

Analysis of data in Table 4(vi) shows that, as a rule, the general population of indices of the cells of the focus differs little from the corresponding general population of the indices of the cells of buccal epithelium; and for the some types of cancer (scirrhus, infiltrative ductal-lobular carcinoma) the influence of the malignant tissue of the focus on the buccal epithelium is so significant that both samples belong to the same general population. For other types of cancer of the mammary gland (infiltrative ductal cancer and infiltrative lobular cancer) as well as for fibroadenoma and fibroadenomatosis this effect is slightly marked. However, the proximity measure between the samples from the general populations of the indices of the scanogram of nuclei of the focus cells and the corresponding indices of cells of buccal epithelium are significant enough to indicate a small difference between the two. Thus, the effect of malignancy associated changes (MAC) becomes apparent quantitatively, showing that the samples of the indices of the buccal epithelium cells and the samples of the corresponding indices of the tumor cells belong to the same general population. Note that this effect is not observed in the absence of a tumor. For example, the proximity measure between the general population of indices of integral density for the cells of normal mammary gland and the general population of this index for the buccal epithelium is equal to 0.204.

TABLE 4(vi)

Sample statistics and proximity measures between indices of cells of buccal epithelium and focus in the presence of various pathologies (individual comparison)

| ## | $\bar{x}$ | $s_x^2$ | $\bar{y}$ | $s_y^2$ | $\rho(x,y)$ | $\delta_1$ | $\delta_2$ |
|---|---|---|---|---|---|---|---|
| Fibroadenoma | | | | | | | |
| 1 | 39.100 | 69.090 | 62.250 | 11.188 | .521 | .414 | .626 |
| 2 | 12.750 | 80.488 | 3.600 | 38.340 | .805 | .706 | .877 |
| 3 | 26.350 | 148.828 | 58.650 | 42.528 | .558 | .450 | .661 |
| 4 | 5.300 | 17.410 | 17.200 | 207.260 | .853 | .760 | .914 |
| 5 | .336 | .054 | .057 | .009 | .779 | .677 | .855 |
| 6 | .664 | .054 | .943 | .009 | .637 | .528 | .733 |
| 7 | 11.254 | 9.042 | 13.408 | 9.656 | .963 | .897 | .987 |
| 8 | .288 | .003 | .215 | .002 | .884 | .797 | .937 |
| 9 | 1.205 | .147 | 1.049 | .108 | .995 | .945 | 1.000 |
| 10 | 2.202 | 1.114 | 1.643 | .783 | .958 | .890 | .985 |
| 11 | .770 | .033 | .641 | .033 | .932 | .855 | .969 |
| 12 | 1.975 | .258 | 1.690 | .209 | .905 | .822 | .952 |
| 13 | .052 | .000 | .037 | .000 | .995 | .945 | 1.000 |
| 14 | .805 | .034 | .974 | .048 | 1.000 | .955 | 1.000 |
| 15 | 1.480 | .091 | 1.433 | .070 | .984 | .928 | .997 |
| Fibroadenomatosis | | | | | | | |
| 1 | 42.600 | 40.840 | 61.750 | 18.288 | .542 | .434 | .646 |
| 2 | 19.500 | 104.350 | 4.500 | 21.350 | .689 | .582 | .780 |
| 3 | 23.100 | 97.790 | 56.750 | 47.787 | .537 | .429 | .641 |
| 4 | 2.900 | 5.290 | 9.850 | 30.528 | .637 | .528 | .733 |
| 5 | .455 | .051 | .075 | .006 | .600 | .491 | .700 |
| 6 | .545 | .051 | .925 | .006 | .574 | .465 | .676 |
| 7 | 14.172 | 12.994 | 14.245 | 3.193 | .937 | .862 | .972 |
| 8 | .330 | .004 | .231 | .001 | .584 | .476 | .685 |
| 9 | 1.474 | .114 | 1.202 | .043 | .958 | .890 | .985 |
| 10 | 2.939 | 1.485 | 1.878 | .281 | .889 | .803 | .941 |
| 11 | .805 | .027 | .626 | .006 | .884 | .797 | .937 |
| 12 | 2.279 | .213 | 1.828 | .060 | .832 | .736 | .898 |
| 13 | .071 | .000 | .047 | .000 | .742 | .637 | .825 |
| 14 | .966 | .025 | .970 | .028 | .979 | .920 | .995 |
| 15 | 1.551 | .052 | 1.708 | .090 | .742 | .637 | .825 |
| Infiltrative ductal cancer | | | | | | | |
| 1 | 64.000 | .000 | 62.200 | 4.160 | .778 | .556 | .907 |
| 2 | 12.600 | 137.240 | 1.600 | 17.440 | .889 | .680 | .968 |
| 3 | 51.400 | 137.240 | 60.600 | 15.840 | .978 | .798 | .998 |
| 4 | 2.200 | 22.560 | 28.100 | 310.890 | .889 | .680 | .968 |
| 5 | .197 | .034 | .025 | .004 | .889 | .680 | .968 |
| 6 | .803 | .034 | .975 | .004 | .911 | .708 | .977 |
| 7 | 18.292 | 8.651 | 11.791 | 9.242 | .889 | .680 | .968 |
| 8 | .286 | .002 | .188 | .002 | .889 | .680 | .968 |
| 9 | 1.024 | .064 | .794 | .088 | .933 | .736 | .986 |
| 10 | 1.429 | .325 | 1.018 | .247 | .978 | .798 | .998 |
| 11 | .558 | .010 | .545 | .009 | 1.000 | .833 | 1.000 |
| 12 | 1.582 | .098 | 1.337 | .136 | .978 | .798 | .998 |
| 13 | .041 | .000 | .028 | .000 | .911 | .708 | .977 |
| 14 | .961 | .049 | .958 | .088 | 1.000 | .833 | 1.000 |
| 15 | 1.433 | .027 | 1.416 | .041 | 1.000 | .833 | 1.000 |
| Infiltrative lobular cancer | | | | | | | |
| 1 | 61.900 | 64.990 | 77.950 | 271.347 | .558 | .450 | .661 |
| 2 | 14.250 | 214.188 | 2.050 | 27.548 | .632 | .523 | .728 |
| 3 | 47.650 | 161.728 | 75.900 | 273.390 | .584 | .476 | .685 |
| 4 | 3.150 | 10.327 | 4.650 | 11.527 | .853 | .760 | .914 |
| 5 | .220 | .041 | .025 | .004 | .621 | .512 | .719 |
| 6 | .780 | .041 | .975 | .004 | .589 | .481 | .690 |
| 7 | 17.822 | 21.811 | 20.252 | 65.259 | .884 | .797 | .937 |
| 8 | .286 | .003 | .238 | .000 | .805 | .706 | .877 |
| 9 | 1.193 | .078 | .853 | .014 | .747 | .643 | .829 |
| 10 | 1.926 | .790 | 1.065 | .057 | .763 | .660 | .842 |
| 11 | .648 | .014 | .563 | .013 | .968 | .904 | .990 |
| 12 | 1.841 | .138 | 1.416 | .026 | .784 | .683 | .860 |
| 13 | .050 | .000 | .028 | .000 | .626 | .518 | .724 |

TABLE 4(vi)-continued

Sample statistics and proximity measures between indices of cells of buccal epithelium and focus in the presence of various pathologies (individual comparison)

| ## | $\bar{x}$ | $s_x^2$ | $\bar{y}$ | $s_y^2$ | $\rho(x,y)$ | $\delta_1$ | $\delta_2$ |
|---|---|---|---|---|---|---|---|
| 14 | .861 | .024 | .917 | .043 | .900 | .816 | .948 |
| 15 | 1.690 | .209 | 1.281 | .044 | .947 | .876 | .979 |
| Infiltrative ductal-lobular cancer | | | | | | | |
| 1 | 62.300 | 6.210 | 63.500 | .950 | .837 | .742 | .902 |
| 2 | 4.500 | 22.050 | 6.350 | 79.528 | .811 | .712 | .881 |
| 3 | 57.800 | 35.960 | 57.150 | 81.327 | 1.000 | .955 | 1.000 |
| 4 | 13.100 | 112.690 | 6.600 | 28.140 | .995 | .945 | 1.000 |
| 5 | .073 | .006 | .100 | .020 | .811 | .712 | .881 |
| 6 | .927 | .006 | .900 | .020 | .979 | .920 | .995 |
| 7 | 14.138 | 6.685 | 15.757 | 6.235 | .984 | .928 | .997 |
| 8 | .227 | .002 | .248 | .002 | .995 | .945 | 1.000 |
| 9 | 1.147 | .018 | .891 | .104 | .889 | .803 | .941 |
| 10 | 1.682 | .111 | 1.290 | .360 | .889 | .803 | .941 |
| 11 | .593 | .003 | .577 | .014 | .958 | .890 | .985 |
| 12 | 1.740 | .025 | 1.518 | .090 | .884 | .797 | .937 |
| 13 | .044 | .000 | .035 | .000 | .905 | .822 | .952 |
| 14 | .976 | .030 | .782 | .029 | .968 | .904 | .990 |
| 15 | 1.597 | .041 | 1.390 | .029 | .895 | .809 | .945 |
| Scirrhus | | | | | | | |
| 1 | 80.100 | 1.290 | 78.900 | 5.290 | 1.000 | .833 | 1.000 |
| 2 | 15.300 | 94.810 | 9.800 | 74.960 | 1.000 | .833 | 1.000 |
| 3 | 64.800 | 86.360 | 69.100 | 75.690 | 1.000 | .833 | 1.000 |
| 4 | 3.400 | 1.840 | 6.500 | 30.250 | .889 | .680 | .968 |
| 5 | .190 | .014 | .124 | .012 | 1.000 | .833 | 1.000 |
| 6 | .810 | .014 | .876 | .012 | 1.000 | .833 | 1.000 |
| 7 | 22.266 | 5.943 | 20.218 | 6.354 | .978 | .798 | .998 |
| 8 | .278 | .001 | .256 | .001 | .978 | .798 | .998 |
| 9 | 1.302 | .027 | 1.189 | .048 | .933 | .736 | .986 |
| 10 | 2.121 | .313 | 1.827 | .370 | .911 | .708 | .977 |
| 11 | .631 | .007 | .606 | .003 | 1.000 | .833 | 1.000 |
| 12 | 1.933 | .051 | 1.795 | .072 | .867 | .654 | .957 |
| 13 | .052 | .000 | .050 | .000 | 1.000 | .833 | 1.000 |
| 14 | .993 | .030 | 1.039 | .022 | 11.000 | .833 | 11.000 |
| 15 | 1.513 | .024 | 1.660 | .061 | .978 | .798 | .998 |

These results confirm the maxim of the unity and integrity of the organism and its systems, and give quantitative estimates of malignancy associated changes in buccal epithelium. The data concerning the DNA content in the epitheliocytes of buccal epithelium may be used in a combination with other indices as a marker for differential diagnosis between benign and malignant tumor processes, and also as a marker for the presence of a tumor in the organism.

An exemplary embodiment of the computer-aided diagnosis of breast cancer on analysis of MACs in buccal epithelium is described as follows:

Algorithm of Computer-Aided Diagnosis

The algorithm for such computer-aided diagnosis comprises several stages:

1). At the first stage, two groups of patients $G_1$ and $G_2$ are formed, with the first group $G_1$ consisting of patients who are suffering from carcinoma of the mammary gland (CMG) and the second group $G_2$ consisting of patients having fibroadenoma (FAM) (the diagnoses of the patients of each group must be verified exactly!). These groups are referred to as "training" or "standard" groups; on the basis of these groups the diseases are diagnosed.

2). At the second stage of the quadratic test with the help of the p-statistics (Petunin's statistics (see Petunin et al. 1984)) the distances (measures of proximity) between the indices of the scanograms of the patient and the corresponding indices of patients of the group $G_1$ and $G_2$ are calculated. This is done in the following way. Assume that the patient Q belongs to the first group $G_1$: $Q \in G_1, G_1 = (Q_1, \ldots, Q_n), Q = Q_i$ ($i = 1, 2, \ldots, n$).

The patient $Q=Q_i$ is excluded from the group $G_1$ so to get the group $G_1^{(t)}=\{Q_1, \ldots, Q_{i-1}, Q_{i+1}, \ldots, Q_n\}$.

Let $X_{C_1}^{(k)}=(x_{1k}^{(1)}, x_{2k}^{(1)}, \ldots, x_{15k}^{(1)})$ $X_{C_1}^{(k)}=(x_{1k}^{(2)}, x_{2k}^{(2)}, \ldots, x_{15k}^{(2)})$ $X_{C_{jk}}^{(k)}=(x_{1k}^{(jk)}, x_{2k}^{(jk)}, \ldots, x_{15k}^{(jk)})$ ($k=1, 2, \ldots, n$; $10 \leq j_k \leq 30$) be the indication vectors of the cells of the patient $Q_k$. Here $x_{C_i}^{(k)}=(x_{1k}^{(i)}, x_{2k}^{(i)}, \ldots, x_{15k}^{(i)})$ is an indication vector of the cell $C_i$ of the patient $Q_k$, $k=1, 2, \ldots, n$. Then the training samples are formed for every index $x_i$, $i=1, 2, \ldots, 15$.

Let the first training sample for the index $x_1$ be $X_1^{(1)}=(x_{11}^{(1)}, x_{11}^{(2)}, \ldots, x_{11}^{(j1)})$ (from first patient)

$X_2^{(1)}=(x_{12}^{(1)}, x_{12}^{(2)}, \ldots, x_{12}^{(j2)})$ (from second patient)

$X_n^{(1)}=(x_{1n}^{(1)}, x_{1n}^{(2)}, \ldots, x_{1n}^{(jn)})$ (from n-th patient)

Let the second training sample (for index $x_2$) be $X_1^{(2)}=(x_{21}^{(1)}, x_{21}^{(2)}, \ldots, x_{21}^{(j1)})$ (from first patient)

$X_2^{(2)}=(x_{22}^{(1)}, x_{22}^{(2)}, \ldots, x_{22}^{(j2)})$ (from second patient)

$X_n^{(2)}=(x_{2n}^{(1)}, x_{2n}^{(2)}, \ldots, x_{2n}^{(jn)})$ (from n-th patient).

Finally, let the last training sample (for the 15th index) be $X_1^{(15)}, X_2^{(15)}, \ldots, X_n^{(15)}$, where n is the number patients of the group $G_1$. Next, calculate the values of the p-statistics for the samples $X_i^{(15)}, X_i^{(15)}, \ldots, X_i^{(15)}$ of the i-th patient and the corresponding samples of other patients with number k ($k \neq i$) (i is fixed!):

$\rho_{ik}^{(1)}=\rho(X_i^{(1)}, X_k^{(1)})$, $\rho_{ik}^{(2)}=\rho(X_i^{(2)}, X_k^{(2)})$, $\ldots$, $\rho_{ik}^{(15)}=\rho(X_i^{(15)}, X_k^{(15)})$ and find the values of the averaged p-statistics $$\rho_i^{(1)} = \frac{1}{n-1} \sum_{k=1, k \neq i}^{n} \rho(X_i^{(1)}, X_k^{(1)}),$$

$$\rho_i^{(2)} = \frac{1}{n-1} \sum_{k=1, k \neq i}^{n} \rho(X_i^{(2)}, X_k^{(2)}),$$

$$\rho_i^{(15)} = \frac{1}{n-1} \sum_{k=1, k \neq i}^{n} \rho(X_i^{(15)}, X_k^{(15)})$$

(i is fixed!) which represent the measure of the proximity between the patient $Q_i$ (more precisely between its indices) and the group $G_1^{(i)}$ ($i=1, 2, \ldots, n$).

Replacing the patient $Q_i$ by a patient $\overline{Q_i}$ from the group $G_2$ (recall that $G_2$ consists of the patients having the fibroadenoma) yields similar averaged p-statistics for the group $G_2$: $\overline{\rho}_i^{(1)}, \overline{\rho}_i^{(2)}, \ldots, \overline{\rho}_i^{(15)}$ ($i=1, 2, \ldots, m$; $m=\text{card } G_2$):

$$\overline{\rho}_i^{(1)} = \frac{1}{n}\sum_{k=1}^{n} \rho(\overline{X}_i^{(t)}, X_k^{(t)}), (i=1, 2, \ldots, m; t=1, 2, \ldots, 15)$$

where $\overline{X}_i^{(t)}$ is a corresponding index of the patient $\overline{Q_i}$. Replace the group $G_1$ by the $G_2$ and perform the similar calculations, to obtain the averaged p-statistics $d_i^{(1)}, d_i^{(2)}, \ldots d_i^{(15)}$ ($i=1, 2, \ldots, n$) and $\overline{d}_j^{(1)}, \overline{d}_j^{(2)}, \ldots \overline{d}_j^{(15)}$ ($j=1, 2, \ldots, m$):

$$d_i^{(t)} = \frac{1}{m-1}\sum_{k=1, k \neq i}^{m} \rho(\overline{X}_i^{(t)}, \overline{X}_k^{(t)}),$$

($i=1, 2, \ldots, m; t=1, 2, \ldots, 15$), $$\overline{d}_j^{(t)} = \frac{1}{m}\sum_{k=1}^{m} \rho(X_j^{(t)}, \overline{X}_k^{(t)}),$$

($j=1, 2, \ldots, n; t=1, 2, \ldots, 15$).

3). At the third stage of the quadratic test, coupling is produced of these averaged p-statistics $(\rho_i^{(t)}, \rho_i^{(s)})$, $(\overline{\rho}_j^{(t)}, \overline{\rho}_j^{(s)})$ ($i=1, 2, \ldots, n$; $j=1, 2, \ldots, m$; $t, s=1, 2, \ldots, 15$); similarly, one obtains points $(d_i^{(t)}, d_i^{(s)})$, $(\overline{d}_j^{(t)}, \overline{d}_j^{(s)})$ ($i=1, 2, \ldots, n$; $j=1, 2, \ldots, m$; $t, s=1, 2, \ldots, 15$). Next, the so-called confidence ellipses $E_{ts}$ containing the averaged p-statistics $(\rho_i^{(t)}, \rho_i^{(s)})$ ($i=1, 2, \ldots, n$) for the group $G_1$, i.e. the ellipse with minimal area containing the points $(\rho_i^{(t)}, \rho_i^{(s)})$ ($i=1, 2, \ldots, n$; $t, s=1, 2, \ldots, 15$) is constructed. More precisely, one constructs ellipses $E_{ts}$ with the help of the algorithm which gives the approximate solution of this problem.

Then the confidence ellipse $\overline{E}_{ts}$ for the averaged p-statistics $(\overline{\rho}_j^{(t)}, \overline{\rho}_j^{(s)})$ ($j=1, 2, \ldots, m$; $t, s=1, 2, \ldots, 15$) and similar ellipses $E_{ts}^*$ and $\overline{E}_{ts}^*$ is constructed by using the points $(d_i^{(t)}, d_i^{(s)})$, $(\overline{d}_j^{(t)}, \overline{d}_j^{(s)})$ ($i=1, 2, \ldots, n$; $j=1, 2, \ldots, m$; $t, s=1, 2, \ldots, 15$) respectively.

In addition, for the description of the so-called linear test, a linear discriminant Fisher function $f_{ts}(u,v)$ ($f_{ts}^*(u,v)$) separating the set $M_{ts}^\rho=\{(\rho_i^{(t)}, \rho_i^{(s)}), i=1, 2, \ldots, n\}$ from the set $\overline{M}_{ts}^\rho=\{(\overline{\rho}_j^{(t)}, \overline{\rho}_j^{(s)}), j=1, 2, \ldots, m\}$ and the set $M_{ts}^d=\{(d_i^{(t)}, \rho_i^{(s)}), i=1, 2, \ldots, n\}$ from the set $\overline{M}_{ts}^d=\{(\overline{d}_j^{(t)}, \overline{d}_j^{(s)}), j=1, 2, \ldots, m\}$ may be constructed. The function $f_{ts}(u,v)$ is constructed so that straight line $l_{ts}^\rho=\{(u,v): f_{ts}(u,v)=0\}$ is perpendicular to a segment connecting the centers of the sets $M_{ts}^\rho$ and $\overline{M}_{ts}^\rho$, and passes through the middle of this segment; similarly $f_{ts}^*(u,v)$; in addition, the center of the set $M_{ts}^\rho$ belongs to the lower halfplane $\pi_{ts}$ and the center of the set $\overline{M}_{ts}^\rho$ belongs to the upper one $\lambda_{ts}$ (similarly $\pi_{ts}^*, \lambda_{ts}^*$). Thus, for the 15 indices there are 210 pairs of ellipses $(E_{ts}, \overline{E}_{ts})$ and $(E_{ts}^*, \overline{E}_{ts}^*)$ ($t<s$; $t,s=1, 2 \ldots, 15$) as well as 210 pairs of half-planes $(\pi_{ts}, \lambda_{ts})$, $(\pi_{ts}^*, \lambda_{ts}^*)$ ($t<s$; $t,s=1, 2 \ldots, 15$).

Let Q be a patient suffering from the cancer of the breast (hypothesis $H_1$) or the fibroadenomatosis (hypothesis $H_2$). By using the algorithms mentioned above the averaged p-statistics $\rho_Q^{(t)}$, $d_Q^{(t)}$ ($t=1, 2, \ldots, 15$) may be calculated for this patient:

$$\rho_Q^{(t)} = \frac{1}{n}\sum_{k=1}^{n} \rho(X_Q^{(t)}, X_k^{(t)}), \quad d_Q^{(t)} = \frac{1}{m}\sum_{k=1}^{m} \rho(X_Q^{(t)}, \overline{X}_k^{(t)}),$$

where $X_Q^{(t)}$ is the corresponding index (sample) of the patients Q and form the points $(\rho_Q^{(t)}, \rho_Q^{(s)})$, $(d_Q^{(t)}, d_Q^{(s)})$ ($t<s$; $t,s=1, 2, \ldots, 15$). Consider the following random events $A_1=\{(\rho_Q^{(t)}, \rho_Q^{(s)}) \in E_{ts}\}$, $A_2=\{(\rho_Q^{(t)}, \rho_Q^{(s)}) \in \overline{E}_{ts}\}$, $A_3=\{(\rho_Q^{(t)}, \rho_Q^{(s)}) \in E_{ts}-\overline{E}_{ts}\}$, $A_4=\{(\rho_Q^{(t)}, \rho_Q^{(s)}) \in \overline{E}_{ts}-E_{ts}\}$, $A_1^*=\{(d_Q^{(t)}, d_Q^{(s)}) \in E_{ts}^*\}$, $A_2^*=\{(d_Q^{(t)}, d_Q^{(s)}) \in \overline{E}_{ts}^*\}$, $A_3^*=\{(d_Q^{(t)}, d_Q^{(s)}) \in E_{ts}^*-\overline{E}_{ts}^*\}$, $A_4^*=\{(d_Q^{(t)}, d_Q^{(s)}) \in \overline{E}_{ts}^*-E_{ts}^*\}$, $B_1=\{(\rho_Q^{(t)}, \rho_Q^{(s)}) \in \pi_{ts}\}$, $B_2=\{(\rho_Q^{(t)}, \rho_Q^{(s)}) \in \lambda_{ts}\}$, $B_1^*=\{(d_Q^{(t)}, d_Q^{(s)}) \in \pi_{ts}^*\}$, $B_2^*=\{(d_Q^{(t)}, d_Q^{(s)}) \in \lambda_{ts}^*\}$, $t<s$, $C_1=A_3 \cup A_4^*$, $C_2=A_4 \cup A_3^*$, $C_3=A_1 \cup A_2$, $C_4=A_2 \cup A_1^*$, $C_5=B_1 \cup B_2$, $C_6=B_2 \cup B_1^*$ and denote by $h_i=h(C_i)$, $i=1,$ 2, ..., 6, the frequency of the event $C_i$ under 210 tests (experiments) when t, s=1, 2, ..., 15; t<s. By using the formulas of Petunin et al. (1984) one can get the asymptotic confidence limits corresponding to the given significance level for the probability $p_i=p(C_i)$ on the basis of the frequency $h_i=h(C_i)$ (in this connection one must take $h_{ij}=h_j$, m=210); these limits will be apparently too wide. One may call the frequency $h_1$ the index of cancer of mammary gland (abbreviated as CMG) and $h_3$—the total CMG (abbreviated as TCMG) as far as these indices are the proximity measures between the scanograms of the interphase nuclei of the cells of the examined patient Q and the corresponding scanograms of patients suffering from carcinoma of the mammary gland. Using similar arguments, one may denote the frequencies $h_2$ and $h_4$ by fibroadenomatosis (abbreviated as FAM) and total FAM (TFAM) index, respectively. By analogy, one can call frequencies $h_5$ and $h_6$ the linear CMG (LCMG) and the linear FAM (LFAM) index, respectively.

Next, consider the so-called order test. The first stage of this test is the same as in the previous tests. Let $X_{C_i}^{(k)} = (x_{1k}^{(i)}, x_{2k}^{(i)}, \ldots, x_{15k}^{(i)})$ (i=1, 2 ..., $j_k$; k=1, 2, ..., n) be an indication vector of the cell $C_i$ of the patient $Q_k$ from the group $G_1$ and $Y_{D_i}^{(k)} = (y_{1k}^{(i)}, y_{2k}^{(i)}, \ldots, y_{15k}^{(i)})$, (i=1, 2, ..., $l_k$; k=1, 2, ..., m) be the corresponding indication vector of the patient $\overline{Q}_k \in G_2$. At the second stage the averaged indication vector $$\hat{X}^{(k)} = \frac{1}{j_k} \sum_{t=1}^{j_k} X_{C_t}^{(k)} = (\hat{x}_{1k}, \hat{x}_{2k}, \ldots, \hat{x}_{15k})$$

for every patient $Q_k \in G_1$ is calculated; similarly for every $\overline{Q}_k \in G_2$ the averaged indication vector $\hat{Y}^{(k)}$ has the form Put $X_{tk}^{min} = \min(x_{tk}^{(1)}, x_{tk}^{(2)}, \ldots, x_{tk}^{(j_k)})$, k=1, 2, ..., n; t=1, 2, ... 15;

$X_{tk}^{max} = \max(x_{tk}^{(1)}, x_{tk}^{(2)}, \ldots, x_{tk}^{(j_k)})$, k=1, 2, ..., n; t=1, 2, ..., 15;

$Y_{tk}^{min} = \min(y_{tk}^{(1)}, y_{tk}^{(2)}, \ldots, y_{tk}^{(l_k)})$, k=1, 2, ..., m; t=1, 2, ..., 15;

$Y_{tk}^{max} = \max(y_{tk}^{(1)}, y_{tk}^{(2)}, \ldots, y_{tk}^{(l_k)})$, k=1, 2, ..., m; t=1, 2, ..., 15;

$a_t^{min} = \min(x_{t1}^{min}, x_{t2}^{min}, \ldots, x_{tn}^{min})$, $a_t^{max} = \max(x_{t1}^{min}, x_{t2}^{min}, \ldots, x_{tn}^{min})$, $b_t^{min} = \min(x_{t1}^{max}, x_{t2}^{max}, \ldots, x_{tn}^{max})$, $b_t^{max} = \max(x_{t1}^{max}, x_{t2}^{max}, \ldots, x_{tn}^{max})$, t=1, 2, ... 15;

$\overline{a}_t^{min} = \min(y_{tk}^{min}, k=1, 2, \ldots, m)$; $\overline{a}_t^{max} = \max(y_{tk}^{min}, k=1, 2, \ldots, m)$;

$\overline{b}_t^{min} = \min(y_{tk}^{max}, k=1, 2, \ldots, m)$; $\overline{b}_t^{max} = \max(y_{tk}^{max}, k=1, 2, \ldots, m)$;

$c_t^{min} = \min(\hat{x}_{tk}, k=1, 2, \ldots, n)$; $c_t^{max} = \max(\hat{x}_{tk}^{min}, k=1, 2, \ldots, n)$;

$\overline{c}_t^{min} = \min(\hat{y}_{tk}, k=1, 2, \ldots, m)$; $\overline{c}_t^{max} = \max(\hat{y}_{tk}^{min}, k=1, 2, \ldots, m)$;

Then, $a_t^{min}$, $a_t^{max}$ will be minimal and maximal order statistics, respectively; also $b_t^{min}, b_t^{max}, \overline{a}_t^{min}, \overline{a}_t^{max}, \overline{b}_t^{min}, \overline{b}_t^{max}, c_t^{min}, c_t^{max}, \overline{c}_t^{min}, \overline{c}_t^{max}$. By means of these order statistics one can form the confidence intervals $\alpha_t = (a_t^{min}, a_t^{max})$, $\beta_t = (b_t^{min}, b_t^{max})$, $\overline{\alpha}_t = (\overline{a}_t^{min}, \overline{a}_t^{max})$, $\overline{\beta}_t = (\overline{b}_t^{min}, \overline{b}_t^{max})$, $\gamma_t = (c_t^{min}, c_t^{max})$, $\overline{\gamma}_t = (\overline{c}_t^{min}, \overline{c}_t^{max})$.

Let Q be an examined patient and $X_{C_i} = (x_1^{(i)}, x_2^{(i)}, \ldots, x_{15}^{(i)})$, i=1, 2, ..., j be indication vectors of this patient. At the third stage of the order test one can calculate the averaged indication vector of the $Q_j$:

$$\hat{X} = \frac{1}{j}\sum_{t=1}^{j} X_{C_t} = (\hat{x}_1, \hat{x}_2, \ldots, \hat{x}_{15})$$

and indices $x_t^{min} = \min(x_t^{(i)}, i=1, 2, \ldots, j)$, $x_t^{max} = \max(x_t^{(i)}, i=1, 2, \ldots, j)$, t=1, 2, ..., 15; next, the indicators of the falling of indices outside the limits $I_t^{min}, I_t, I_t^{max}$ is defined:

$$I_t^{min} = \begin{cases} 1, \text{ if } x_t^{min} \notin \alpha_t, \\ 0, \text{ if } x_t^{min} \in \alpha_t, \end{cases}$$

$$I_t = \begin{cases} 1, \text{ if } \hat{x}_t \notin \gamma_t, \\ 0, \text{ if } \hat{x}_t \in \gamma_t, \end{cases}$$

$$I_t^{max} = \begin{cases} 1, \text{ if } x_t^{max} \notin \beta_t, \\ 0, \text{ if } x_t^{max} \in \beta_t, \end{cases}$$

t=1, 2, ..., 15. Similarly the indicators $\overline{I}_t^{min}, \overline{I}_t, \overline{I}_t^{max}$ are defined. Then one can evaluate the indices $$\alpha_1 = \sum_{t=1}^{15}(I_t^{min} + I_t + I_t^{max}), \alpha_2 = \sum_{t=1}^{15}(\overline{I}_t^{min} + \overline{I}_t + \overline{I}_t^{max}).$$

These indices also are the proximity measures between the scanograms of the interphase nuclei of the cells of the examined patient Q and the corresponding scanograms of patients suffering from breast cancer and fibroadenoma of the mammary gland, respectively.

These proximity measures permit one to obtain algorithms and test for recognition of the differential diagnosis for breast cancer (the main hypothesis H) and fibroadenomatosis (the alternative hypothesis H').

Calibration of Training Samples and Test for Making Diagnosis

At first, two groups are formed of patient's scanograms $A=\{X_i\}_{i=\overline{1,N}}$ and $B=\{Y_j\}_{j=\overline{1,M}}$ whose diagnosis must be verified exactly. Below, for definiteness, one may suppose that the group A (or B) contains the scanograms of the patients suffering from the cancer of mammary gland—CMG (or the fibroadenomatosis—FAM). After the procedures of registration and measurement of the morpho- and densitometric indices, one can obtain so-called training samples for every index $x_k$ (k=1, 2, ..., 15): $G_A^{(1)}, G_A^{(2)}, \ldots, G_A^{(15)}$ for the patients of the group A (CMG-samples) and $G_B^{(1)}, G_B^{(2)}, \ldots, G_B^{(15)}$ for the patients of the group B (FAM-samples).

Consider the problem of determination what should be the number of training samples in groups A and B to insure sufficiently high level of reliability of the diagnosis. Initially, it is natural to suppose that the number of samples in the groups A and B must be equal. A procedure of calibration of training samples is utilized to confirm this. The procedure consists of the following stages:

1. Exclude patient $X_i$, i=$\overline{1,N}$ (or $Y_j$, j=$\overline{1,M}$) from the set $A \cup B$.

2. On the basis of the set of samples $\{A \cup B\} \backslash X_i$ (or $\{A \cup B\} \backslash Y_j$) construct the tests using pairs of ellipses $(E_{ts}, \overline{E}_{ts})$, $(E_{ts}^*, \overline{E}_{ts}^*)$ and half-planes $(\pi_{ts}, \lambda_{ts})$ $(\pi_{ts}^*, \lambda_{ts}^*)$ 3. Calculate statistics $h_k=h(C_k)$ ($k=\overline{1,6}$) for patient $X_i$, $i=\overline{1,N}$ (or $Y_j$, $j=\overline{1,M}$).

4. Return patient $X_i$, $i=\overline{1,N}$ (or $Y_j$, $j=\overline{1,M}$) in the set $A \cup B$ and repeat this procedure for the next patient.

The results of calibration in the case when the set A consists of 25 scanograms of patients suffering from CMG (so-called CMG-patients), and the set B consists of 25 scanograms of patients suffering from FAM (FAM-patients), are given in Tables 4.1 and 4.2.

Next, consider the following criteria of diagnostics
1) quadratic: $h_3 > h_4 \Rightarrow$ CMG; $h_3 \leq h_4 \Rightarrow$ FAM;
2) linear: $h_5 > h_6 \Rightarrow$ CMG; $h_5 \leq h_6 \Rightarrow$ FAM.

Denote by $D_1$ the diagnose of "CMG" and by $D_2$ the diagnose of "FAM". Let $v_{11}$ be the frequency of the event $D_1$ for the CMG-samples, $v_{21}$ the frequency of $D_2$ for the CMG-samples, $v_{12}$ the frequency of $D_1$ for the FAM-samples, $v_{22}$ the frequency of $D_2$ for the FAM-samples.

Analysis of the results of calibration of the samples from the groups A and B of equal size allow one to make the following inference:

1. In the overwhelming majority of cases one can observe the predominance of the statistics $h_4$ (total FAM) over $h_3$ (total CMG), and statistics $h_2$ (FAM) over $h_1$ (CMG) (one may call this phenomenon the effect of stable predominance). However, for the group A one does not detect this effect.

2. In the case of linear criterion, the events $D_1$ and $D_2$ are nearly equiprobable for group A (training samples of the CMG-patients) and group B (training samples of the FAM-patients). Therefore, this criterion is unfit for the differential diagnostics of CMG from FAM.

3. The quadratic criterion for group B gives much better results, i.e., in 80% of the cases one obtains correct diagnosis (event $D_2$ occurs) and in 20% of the cases the diagnosis is incorrect (event $D_1$ occurs). However, for group A the results are reversed, i.e., in 28% of the cases one can obtain correct diagnosis and in 72% incorrect diagnosis. Therefore, this criterion is also unfit for the differential diagnostics of CMG from FAM.

Since using groups of training samples A and B of equal size with only linear or quadratic criteria did not produce acceptable results, one can calibrate the training samples for the case when the group A (25 scanograms of the CMG-patients) is approximately twice as large as group B (12 scanograms of the FAM-patients). Such selection of sizes had to provide predominance of the statistics $h_3$ (total CMG) over statistics $h_4$ (total FAM) and also $h_1$ (CMG) over $h_2$ (FAM).

TABLE 4.1

Values of the statistics $h_k$ (k = 1, 6) for the CMG-patient's scanograms under calibration of the training samples (24 CMG and 25 FAM)

| Number of patient | $h_1$ CMG | $h_2$ FAM | $h_3$ TCMG | $h_4$ TFAM | $h_5$ LCMG | $h_6$ LFAM |
|---|---|---|---|---|---|---|
| 1 | 0.00952 | 0.00476 | 0.98571 | 0.98095 | 0.38095 | 0.61905 |
| 2 | 0.05238 | 0.17143 | 0.75238 | 0.87143 | 0.22857 | 0.77143 |
| 3 | 0.02857 | 0.00000 | 0.99524 | 0.96667 | 0.74762 | 0.25238 |
| 4 | 0.00952 | 0.33810 | 0.65714 | 0.98571 | 0.44286 | 0.55714 |
| 5 | 0.03333 | 0.18095 | 0.81429 | 0.96190 | 0.23810 | 0.76190 |
| 6 | 0.00952 | 0.04762 | 0.93333 | 0.97143 | 0.42857 | 0.57143 |
| 7 | 0.02857 | 0.00476 | 0.99524 | 0.97143 | 0.70000 | 0.30000 |
| 8 | 0.04762 | 0.13810 | 0.82857 | 0.91905 | 0.60476 | 0.39524 |
| 9 | 0.01429 | 0.08095 | 0.91905 | 0.98571 | 0.69524 | 0.30476 |
| 10 | 0.04762 | 0.07619 | 0.90476 | 0.93333 | 0.78571 | 0.21429 |
| 11 | 0.06667 | 0.10476 | 0.87619 | 0.91429 | 0.64286 | 0.35714 |
| 12 | 0.08095 | 0.09524 | 0.86667 | 0.88095 | 0.70952 | 0.29048 |
| 13 | 0.02381 | 0.01905 | 0.96190 | 0.95714 | 0.34286 | 0.65714 |
| 14 | 0.00000 | 0.01905 | 0.98095 | 1.00000 | 0.86190 | 0.13810 |

TABLE 4.1-continued

Values of the statistics $h_k$ (k = 1, 6) for the CMG-patient's scanograms under calibration of the training samples (24 CMG and 25 FAM)

| Number of patient | $h_1$ CMG | $h_2$ FAM | $h_3$ TCMG | $h_4$ TFAM | $h_5$ LCMG | $h_6$ LFAM |
|---|---|---|---|---|---|---|
| 15 | 0.08571 | 0.23333 | 0.70476 | 0.85238 | 0.72857 | 0.27143 |
| 16 | 0.07143 | 0.07143 | 0.81905 | 0.81905 | 0.66190 | 0.33810 |
| 17 | 0.00476 | 0.00000 | 1.00000 | 0.99524 | 0.49048 | 0.50952 |
| 18 | 0.00476 | 0.03333 | 0.96190 | 0.99048 | 0.34762 | 0.65238 |
| 19 | 0.02381 | 0.01905 | 0.98095 | 0.97619 | 0.83333 | 0.16667 |
| 20 | 0.00000 | 0.00000 | 1.00000 | 1.00000 | 0.42381 | 0.57619 |
| 21 | 0.00476 | 0.03810 | 0.95238 | 0.98571 | 0.54762 | 0.45238 |
| 22 | 0.10476 | 0.04286 | 0.93333 | 0.87143 | 0.71905 | 0.28095 |
| 23 | 0.04762 | 0.25714 | 0.61905 | 0.82857 | 0.40952 | 0.59048 |
| 24 | 0.01905 | 0.08571 | 0.88571 | 0.95238 | 0.58095 | 0.41905 |
| 25 | 0.00000 | 0.01905 | 0.98095 | 1.00000 | 0.40952 | 0.59048 |

TABLE 4.2

Values of the statistics $h_k$ (k = 1, 6) for the FAM-patient's scanograms under calibration of the training samples (24 CMG and 25 FAM)

| Number of patient | $h_1$ CMG | $h_2$ FAM | $h_3$ TCMG | $h_4$ TFAM | $h_5$ LCMG | $h_6$ LFAM |
|---|---|---|---|---|---|---|
| 1 | 0.00000 | 0.03810 | 0.96190 | 1.00000 | 0.25238 | 0.74762 |
| 2 | 0.03333 | 0.35238 | 0.56667 | 0.88571 | 0.33810 | 0.66190 |
| 3 | 0.00000 | 0.31429 | 0.68095 | 0.99524 | 0.21429 | 0.78571 |
| 4 | 0.03333 | 0.08095 | 0.89524 | 0.94286 | 0.83333 | 0.16667 |
| 5 | 0.00952 | 0.01905 | 0.98095 | 0.99048 | 0.50952 | 0.49048 |
| 6 | 0.00476 | 0.02381 | 0.95714 | 0.97619 | 0.70476 | 0.29524 |
| 7 | 0.00000 | 0.03810 | 0.96190 | 1.00000 | 0.25714 | 0.74286 |
| 8 | 0.03810 | 0.20952 | 0.75238 | 0.92381 | 0.22857 | 0.77143 |
| 9 | 0.04286 | 0.24762 | 0.56190 | 0.76667 | 0.30476 | 0.69524 |
| 10 | 0.05238 | 0.19048 | 0.43333 | 0.57143 | 0.20476 | 0.79524 |
| 11 | 0.04286 | 0.03810 | 0.90952 | 0.90476 | 0.59048 | 0.40952 |
| 12 | 0.03810 | 0.05714 | 0.91905 | 0.93810 | 0.80952 | 0.19048 |
| 13 | 0.00476 | 0.05238 | 0.94762 | 0.99524 | 0.86667 | 0.13333 |
| 14 | 0.10000 | 0.10952 | 0.87143 | 0.88095 | 0.58095 | 0.41905 |
| 15 | 0.01905 | 0.21429 | 0.78571 | 0.98095 | 0.42857 | 0.57143 |
| 16 | 0.04286 | 0.00952 | 0.98571 | 0.95238 | 0.68095 | 0.31905 |
| 17 | 0.06190 | 0.00952 | 0.97143 | 0.91905 | 0.79524 | 0.20476 |
| 18 | 0.01429 | 0.03333 | 0.96667 | 0.98571 | 0.91905 | 0.08095 |
| 19 | 0.01429 | 0.02381 | 0.96667 | 0.97619 | 0.53333 | 0.46667 |
| 20 | 0.07143 | 0.13333 | 0.70952 | 0.77143 | 0.45238 | 0.54762 |
| 21 | 0.03810 | 0.00952 | 0.96667 | 0.93810 | 0.63810 | 0.36190 |
| 22 | 0.04286 | 0.10000 | 0.88571 | 0.94286 | 0.20476 | 0.79524 |
| 23 | 0.16190 | 0.14762 | 0.60000 | 0.58571 | 0.92857 | 0.07143 |
| 24 | 0.05238 | 0.29048 | 0.42381 | 0.66190 | 0.27143 | 0.72857 |
| 25 | 0.00952 | 0.11429 | 0.88571 | 0.99048 | 0.24762 | 0.75238 |

TABLE 4.3

Frequency of the random events $D_k$ (k = 1, 2) under calibration of the training samples (24 CMG and 25 FAM)

| Criteria | Frequencies | | | |
|---|---|---|---|---|
| | $v_{11}$ | $v_{21}$ | $v_{22}$ | $v_{12}$ |
| Quadratic | 0.28 | 0.72 | 0.80 | 0.20 |
| Linear | 0.56 | 0.44 | 0.48 | 0.52 |
| Combined | 0.72 | 0.28 | 0.80 | 0.20 |

The results of calibration of these samples are shown in the Tables 4.4-4.6. Based on the analysis of these results one can conclude that:

1. In the overwhelming majority of cases for group A one can observe the predominance of the statistics $h_3$ (total CMG)

over $h_4$ (total FAM), and also $h_1$ (CMG) over $h_2$ (FAM), i.e. the effect of stable predominating occurs. For the group B this effect does not occur.

2. For the linear criterion the events $D_1$ and $D_2$ are practically equiprobable. Hence, this criterion is not suitable for differential diagnostics of CMG from FAM.

3. The quadratic criterion for group A provides good results (in 90% of the cases one can obtain the correct diagnosis, i.e. the event $D_1$ appears, and in 8% of the cases the incorrect diagnosis is detected, i.e. the event $D_2$ occurs). However, for the group B the computer diagnosis was correct in 59% of the cases, and in 44% it was incorrect. Therefore, this criterion is also unfit for differential diagnostics.

It should be noted that the effect of stable predominance of the statistics $h_3$ over $h_4$ for group A is observed only where the areas of the scanogram registration field vary in a rather narrow range (in the above case from 56 to 81). If this condition is violated, then a statistically non-homogeneous sample is formed and the effect of stable predominance becomes less evident.

TABLE 4.4

Values of the statistics $h_k$ (k = 1, 6) for the CMG-patient's scanograms under calibration of the training samples (25 CMG and 12 FAM)

| Number of patient | $h_1$ CMG | $h_2$ FAM | $h_3$ TCMG | $h_4$ TFAM | $h_5$ LCMG | $h_6$ LFAM |
|---|---|---|---|---|---|---|
| 1  | 0.16667 | 0.01905 | 0.97143 | 0.82381 | 0.42381 | 0.57619 |
| 2  | 0.14286 | 0.08095 | 0.81429 | 0.75238 | 0.27619 | 0.72381 |
| 3  | 0.07143 | 0.00000 | 0.99524 | 0.92381 | 0.80952 | 0.19048 |
| 4  | 0.12857 | 0.25714 | 0.69524 | 0.82381 | 0.41905 | 0.58095 |
| 5  | 0.23810 | 0.11905 | 0.77143 | 0.65238 | 0.26190 | 0.73810 |
| 6  | 0.05714 | 0.01905 | 0.93810 | 0.90000 | 0.55238 | 0.44762 |
| 7  | 0.34286 | 0.00952 | 0.90095 | 0.64762 | 0.80952 | 0.19048 |
| 8  | 0.20476 | 0.04286 | 0.82381 | 0.66190 | 0.60952 | 0.39048 |
| 9  | 0.18095 | 0.04762 | 0.91429 | 0.78095 | 0.85238 | 0.14762 |
| 10 | 0.26190 | 0.06190 | 0.89048 | 0.69048 | 0.83333 | 0.16667 |
| 11 | 0.27143 | 0.02381 | 0.85238 | 0.60476 | 0.68095 | 0.31905 |
| 12 | 0.35714 | 0.04286 | 0.88571 | 0.57143 | 0.75714 | 0.24286 |
| 13 | 0.23333 | 0.01905 | 0.95714 | 0.74286 | 0.33810 | 0.66190 |
| 14 | 0.29524 | 0.00000 | 0.97619 | 0.68095 | 0.91429 | 0.08571 |
| 15 | 0.32381 | 0.07619 | 0.70952 | 0.46190 | 0.79524 | 0.20476 |
| 16 | 0.21905 | 0.00476 | 0.80952 | 0.59524 | 0.65238 | 0.34762 |
| 17 | 0.15238 | 0.00000 | 1.00000 | 0.84762 | 0.51905 | 0.48095 |
| 18 | 0.11905 | 0.00476 | 0.98095 | 0.86667 | 0.40000 | 0.60000 |
| 19 | 0.13810 | 0.00476 | 0.99048 | 0.85714 | 0.83810 | 0.16190 |
| 20 | 0.00952 | 0.00000 | 1.00000 | 0.99048 | 0.66667 | 0.33333 |
| 21 | 0.16667 | 0.01905 | 0.97143 | 0.82381 | 0.61905 | 0.38095 |
| 22 | 0.17143 | 0.03333 | 0.92381 | 0.78571 | 0.71905 | 0.28095 |
| 23 | 0.15714 | 0.22381 | 0.67619 | 0.74286 | 0.38095 | 0.61905 |
| 24 | 0.20000 | 0.04286 | 0.89048 | 0.73333 | 0.60000 | 0.40000 |
| 25 | 0.08571 | 0.00952 | 0.97143 | 0.89524 | 0.41905 | 0.58095 |

TABLE 4.5

Values of the statistics $h_k$ (k = 1, 6) for the FAM-patient's scanograms under calibration of the training samples (25 CMG and 12 FAM)

| Number of patient | $h_1$ CMG | $h_2$ FAM | $h_3$ TCMG | $h_4$ TFAM | $h_5$ LCMG | $h_6$ LFAM |
|---|---|---|---|---|---|---|
| 1 | 0.04762 | 0.06190 | 0.92857 | 0.94286 | 0.34286 | 0.65714 |
| 2 | 0.10000 | 0.25714 | 0.58571 | 0.74286 | 0.31429 | 0.68571 |
| 3 | 0.02857 | 0.29048 | 0.69048 | 0.95238 | 0.21429 | 0.78571 |
| 4 | 0.20476 | 0.02857 | 0.91429 | 0.73810 | 0.86667 | 0.13333 |
| 5 | 0.05238 | 0.01905 | 0.97143 | 0.93810 | 0.71429 | 0.28571 |
| 6 | 0.11905 | 0.00952 | 0.93333 | 0.82381 | 0.80476 | 0.13333 |
| 7 | 0.05238 | 0.07619 | 0.91905 | 0.94286 | 0.34762 | 0.65238 |
| 8 | 0.09524 | 0.20952 | 0.72857 | 0.84286 | 0.27143 | 0.72857 |
| 9 | 0.14286 | 0.04286 | 0.50000 | 0.40000 | 0.37143 | 0.62857 |

TABLE 4.5-continued

Values of the statistics $h_k$ (k = 1, 6) for the FAM-patient's scanograms under calibration of the training samples (25 CMG and 12 FAM)

| Number of patient | $h_1$ CMG | $h_2$ FAM | $h_3$ TCMG | $h_4$ TFAM | $h_5$ LCMG | $h_6$ LFAM |
|---|---|---|---|---|---|---|
| 10 | 0.09524 | 0.04286 | 0.43810 | 0.38571 | 0.13810 | 0.86190 |
| 11 | 0.24286 | 0.01905 | 0.92857 | 0.70476 | 0.55238 | 0.44762 |
| 12 | 0.21905 | 0.01429 | 0.95714 | 0.75238 | 0.85714 | 0.14286 |

TABLE 4.6

Frequency of the random events $D_k$ (k = 1, 2) under calibration of the training samples (25 CMG and 12 FAM)

| Criteria | Frequencies | | | |
|---|---|---|---|---|
|  | $v_{11}$ | $v_{21}$ | $v_{22}$ | $v_{12}$ |
| Quadratic | 0.92 | 0.08 | 0.42 | 0.56 |
| Linear    | 0.68 | 0.32 | 0.58 | 0.42 |
| Combined  | 0.92 | 0.08 | 0.58 | 0.42 |

In summary, one must establish that for the samples A and B such that size ratio is 2:1 (more exactly $$\left[\frac{1}{2}\text{card } A\right] \approx \text{card } B,$$

where [x] denotes the integer part of the number x), the use of both quadratic and linear criteria alone does not permit to obtain acceptable results. Nevertheless, the above mentioned effect of stable predominance that is observed for training samples of equal size (card A≈card B), and for training samples such that $$\left[\frac{1}{2}\text{card } A\right] \approx \text{card } B,$$

allows one to formulate a filtering criterion, which is based on the following ideas.

Consider first the calibration results for the training samples of equal size. As was shown in this case, for group B (FAM-patients) one has the effect of stable predominance of the statistics $h_4$ (total FAM) over $h_3$ (total CMG), whereas for group A (CMG-patients) the effect is missing. Let Q be a patient to be diagnosed. On the basis of the groups (training samples) A and B, one can compute the values of the statistics $h_3$ (Q) and $h_4$ (Q) for this patient. Suppose that $h_3(Q) \geq h_4(Q)$. Which hypothesis ($D_1$ or $D_2$) is in better agreement with experimental results? Since the effect of stable predominance $h_3(Q) \leq h_4(Q)$ for group B is observed, the probability of the event "patient Q is suffering from the same disease as patients in group B (i.e. FAM)" will be small. Hence, it is more probable that this patient is suffering from CMG. So, the hypothesis $D_2$ will be in better accord with the experimental results. However, if for this patient $h_3(Q) < h_4(Q)$, then one cannot accept any decision about the diagnosis of patient's disease on the basis of groups A and B of equal size (i.e. one cannot diagnose the disease), because such data may be inherent for CMG-patients as well as for FAM-patients.

Next, define the (so-called) A-filter, which can be used to diagnose CMG in the examined patients for some cases. One can say that a scanogram passes through the A-filter if $h_3(Q) \geq h_4(Q)$, and fails to pass if $h_3(Q) < h_4(Q)$.

Next, define the B-filter. To this end one can use another pair of training samples A and B such that $$\left[\frac{1}{2} \text{card } A\right] \approx \text{card } B,$$

i.e. the size of A is twice as large as that of B. In this case the calibration results show that the reverse effect of stable predominance $h_3(Q) > h_4(Q)$ is achieved for group A. Hence, the values of the statistics $h_3^*(Q)$ and $h_4^*(Q)$ satisfying the inequality $h_3^*(Q) \leq h_4^*(Q)$, obtained for the examined patients with the help of the above training samples A and B, indicate higher probability for the diagnosis of FAM than CMG. Finally, if $h_3^*(Q) > h_4^*(Q)$ then one cannot diagnose the disease (non-acceptance of decision). Thus, one has described the second part of the filtering criterion (the B-filter), which allows one in some cases to diagnose FAM in the patient. One may say that the scanograms of the examined patient pass through the B-filter if $h_3^*(Q) \leq h_4^*(Q)$, and fail to do so if $h_3^*(Q) > h_4^*(Q)$.

In view of the above, the quadratic filtering criterion may be described as follows:

1. Form two pairs of training samples A and B with sizes card A≈card B and $$\left[\frac{1}{2} \text{card } A\right] \approx \text{card } B.$$

The first pair is used in the construction of the A-filter, the second in constructing the B-filter.

2. Perform the above-mentioned process of filtration of the patient's scanogram through the A-filter and B-filter. If these scanograms pass through the A-filter, then the diagnosis CMG is indicated. If they pass through the B-filter, then FAM is indicated. Otherwise, if neither filter is passed, the diagnosis is not made (non-acceptance of decision).

One should note that when group B of the second pair of training samples is obtained from group B of the first pair (by removing one-half of the patient's scanograms) it is impossible, in principle, for the scanograms to pass through both the A-filter and the B-filter of this criterion.

The quadratic filtering criterion is interesting, but it is not acceptable for diagnostic purposes, since the probability of the non-acceptance of decision is too high. Thus, use of a combined filtering criterion (linear, quadratic and order), is be described as follows.

The combined filtering criterion also consists of two filters: A-filter and B-filter. Let $h_i$, $i = \overline{1,8}$ be the above-mentioned statistics of the examined patient Q, obtained with the help of the training samples A and B of equal size (card A≈card B), and denote by $h_i^*$, $i = \overline{1,8}$ the corresponding statistics obtained with the help of the training samples A and B, such that cardA=25, cardB=12. One may say that the scanograms of the patient Q pass through the A-filter if at least one of the following inequalities is true:

$h_3 > h_4$; $\alpha_1 \leq \alpha_2$ (i.e., the proposition $h_3 > h_4 \vee \alpha_1 \leq \alpha_2$ is true), and they pass through the B-filter if at least one of the following inequality is true:

$h_3^* \leq h_4^*$; $\alpha_1^* > \alpha_2^*$ (i.e., the proposition $h_3^* \leq h_4^* \vee \alpha_1^* > \alpha_2^*$ is true).

The combined filtering criterion is formed in the following way: if the scanogram of the examined patient passes through the A-filter, then the diagnosis is CMG. If it passes through the B-filter, then the diagnosis is FAM. Otherwise, one cannot diagnose the disease (the procedure of non-acceptance of decision). Since one has used the B-filter obtained on the basis of the group B of the second pair of training samples $$\left(\left[\frac{1}{2} \text{card } A\right] \approx \text{card } B\right),$$

which is constructed by removing the scanograms of 13 FAM-patients from the group B of the first pair of the training samples (card A≈card B), it follows that the passage of the scanogram of the patient P through both the filters is impossible, in principle. The use of the above calibration procedure of training samples for estimating the criterion quality is not correct in this case, since one obtains the same results as with quadratic filtering criterion. Moreover, only the order criterion gives the exact diagnosis in this case.

For the experimental testing of the quality of the proposed criteria 17 CMG-patients and 7 FAM-patients were selected. All these patients did not belong either to the A-group or the B-group. The A-filter has been constructed on the basis of the 24 CMG-scanograms (group A) and 25 FAM-scanograms (group B), and the B-filter was constructed on the basis of the 25 CMG-scanograms (group A) and 12 FAM-scanograms (group B). The results of testing both of the filters are shown in Tables 4.7-4.9.

Analysis of the experimental results show that in case of combined filtering criterion one can have three possible decisions: 1) to diagnose FAM in the examined patient; 2) to diagnose CMG, and 3) fail to diagnose any disease (non-acceptance of decision). If one obtains a diagnosis of FAM for a patient who is suffering from CMG, then this produces an error of the first kind. If a diagnosis of CMG is obtained for a patient suffering from FAM, then this produces an error of the second kind. On the basis of experimental results one can conclude the following (see Tables 4.7 and 4.8): the probability of error of the first kind is approximately 6%, and the probability of error of the second kind is practically 0%. This means that the probability (more exactly, frequency) of FAM-diagnosis for CMG-patients is approximately 0.06 and the probability of CMG-diagnosis for FAM-patients is 0.00. In addition, the probability of making a diagnosis of the disease (acceptance of decision) is equal to 94% for CMG-patients and 43% for FAM-patients. Thus, based on the analysis of the above process one can diagnose cancer of the mammary gland with high probability. However, to obtain a more accurate diagnosis of fibroadenomatosis, one must repeat the process.

TABLE 4.7

Values of the statistics $h_k$ (k = 1, 6) for the CMG- and FAM-patient's scanograms under testing by A-filter (24 CMG and 25 FAM)

| Number of patient | $h_1$ CMG | $h_2$ FAM | $h_3$ TCMG | $h_4$ TFAM | $h_5$ LCMG | $h_6$ LFAM | $\alpha_1$ | $\alpha_2$ |
|---|---|---|---|---|---|---|---|---|
| 1 | 0.01905 | 0.01429 | 0.81905 | 0.54286 | 0.54286 | 0.45714 | 5 | 9 |
| 2 | 0.00000 | 0.01429 | 0.98571 | 1.00000 | 0.64762 | 0.35238 | 1 | 5 |
| 3 | 0.02857 | 0.07143 | 0.67143 | 0.71429 | 0.40000 | 0.60000 | 6 | 7 |
| 4 | 0.02857 | 0.14762 | 0.60476 | 0.72381 | 0.27143 | 0.72857 | 6 | 8 |
| 5 | 0.06667 | 0.20000 | 0.39524 | 0.52857 | 0.23333 | 0.76667 | 13 | 13 |
| 6 | 0.01905 | 0.10952 | 0.82381 | 0.91429 | 0.32857 | 0.67143 | 7 | 5 |
| 7 | 0.02381 | 0.06190 | 0.64762 | 0.68571 | 0.66667 | 0.33333 | 7 | 8 |
| 8 | 0.02857 | 0.01905 | 0.98095 | 0.97143 | 0.77143 | 0.22857 | 1 | 0 |

TABLE 4.7-continued

Values of the statistics $h_k$ (k = 1, 6) for the CMG- and FAM-patient's scanograms under testing by A-filter (24 CMG and 25 FAM)

| Number of patient | $h_1$ CMG | $h_2$ FAM | $h_3$ TCMG | $h_4$ TFAM | $h_5$ LCMG | $h_6$ LFAM | $\alpha_1$ | $\alpha_2$ |
|---|---|---|---|---|---|---|---|---|
| 9  | 0.06190 | 0.22381 | 0.31429 | 0.47619 | 0.24762 | 0.75238 | 14 | 14 |
| 10 | 0.02381 | 0.00476 | 0.99048 | 9.97143 | 0.44762 | 0.55238 | 0  | 0  |
| 11 | 0.07143 | 0.01905 | 0.88571 | 0.83333 | 0.31905 | 0.68095 | 2  | 3  |
| 12 | 0.00952 | 0.25238 | 0.37143 | 0.61429 | 0.34286 | 0.65714 | 13 | 11 |
| 13 | 0.03810 | 0.09048 | 0.72381 | 0.77619 | 0.80000 | 0.20000 | 5  | 9  |
| 14 | 0.01905 | 0.12857 | 0.54762 | 0.65714 | 0.51429 | 0.48571 | 9  | 9  |
| 15 | 0.07619 | 0.05238 | 0.63333 | 0.60952 | 0.41905 | 0.58095 | 10 | 8  |
| 16 | 0.00952 | 0.12381 | 0.68571 | 0.80000 | 0.25238 | 0.74762 | 8  | 8  |
| 17 | 0.02857 | 0.11905 | 0.60476 | 0.69524 | 0.24286 | 0.75714 | 11 | 11 |
| Fibroadenomatosis | | | | | | | | |
| 18 | 0.00000 | 0.04762 | 0.95238 | 1.00000 | 0.59524 | 0.40476 | 1  | 0  |
| 19 | 0.03333 | 0.37619 | 0.28571 | 0.62857 | 0.17143 | 0.82857 | 19 | 18 |
| 20 | 0.01905 | 0.21905 | 0.56667 | 0.76667 | 0.26667 | 0.73333 | 16 | 9  |
| 21 | 0.00476 | 0.08571 | 0.91429 | 0.99524 | 0.17143 | 0.82857 | 11 | 0  |
| 22 | 0.00000 | 0.39524 | 0.60476 | 1.00000 | 0.88571 | 0.11429 | 1  | 0  |
| 23 | 0.00000 | 0.53810 | 0.45714 | 0.99524 | 0.16667 | 0.83333 | 5  | 0  |
| 24 | 0.00000 | 0.10952 | 0.89048 | 1.00000 | 0.18571 | 0.81429 | 3  | 0  |

TABLE 4.8

Values of the statistics $h_k$ (k = 1, 6) for the CMG- and FAM-patient's scanograms under testing by B-filter (25 CMG and 12 FAM)

| Number of patient | $h_1$ CMG | $h_2$ FAM | $h_3$ TCMG | $h_4$ TFAM | $h_5$ LCMG | $h_6$ LFAM | $\alpha_1$ | $\alpha_2$ |
|---|---|---|---|---|---|---|---|---|
| Breast cancer | | | | | | | | |
| 1  | 0.18095 | 0.00000 | 0.80952 | 0.62857 | 0.35238 | 0.44762 | 5  | 10 |
| 2  | 0.08095 | 0.01429 | 0.98571 | 0.91905 | 0.71429 | 0.28571 | 1  | 5  |
| 3  | 0.17143 | 0.04286 | 0.66190 | 0.53333 | 0.40476 | 0.59524 | 6  | 9  |
| 4  | 0.12381 | 0.10476 | 0.60000 | 0.58095 | 0.30476 | 0.69524 | 6  | 9  |
| 5  | 0.21905 | 0.12381 | 0.41905 | 0.32381 | 0.28095 | 0.71905 | 13 | 14 |
| 6  | 0.20952 | 0.10952 | 0.79524 | 0.69524 | 0.34286 | 0.65714 | 7  | 7  |
| 7  | 0.17143 | 0.04762 | 0.60952 | 0.48571 | 0.67619 | 0.32381 | 7  | 9  |
| 8  | 0.20476 | 0.00000 | 0.97143 | 0.76667 | 0.87143 | 0.12857 | 1  | 3  |
| 9  | 0.17143 | 0.10476 | 0.35714 | 0.29048 | 0.27619 | 0.72381 | 14 | 16 |
| 10 | 0.14286 | 0.00000 | 0.98571 | 0.84286 | 0.50000 | 0.50000 | 0  | 1  |
| 11 | 0.20952 | 0.00476 | 0.89048 | 0.68571 | 0.35238 | 0.64762 | 2  | 9  |
| 12 | 0.12857 | 0.16667 | 0.36190 | 0.40000 | 0.37143 | 0.62857 | 13 | 13 |
| 13 | 0.28095 | 0.02857 | 0.72381 | 0.47143 | 0.77143 | 0.22857 | 5  | 12 |
| 14 | 0.10476 | 0.05714 | 0.47619 | 0.52381 | 0.47619 | 0.55238 | 0.44762 | 9 | 12 |
| 15 | 0.19048 | 0.01905 | 0.60476 | 0.43333 | 0.46667 | 0.53333 | 10 | 11 |
| 16 | 0.19524 | 0.07143 | 0.70476 | 0.58095 | 0.30000 | 0.70000 | 8  | 9  |
| 17 | 0.23333 | 0.07619 | 0.63810 | 0.48095 | 0.29048 | 0.70952 | 11 | 12 |
| Fibroadenomatosis | | | | | | | | |
| 18 | 0.10476 | 0.02381 | 0.95714 | 0.87619 | 0.69048 | 0.30952 | 1  | 1  |
| 19 | 0.11429 | 0.29524 | 0.32381 | 0.50476 | 0.22381 | 0.77619 | 19 | 21 |
| 20 | 0.17143 | 0.18571 | 0.56667 | 0.58095 | 0.29524 | 0.70476 | 16 | 15 |
| 21 | 0.06190 | 0.07143 | 0.86190 | 0.87143 | 0.18095 | 0.81905 | 11 | 9  |
| 22 | 0.35714 | 0.08571 | 0.59524 | 0.32381 | 0.93810 | 0.06190 | 1  | 8  |
| 23 | 0.09524 | 0.24286 | 0.40476 | 0.55238 | 0.20476 | 0.79524 | 5  | 12 |
| 24 | 0.20476 | 0.09048 | 0.86190 | 0.74762 | 0.29048 | 0.70952 | 3  | 9  |

TABLE 4.9

Frequency of the random events $D_k$ (k = 1, 2) under testing of the patient's scanograms by A- and B-filters

| Criterion | Frequencies | | | |
|---|---|---|---|---|
| | $\nu_{11}$ | $\nu_{21}$ | $\nu_{22}$ | $\nu_{12}$ |
| Quadratic | 0.29 | 0.06 | 0.22 | 0.11 |
| Linear    | 0.35 | 0.06 | 0.67 | 0.11 |
| Combined  | 0.94 | 0.06 | 0.43 | 0.0  |

Thus, in one aspect of the present invention, the computer method for the differential diagnosis of breast cancer (CMG) and fibroadenomatosis (FAM) allows for identification of cancer with high probability, based on a single analysis of a patient's buccal smears (the probability of error in the diagnosis and the probability of non-acceptance of decision do not exceed 6%). In the case of patients suffering from fibroadenomatosis, the probability of error in the diagnosis is practically zero, however the probability of non-acceptance of decision based on a single analysis of buccal smears is 43%.

If the decision is not accepted, it is necessary to repeat the analysis by taking more trials (buccal smears), since there is no guarantee that the examined patient is suffering only from CMG and FAM (other diseases may be present, causing a distortion). If the results of the analysis are similar for n trials, then the probability of non-acceptance of decision is approximately equal to $$\left(\frac{1}{2}\right)^n$$

under the condition that the results were obtained independently (so-called independent trials). If it is known that the patient is suffering only from one of the diseases (CMG or FAM), then the value $$\frac{1}{2^n}$$

quickly tends to zero and, as a rule, after 5-6 trials (buccal smears) one can diagnose FAM.

In some embodiments, the patient may be suspected of having a specific, selected malignancy and the sample can be from an associated or nonassociated tissue. For example, the selected malignancy may be breast cancer or fibroadenomatosis. Available tissue indicates tissues that are readily available, such as, for example, buccal epithelium. In another embodiment, the selected malignancy is breast cancer and the nonassociated tissue is buccal epithelium. In another embodiment, the selected malignancy is fibroadenomatosis and the nonassociated tissue is buccal epithelium.

In another aspect, the present invention provides computer-controlled systems comprising a digital imager that provides digital images of a cell and an operably linked controller comprising computer-implemented programming that implements the methods discussed herein. Also provided are the computers or controllers themselves, as well as computer memories containing and implementing the procedures discussed herein and/or containing or implementing the algorithms discussed herein.

The computer-aided cytogenetic method is non-invasive and could be used in conjunction with other methods, such as mammography and ultrasound, to increase the accuracy of the diagnosis. The method is relatively easy to apply and could be used in mass screening of patients for early detection of breast cancer.

Computer-Aided Cytogenetic Method of Breast Cancer Diagnosis

Figure 5:
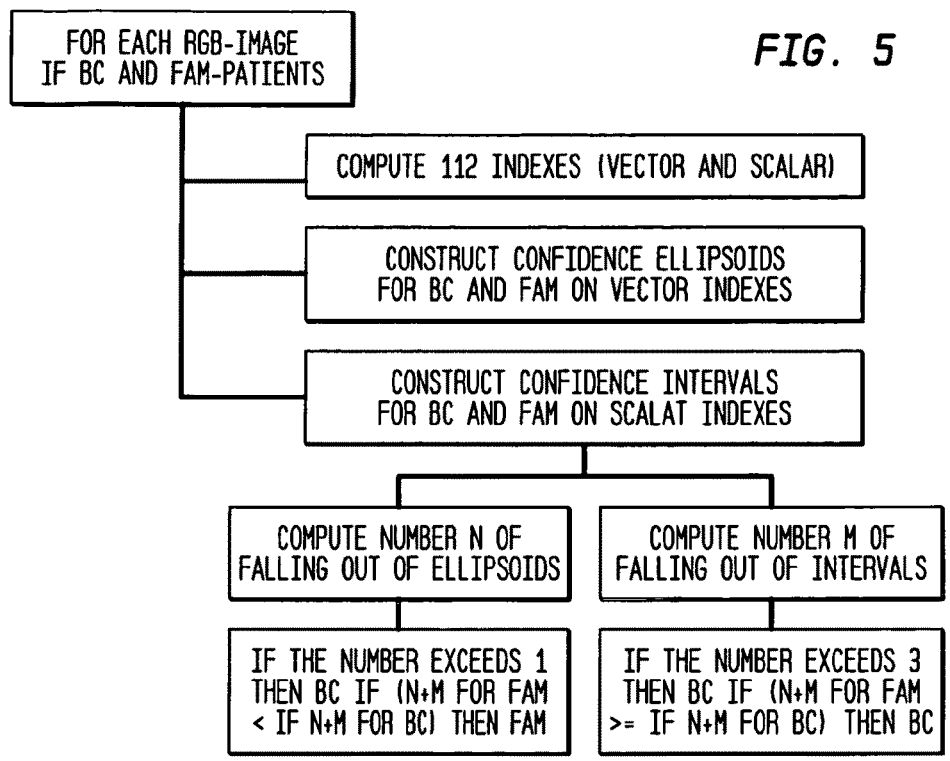
FIG. 5 shows a schematic diagram of the method of comparing samples based on confidence ellipsoids and 3s-intervals and the original decision rule.

In another aspect, the present invention provides a computer-aided cytogenetic method of breast cancer diagnosis, the method comprising the steps: a) obtaining a RGB-image of a scanogram from sample of buccal epithelium obtained from a patient with confirmed breast cancer or confirmed fibroadenomatosis; b) computing 112 indexes, wherein the indexes comprise vector indexes and scalar indexes; c) constructing confidence ellipsoids for breast cancer and fibroadenomatosis on vector indexes; d) constructing confidence intervals of breast cancer and fibroadenomatosis on scalar indexes, wherein i) the number N of falling out of ellipsoids is computed, ii) if the number exceeds 1 then breast cancer, and iii) if (N+M for fibroadenomatosis <if N+M for breast cancer) then fibroadenomatosis; and wherein i) the number M of falling out of intervals is computed, ii) if the number exceeds 3, then breast cancer, iii) if (N+M for fibroadenomatosis ≧if N+M for breast cancer), then breast cancer; whereby a diagnosis of breast cancer or fibroadenomatosis is determined. In one embodiment, the scanogram further comprises a digital image of interphase nuclei. In another embodiment, the interphase nuclei of the sample is stained with a Feulgen staining method. In another embodiment, the scanogram is from a patient potentially having breast cancer or fibroadenomatosis. In another aspect, the present invention provides a computer controlled system comprising a digital imager that provides a scanogram of a cell, and an operably linked controller comprising computer-implemented programming implementing a method for computer-aided breast cancer diagnosis, the method comprising the steps: a) obtaining a RGB-image of a scanogram from a sample of buccal epithelium obtained from a patient with confirmed breast cancer patient or confirmed fibroadenomatosis; b) computing 112 indexes, wherein the indexes comprise vector indexes and scalar indexes; c) constructing confidence ellipsoids for breast cancer and fibroadenomatosis on vector indexes; d) constructing confidence intervals of breast cancer and fibroadenomatosis on scalar indexes, wherein i) the number N of falling out of ellipsoids is computed, ii) if the number exceeds 1 then breast cancer, and iii) if (N+M for fibroadenomatosis <if N+M for breast cancer), then fibroadenomatosis; and wherein i) the number M of falling out of intervals is computed, ii) if the number exceeds 3, then breast cancer, iii) if (N+M for fibroadenomatosis ≧if N+M for breast cancer), then breast cancer, thereby determining a diagnosis of breast cancer or fibroadenomatosis. The number "fall out" from an interval if it does not belong to this interval. In one embodiment, the scanogram further comprises a digital image of interphase nuclei. In another embodiment, the interphase nuclei of the sample is stained with a Feulgen staining method. In another embodiment, the scanogram is from a patient potentially having a selected malignancy and the sample is not from a diseased tissue. In another embodiment, the selected malignancy is breast cancer or fibroadenomatosis. FIG. 5 shows a schematic diagram of one embodiment of the present invention comparing samples based on confidence ellipsoids and 3s-intervals and the original decision rule.

The term "RGB-image" refers to a photograph of a cell. An RGB-image of a scanogram is a photograph of a cell made via a microscope using some filter (yellow or violet) or without using a filter.

In another aspect, the present invention provides a computer-aided cytogenetic method for the diagnosis of breast cancer. The method is based on mathematical/statistical analysis of the indexes of interphase nuclei of buccal epitheliocytes, calculated with respect to their RGB-image after Feulgen staining.

In one embodiment, the present invention provides a method for cancer diagnosis that distinguishes subjects with breast cancer from subjects with fibroadenomatosis based on analysis of RGB-images of interphase nuclei of subjects' buccal epitheliocytes.

In another embodiment, the present invention provides a method for cancer diagnosis, the method comprising the steps of obtaining buccal epithelial cells; staining the buccal epithelial cells with a stain that allows visualization of interphase nuclei of the cells; obtaining RGB-images of stained nuclei of the buccal epithelial cells; and for every RGB-image calculating indexes, whereby subjects with breast cancer are distinguished from subjects with fibroadenomatosis.

The term "subject" and "patient" as used herein are used interchangeably and refer to one who is suffering from any disease or behavioral disorder and is under treatment for it. A healthy subject or patient who is well, in a state of normal functioning, or free from disease. A subject with breast cancer may be referred to as "BC." A subject with fibroadenomatosis may be referred to as "FAM." The term "investigated sample" or "sample" as used herein refers to a specimen. For example, an investigated sample may be a sample obtained from a patient potentially having breast cancer or fibroadenomatosis, or may be a sample corresponding to a patient whose diagnosis is unknown. The term "sample" may also refer to a subset of a population that may be representative of the whole population (or as commonly used in the art of statistics).

In another embodiment, buccal epithelial cells are obtained from a subject by scraping, gargling, or other means. Buccal cells (smears) may be obtained from the median depth of the spinous layer from the subjects' oral cavity. In another embodiment, the buccal epithelial cells are used to create smears. The term "smear" as used herein refers to a thin specimen for examination. It is usually prepared by spreading material uniformly onto a glass slide, fixing it, and staining it before examination. The phrase "buccal smear" as used herein refers to a cytologic smear containing material obtained by scraping the lateral buccal mucosa above the dentate line, smearing, and fixing immediately. The term "cytologic smear" or "cytosmear" as used herein refers to a type of cytologic specimen made by smearing a sample (obtained by a variety of methods from a number of sites), then fixing it and staining it. The term "stain" as used herein refers to discolor, to color, or to dye; the term "stain" also refers to a discoloration, a dye in histologic and bacteriologic technique; the term "stain" also refers to a procedure in which a dye or combination of dyes and reagents is used to color the constituents of cells and tissues.

In another embodiment, the stains are interphase nuclei stains. Appropriate stains include, but are not limited to, Feulgen stain. Feulgen stain is a staining technique discovered by Robert Feulgen and used in histology to identify chromosomal material or DNA in cell specimens. It depends on acid hydrolysis of DNA, therefore fixating agents using strong acids should be avoided. The specimen is subjected to warm (60° C.) hydrochloric acid, then to Schiff reagent. Optionally, a sulfite rinse may be used. Optionally, the sample can be counterstained with Light Green SF yellowish. Finally, it is dehydrated with ethanol, cleared with xylene, and mounted in a resinous medium. DNA should be stained red. The background, if counterstained, is green. In another embodiment, any stain appropriate for use in identifying chromosomal material or DNA in cells specimens may be used.

In another embodiment, the RGB-images are obtained utilizing a digital microscope connected to a digital camera. Such instrument platforms are commercially available from vendors such as, for example, Olympus (Center Valley, Pa.), Celestron (Torrance, Calif.), Zeiss (Maple Grove, Minn.), and Optronics (Goleta, Calif.).

In another embodiment, the RGB-images are RGB-images of the interphase cell nuclei of buccal epithelium. In another embodiment, the RGB-images are obtained using a filter. In some such embodiments, the filter is a violet filter. In some such embodiments, the filter is a yellow filter. In some such embodiments, the RGB-image is obtained with no filter used.

In another embodiment, RGB-images are obtained of 30 to 100 typical nuclei. In another embodiment, RGB-images are obtained of 20 to 100 typical nuclei. In another embodiment, RGB-images are obtained of 30 to 200 typical nuclei. In another embodiment, RGB-images are obtained of 20 to 200 typical nuclei.

In another embodiment, multiple RGB-images are obtained from each subject of the interphase cell nuclei of buccal epithelium. In some such embodiments, at least 2 RGB-images are obtained. In some such embodiments, at least 10 RGB-images are obtained. In some such embodiments, at least 20 RGB-images are obtained. In some such embodiments, at least 50 RGB-images are obtained. In some such embodiments greater than 5 RGB-images are obtained. In some such embodiments, greater than 50 RGB-images are obtained. In some such embodiments, greater than 100 RGB-images are obtained. In another embodiment, each RGB-image comprises a matrix containing 160×160 integer numbers.

In another embodiment, the RGB-images are training sample images. In some such embodiments, the training sample images are RGB-images of interphase nuclei of buccal epithelium from women with breast cancer. In some such embodiments, the training sample images are RGB-images of interphase nuclei of bucchal epithelium from women with fibroadenomatosis. In some such embodiments, the training sample images are RGB-images of interphase nuclei of bucchal epithelium from healthy women. In some such embodiments, the training sample images are RGB-images of interphase nuclei of bucchal epithelium from healthy women without breast cancer or fibroadenomatosis.

The term "confidence ellipsoid" as used herein refers to an ellipsoid to which the random value belong to given probability (confidence level). It is constructed for vector indexes The term "confidence interval" as used herein refers to an interval to which the random value belong to given probability (confidence level). It is constructed for scalar indexes (numbers).

An exemplary aspect of the present invention is described as follows: 68 patients suffering from breast cancer (BC), 33 patients suffering from fibroadenomatosis (FAM) and 30 healthy women (control) were considered. Each diagnosis is verified by histological investigation of the removed tumor. The health of women in the control group is verified by clinical examination. After gargling and removing the superficial cell layer of buccal mucous, smears are obtained from the median depth of the spinous layer from the patient's oral cavity. The smears are dried out under room temperature and fixed for 30 minutes in Nikiforov's mixture, followed by Feulgen staining with cold hydrolysis in 5 N HCl for 15 minutes at approximately 21° C. to 22° C. Then RGB-images (R=red, G=green, B=blue) are made of 30 to 100 typical nuclei, consisting of 160×160 pixels. Finally, for every RGB-image, 112 indexes (25 vector and 87 scalar quantities) (see Table 5) are calculated. Part of these indexes are vectors and part are numbers. These indexes are calculated on the basis of RGB-images that were created using yellow and violet filters, and also without any filter. The first 25 vector indexes characterize the entropy distribution of the nuclei, the entire image of a cell, and the exterior of nuclei in 3, 4, 5, 6, 7 and 8-dimensional spaces, using confidence ellipsoids. In addition, some of these 3D-parameters are combinations of area, perimeter and form-factor. The other 87 indexes are scalar parameters that characterize the average entropy, curvature of spanning surfaces, and the distribution of frequencies of some threshold levels of colors. To identify the above indexes, the following notation is introduced: Ent=entropy; Nucleus=parameter of RGB-image of nucleus; Backg=parameters of RGB-image of space outside of nucleus; Total=parameters of whole RGB-image (R red component, G green component, B blue component); SC=parameter of scanogram; Area=area of nucleus; Perimeter=perimeter of nucleus; Fform=form-factor, CV—curvature; S=standard deviation; N=without filter; Y=orange filter; V=violet filter; MC=modal classes, i.e. levels of the color (1, 2, ..., 255) for which the frequences $p_1$ and $p_2$ of the pixels of the whole scanogram (of the nucleus only) having such color are calculated. The modal classes are chosen arbitrarily, $$CI_1 = \frac{1}{(n-1)^2}\left(\sum_{i=1}^{n}\sum_{j=1}^{n-1}|s_{ij+1} - s_{ij}| + \sum_{i=1}^{n-1}\sum_{j=1}^{n}|s_{i+1j} - s_{ij}|\right), \quad \text{Equation [1]}$$

$$CI_2 = \frac{1}{N_C}\left(\sum_{i \in Pr_X C}\sum_{j:(i,j)\in C}|s_{ij+1} - s_{ij}| + \sum_{j \in Pr_Y C}\sum_{i:(i,j)\in C}|s_{ij+1} - s_{ij}|\right),$$

where $N_C$ is the number of pixels in the scanogram, $s_{ij}$ is an element of the scanogram, $CI_1$ is the first curvature index characterizing surface curvature along x and y axle when whole scanogram is considered (both nucleus and background), $CI_2$ is the curvature index of nucleus where $Pr_X C$ is the projection of C on x-axis and $Pr_Y C$ is the projection of C on y-axis, C is a set of all pairs (i,j), where i,j-th pixel belongs to the nucleus, MCVF1—the first modal class volume factor=$p_1/p_2$, MCVF2—the second modal class volume factor=$p_1/p_2$ (for pixels from nucleus), R correct % and B correct % are the percentages of scanograms with correctly built boundary for red and green components, respectively.

The ratio of modal class volumes is obtained by considering the set of all scanograms as an unarranged set of random values from some general population, and by distributing this set into 3 modal classes consisting of the random values from the predefined ranges $M_1=\{s_{ij}:0\leq s_{ij}<0.15\}$, $M_2=\{s_{ij}:0.15\leq s_{ij}\leq 0.30\}$,
$M_3=\{s_{ij}:s_{ij}>0.30\}$ and, finally, by calculating the ratio of volumes of the modal classes $M_1$ and $M_2$ in the kth scanogram:

$$V_k = \frac{cardM_1^{(k)}}{cardM_2^{(k)}},$$

where $cardM_j^{(k)}$, j=1, 2 is the number of the elements from the modal class M(k) (for example, $cardM_2^{(k)}$ is the number of points in the kth scanogram, where the DNA optical density varies from 0.15 to 0.30). The ratio of modal class volumes is characteristic for each patient and is given by the average of all scanograms:

$$V = \frac{1}{N}\sum_{k=1}^{N} V_k$$

This index is statistical in nature, since it contains the information about the distribution of the DNA optical density in the interphase nuclei of epitheliocytes in buccal epithelium.

TABLE 5

112 Indexes of RGB-images.

1. Ent N/G Nucleus + Ent N/G Backg + Ent N/G Total
2. Ent Y/G Nucleus + Ent Y/G Backg + Ent Y/G Total
3. Ent V/G Nucleus + Ent V/G Backg + Ent V/G Total
4. SC N/G Area + SC N/G Perimeter + SC N/G FForm
5. SC Y/G Area + SC Y/G Perimeter + SC Y/G FForm
6. SC V/G Area + SC V/G Perimeter + SC V/G Fform
7. CV Y/R $CI_1$ + CV Y/R $CI_2$ + CV Y/G $CI_1$ + CV Y/R $CI_2$
8. MC Y/R MCVF1 + MC Y/R MCVF2 + MC Y/G MCVF1 + MC Y/G MCVF2
9. Ent N/G Nucleus + Ent N/G Backgr
10. Ent N/G Nucleus + Ent N/G Backg + Ent N/G Total
11. Ent N/R Nucleus + Ent N/R Backg + Ent N/R Total + Ent N/G Nucleus + Ent N/G Backg + Ent N/G Total
12. Ent Y/G Nucleus + Ent Y/G Backgr
13. Ent Y/G Nucleus + Ent Y/G Backg + Ent Y/G Total
14. Ent Y/R Nucleus + Ent Y/R Backg + Ent Y/R Total + Ent Y/G Nucleus + Ent Y/G Backg + Ent Y/G Total
15. Ent V/G Nucleus + Ent V/G Backg
16. Ent V/G Nucleus + Ent V/G Backg + Ent V/G Total
17. Ent V/R Nucleus + Ent V/R Backg + Ent V/R Total + Ent V/G Nucleus + Ent V/G Backg + Ent V/G Total
18. SC N/R Area + SC N/R Perimeter + SC N/R FForm
19. SC N/G Area + SC N/G Perimeter + SC N/G FForm
20. SC N/B Area + SC N/B Perimeter + SC N/B FForm
21. SC Y/R Area + SC Y/R Perimeter + SC Y/R FForm
22. SC Y/G Area + SC Y/G Perimeter + SC Y/G FForm
23. SC V/R Area + SC V/R Perimeter + SC V/R FForm
24. SC V/G Area + SC V/G Perimeter + SC V/G FForm
25. SC V/B Area + SC V/B Perimeter + SC V/B FForm
26. Ent N/R correct %
27. Ent N/R Nucleus
28. Ent N/R Backg
29. Ent N/R Total
30. Ent N/G Nucleus
31. Ent N/G Backg
32. Ent N/G Total
33. Ent N/B correct %
34. Ent N/B Nucleus
35. Ent N/B Backg
36. Ent N/B Total
37. Ent Y/R correct %

TABLE 5-continued

112 Indexes of RGB-images.

38. Ent Y/R Nucleus
39. Ent Y/R Backg
40. Ent Y/R Total
41. Ent Y/G correct %
42. Ent Y/G Nucleus
43. Ent Y/G Backg
44. Ent Y/G Total
45. Ent V/R correct %
46. Ent V/R Nucleus
47. Ent V/R Backg
48. Ent V/R Total
49. Ent V/G correct %
50. Ent V/G Nucleus
51. Ent V/G Backg
52. Ent V/G Total
53. Ent V/B correct %
54. Ent V/B Nucleus
55. Ent V/B Backg
56. Ent V/B Total
57. CV Y/R Correct %
58. CV Y/G Correct %
59. CV Y/R $CI_1$
60. CV Y/R $CI_2$
61. CV Y/G $CI_1$
62. CV Y/G $CI_2$
63. MC Y/R Correct %
64. MC Y/G Correct %
65. MC Y/R MCVF1
66. MC Y/R MCVF2
67. MC Y/G MCVF1
68. MC Y/G MCVF2
69. SC N/R Correct %
70. SC N/R Area
71. SC N/R Perimeter
72. SC N/R Fform
73. SC N/G Area
74. SC N/G Perimeter
75. SC N/G FForm
76. SC N/B Correct %
77. SC N/B Area
78. SC N/B Perimeter
79. SC Y/R Correct %
80. SC Y/R Area
81. SC Y/R Perimeter
82. SC Y/R FForm
83. SC Y/G Correct %
84. SC Y/G Area
85. SC Y/G Perimeter
86. SC Y/G FForm
87. SC V/R Correct %
88. SC V/R Area
89. SC V/R Perimeter
90. SC V/R FForm
91. SC V/G Correct %
92. SC V/G Area
93. SC V/G Perimeter
94. SC V/B Correct %
95. SC V/B Area
96. SC V/B Perimeter
97. SC V/B FForm
98. $CI_1$ N/R Correct %
99. $CI_1$ N/R X-bar
100. $CI_1$ N/R S
101. $CI_1$ N/G S
102. $CI_1$ V/B Correct %
103. $CI_1$ V/R Correct %
104. $CI_1$ V/R X-bar
105. $CI_1$ V/G S
106. $CI_1$ V/B Correct %
107. $CI_1$ Y/R Correct %
108. $CI_1$ Y/R X-bar
109. $CI_1$ Y/R S
110. $CI_1$ Y/G Correct %
111. $CI_1$ Y/G X-bar
112. $CI_1$ Y/G S First Stage of Differential Diagnosis For first stage of differential diagnosis (for BC-patients), the confidence ellipses for BC-patients are denoted by $E_{BC}^{(k)}$, k=1, . . . 25, and the confidence ellipses for FAM-patients by $E_{FAM}^{(k)}$, k=1, . . . 25. The confidence intervals for healthy patients constructed by minimal and maximal order statistics is denoted by $I_i=(\alpha_{min}^{(i)}, \alpha_{max}^{(i)})$, i=1, . . . , 112, and the confidence intervals for healthy patients constructed by means of the 3s-rule by $J_i=(\bar{x}_i-3s_i, \bar{x}_i+3s_i)$, i=1, . . . , 112.

For identification of BC patients, FAM patients were investigated using the "leave-one-out" scheme, which showed that the number of indexes that fall outside the confidence ellipses $E_{FAM}^{(k)}$, k=1, . . . 25 varied from 0 to 3 for almost all FAM patients (for one patient this number was 5). Moreover, the number of patients' indexes that fell outside the remaining 87 confidence intervals was equal to 0 or 1. Thus, the following rule is used: if the number of patient's indexes falling outside the confidence ellipses $E_{FAM}^{(k)}$ k=1, . . . 25 and $(\alpha_{min}^{(i)}, \alpha_{max}^{(i)})$ i=1, . . . , 112 exceeds 3 and 1, respectively, then this patient suffers from BC. In the sample of 68 BC patients this rule was satisfied by 26 patients.

The remaining 42 patients did not satisfy these conditions. To identify BC patients in this group, the confidence interval for indexes of healthy women was considered. The results showed that the number of indexes that fell outside the FAM-patient's control confidence interval varied from 4 to 33, and for BC patients this number varied from 2 to 43. Therefore, a patient with BC is identified if the number of the patient's indexes falling outside the above confidence interval exceeded 33. A total of 8 such patients were identified, however among these patients only 4 were new, since the remaining 4 were included in the group of 26 patients mentioned above.

Further filtration is based on the confidence intervals for the control group constructed by 3s-rule. The number of indexes of FAM-patient's falling outside the control confidence interval varied from 5 to 26, and for BC patients this number varied from 4 to 35. Therefore, a patient was identified as having BC if the number of the patient's falling-out indexes exceeded 26. Following this procedure, the identification of 6 new patients that were not identified at previous stages was made.

Thus, applying the above three-stage filtration procedure to 68 patients, the correct diagnosis of BC was made in 36/68 patients (or 52.9%), and incorrect diagnosis was made for 1 patient (FAM was diagnosed as BC). No decision (rejection of decision) was made in the case of the remaining 31 patients.

Second Stage of Differential Diagnosis

The second stage of diagnosis searches only for the FAM patients. At this stage the confidence ellipses $E_{BC}^{(k)}$ and $E_{FAM}^{(k)}$, k=1, . . . 25, and the confidence intervals $I_{FAM}^{(k)}$ and $I_{BC}^{(k)}$, k=1, . . . 25, constructed by 3s-rule, are used.

To present these results, the following notation is introduced: $n_{FAM}$=the number of patient's indexes that fall outside the confidence ellipses, constructed for vector indexes of FAM patients; $n_{BC}$=the number of patient's indexes that fall outside the confidence ellipses, constructed for vector indexes of FAM patients; $m_{FAM}$=the number of patient's indexes that fall outside the confidence ellipses, constructed for scalar indexes of FAM patients by 3s-rule; $m_{BC}$=the number of patient's indexes that fall outside the confidence ellipses, constructed for scalar indexes of BC patients by 3s-rule.

Consider the indexes $l_{FAM}=n_{FAM}+m_{FAM}$ and $l_{BC}=n_{BC}+m_{BC}$. The rule for diagnosis of FAM has the following form: if $l_{FAM}<l_{BC}$, then patient has fibroadenomatosis, in all other cases the making of a decision is rejected. For almost all BC patients (excluding one patient) the condition $l_{FAM} \geq l_{BC}$ was satisfied. Hence, at the second stage a decision was not be made for almost all BC patients, and in one case and incorrect diagnosis (with probability 1/68) was made. For the FAM patients judgment is reserved in 23 cases, and made 10 correct diagnoses.

Taking into account the number of BC and FAM patients with unconfirmed diagnoses, it is clear that in 56 of 101 cases (i.e. 55.4%) no decision was reached (rejection of decision). To make a decision in these cases, repetition of the analysis would have to be made on new smears from the patients.

Table 6 is shows, by denoting by H the null hypothesis (BC), and by H' the alternative competitive hypotheses (FAM) and using the formulas for calculating errors of type I and II, and the probability of rejection of decision (RD), the estimated probabilities of errors of type I and II corresponding to the number N of repetitive analyses. Thus after 5 repetitions of the analyses described, the correct diagnosis was obtained with probabilities of error of type I and II not exceeding 2.8% and 6.7%, respectively, and the probability of rejection of making a decision (RD) not exceeding 5.2%.

TABLE 6

| N | Type I (%) | Type II (%) | RD (%) | Decision (%) |
|---|---|---|---|---|
| 1 | 1.4 | 3.3 | 55.4 | 44.6 |
| 2 | 2.2 | 5.1 | 30.7 | 24.7 |
| 3 | 2.6 | 6 | 17 | 13.7 |
| 4 | 2.8 | 6.5 | 9.4 | 7.6 |
| 5 | 2.8 | 6.7 | 5.2 | 4.2 |

Test Criteria

1. The 3σ-Rule

The empirical 3σ-rule, which is well known in mathematical statistics, states that for the overwhelming majority of commonly encountered random variables x the following inequality holds:

$$P(|x-m(x)| \geq 3\sigma(x)) \leq 0.05 \qquad \text{Equation [2]}$$

In this formula m(x) is the expectation and σ(x) is the standard deviation of x. The value of the constant 0.05 is stipulated by the fact that in many applied sciences (for example, biology and medicine) the 5% significance level is the most widely used. The justification of the 3σ-rule was given in *Theor. Probability. and Mathem. Statistics*, 21:25-36, 1980, incorporated herein by reference. There also exist several different proofs of this empirical rule.

Theorem 1. For all k>0, the following inequality holds for an arbitrary random variable x having a unimodal distribution and finite variance $\sigma^2(x)>0$ $$p(|x-m(x)| \geq k\sigma(x)) \leq \frac{4}{9} \cdot \frac{1}{k^2}, k \geq \sqrt{\frac{8}{3}} \qquad \text{Equation [3]}$$

2. The 3s-Rule

In order to construct the confidence interval containing the bulk of general population G with the help of Gauss-Vysochansky-Petunin inequality the mathematical expectation m(x) and variance $\sigma^2(x)$ must be known. Unfortunately, these characteristics are usually unknown. In this case, one selects a random sample $x_1, x_2, \ldots, x_n$ from the general population G and replaces the unknown values m(x) and $\sigma^2(x)$ by their estimations $\bar{x}$ and $s_n^2$ respectively.

$$m(x) \approx \bar{x} = \frac{1}{n}\sum_{k=1}^{n} x_k,$$

$$\sigma^2(x) \approx s^2 = \frac{1}{n-1}\sum_{k=1}^{n}(x_k - \bar{x})^2$$

These estimations have good properties. They are unbiased, i.e. their mathematical expectations coincide with the exact value of the estimated parameters m(x) and D(x):

$$m(\bar{x}) = m(x)$$

$$m(s^2(x)) = D(x)$$

In constructing the confidence interval J containing the bulk of the general population G on the basis of the sample $x_1, x_2, \ldots, x_n$ it is quite natural to replace the mathematical expectation m(x) and the variance $\sigma^2(x)$ by their estimations $\bar{x}$ and $s^2$ respectively. So, the so-called 3s-rule is formulated:

$$\hat{J} = (\bar{x} - 3s, \bar{x} + 3s)$$

where $$\bar{x} = \frac{1}{n}\sum_{k=1}^{n} x_k,$$

$$s^2 = \frac{1}{n-1}\sum_{k=1}^{n}(x_k - \bar{x})^2.$$

When n is large, this interval contains not less than 95% of the values from G. One may consider under what n the 3s-rule holds. According to practical recommendations, the estimation $\bar{x}$ almost coincides with m(x) when n≧30, and $s^2(x) \approx D(x)$ when n≧150. But mathematical simulations show that the interval $\hat{J}$ contains not less than 95% of the values from G when n≧11.

The 3s-rule is closely connected with the $3s_1$-rule, which allows one to calculate a confidence interval for unknown mathematical expectation m(x) on the basis of the sample $x_1, x_2, \ldots, x_n$ with significance level not exceeding 0.05. At first, one may consider the problem of the constructing of the confidence interval on the basis of 3σ-rule, in the case when the value of the random variable x and its variance $\sigma^2(x)$ are known. By virtue of the inequality [3] one has:

$$p(|x - m(x)| \le 3\sigma(x)) = p(-3\sigma(x) \le m(x) - x \le 3\sigma(x)) =$$
$$= p(x - 3\sigma(x) \le m(x) \le x + 3\sigma(x)) \ge 0.95$$

Hence, it follows that the interval J=(x−3σ(x), x+3σ(x)) is a random confidence interval for unknown mathematical expectation m(x) with significance level 0.05 (by virtue of 3σ-rule). In prevalent number of cases one can put x=$\bar{x}$, so that:

$$m(\bar{x}) = m\left(\frac{1}{n}\sum_{k=1}^{n} x_k\right)$$
$$= \frac{1}{n} m\left(\sum_{k=1}^{n} x_k\right) =$$
$$= \frac{1}{n}\sum_{k=1}^{n} m(x_k)$$
$$= m(x),$$

$$\sigma^2(\bar{x}) = D(\bar{x})$$
$$= D\left(\frac{1}{n}\sum_{k=1}^{n} x_k\right) =$$
$$= \frac{1}{n^2}\sum_{k=1}^{n} D(x_k)$$
$$= \frac{\sigma^2}{n}.$$

Therefore, the significance level of the confidence interval $$\left(\bar{x} - 3\frac{\sigma}{\sqrt{n}}, \bar{x} + 3\frac{\sigma}{\sqrt{n}}\right)$$

does not exceed 0.05, i.e.

$$p\left(m(x) \in \left(\bar{x} - 3\frac{\sigma(x)}{\sqrt{n}}, \bar{x} + 3\frac{\sigma(x)}{\sqrt{n}}\right)\right) \ge 0.95$$

It is easy to see that the following estimation of the variance of the sample mean is unbiased, and has the same properties as the estimation $s^2(x)$:

$$s_1^2(\bar{x}) = \frac{1}{n}s^2(x) = \frac{1}{n(n-1)}\sum_{k=1}^{n}(x_k - \bar{x})^2$$

Replacing $\sigma^2(\bar{x})$ by its estimation $s_1^2(\bar{x})$, one obtains the $3s_1$-rule that states that the confidence interval, $$J_1 = \left(\bar{x} - \frac{3s(x)}{\sqrt{n}}, \bar{x} + \frac{3s(x)}{\sqrt{n}}\right),$$

contains unknown mathematical expectation m(x) with the probability not exceeding 0.95, when n is large.

Since the estimation $s^2(x)$ has practically the same value as $\sigma^2(x)$ if n≧150, one may assume that the estimation $s_1^2(\bar{x})$ coincides with the variance $\sigma^2(\bar{x})$ and that the $3s_1$-rule holds when n≧150. Nevertheless, this rule may be applied even for n≧11.

In mathematical statistics samples are classified by their size: 1) small samples, when n≦30; 2) middle samples, when 30<n<150, and 3) large samples, when n≧150. To summarize, one can state that the 3s and $3s_1$-rules hold for middle and large samples, and even for small samples, if their size exceeds n=11.

3. Confidence Intervals and Order Statistics

Suppose G is some general population with unknown distribution function F(u) $x_1, x_2, \ldots, x_n$ is a sample obtained from G as the result of a simple random sampling, and x is an element from G which does not depend on the sample $x_1, x_2, \ldots, x_n$.

Let $x_{(1)} \leq \ldots \leq x_{(i)} \leq \ldots \leq x_{(j)} \leq \ldots \leq x_{(n)}$ be a variational series of the sample $x_1, x_2, \ldots, x_n$, and let $x_{(i)}$ be the ith order statistics. The basic aim of this section is the construction of the most accurate confidence interval (a,b), a<b, containing the bulk of general population G, where $a(x_1, x_2, \ldots, x_n)$ and $b(x_1, x_2, \ldots, x_n)$ are two arbitrary Borel-measured functions of the sample values $x_1, x_2, \ldots, x_n$.

The notions of reliability of an arbitrary confidence interval J=(a,b) containing the bulk of the general populations are introduced. Let $a(u_1, u_2, \ldots, u_n)$ and $b(u_1, u_2, \ldots, u_n)$ be two arbitrary (Borel) functions satisfying for every $u \in R^1$ the following inequality:

$$a(u_1, u_2, \ldots, u_n) \leq b(u_1, u_2, \ldots, u_n)$$

Using these functions and sample $x_1, x_2, \ldots, x_n$ one can construct a random confidence interval $J=(a(u_1, u_2, \ldots, u_n), b(u_1, u_2, \ldots, u_n))$ for the bulk of the general population G. Suppose, that the random variables $a(u_1, u_2, \ldots, u_n)$ and $b(u_1, u_2, \ldots, u_n)$ have the mathematical expectations m(a) and m(b), respectively. The reliability $\alpha(a,b)$ of the confidence interval J its significance level is called:

$$\alpha(a,b) = p(x \in (a,b)),$$

Theorem 2. If G is a general population with continuous distribution F(u), then the reliability level of the confidence interval $(x_{(i)}, x_{(j)})$ is equal to $$\frac{j-i}{n+1}.$$

4. Ellipsoid of Minimal Volume Enclosing the Set

Consider the following algorithm for constructing an ellipsoid of minimal volume enclosing the set of point $M = \{X_k\}_{k=1, \ldots, N} \subset R^n$ The algorithm in the case of $R^2$ is described. At the first stage of the algorithm one may select the pair of the points $X_i$ and $X_j$ with maximal distance between them:

$$\rho(X_i, X_j) = \text{diam}\{X_k\}_{k=1, \ldots, N}$$

Then the points $X_i$ and $X_j$ are connected by the segment $a=[X_i, X_j]$ and the coordinate system is rotated so that the abscissa becomes parallel to the segment a. Then one may construct the minimal rectangle P containing the set M with sides which are parallel to coordinate axes of the new coordinate system. At the next stage one can compress the plane along the abscissa so that the rectangle P transforms to the square K, and construct a circle C of minimal radius ρ centered at the point U, which corresponds to the intersection of diagonals of the square K containing all points of the set $$M: \rho = \max_{k=1, \ldots, N} \rho(U, X_k)$$

At the last stage one can perform an inverse transformation: expansion of the plane transforming the square K into the rectangle P and the circle C into the ellipse E containing the set M. This ellipse is considered as an approximation of the ellipse having minimal area.

The construction of the ellipsoid having minimal volume containing the set M in $R^3$ is performed in the following way. As in the case of $R^2$, one may first select the pair of points $X_i, X_j$ with maximal distance (the ends of the diameter of the set M). Let $a=[X_i, X_j]$ be the line segment joining the points $X_i, X_j$ and pass through the ends of the segment $\alpha$ two planes, $\beta$ and $\gamma$, which are perpendicular to the segment $\alpha$. Consider the orthogonal projection of the set M on the plane $\beta$ and denote this set by $M_\beta$. Then with the help of the method described above one can construct the minimal rectangle $P_\beta$ on the plane $\beta$, containing the set $M_\beta$ whose side is parallel to the segment $\alpha$. The rectangle $P_\beta$ and the segment $\alpha$ determine the parallelepiped $P = P_\beta \times \alpha$ containing the set M. Then one can compress the space in the direction which is parallel to the segment $\alpha$ so that the parallelepiped P transforms to the cube K. At the next stage one can construct the ball C of minimal radius centered at the point U, which corresponds to the intersection of the diagonals of the cube K, containing the transformed compressed set M. At the final stage one can transform the cube K into a parallelepiped P, using the inverse transformation (extension) of the space, and obtain from the ball C an ellipsoid E which approximates the ellipsoid of minimal volume.

For higher dimensions the construction of the confidence ellipses is analogous.

Now, the confidence level of such ellipsoids is equal to $$\frac{n}{n+1}$$

can be shown. Indeed, if the centers of these ellipsoids are fixed, then the random variables $\rho(O, X_i)$ are independent and identically distributed. On the basis of results obtained, the probability of falling out of the values $\rho(O, X_i)$ from the maximal order statistics is equal to $$\frac{1}{n+1}.$$

Hence, the confidence level of this ellipsoid is $$\frac{n}{n+1}.$$

In some embodiments, the patient may be suspected of having a specific, selected malignancy and the sample can be from an associated or nonassociated tissue. For example, the selected malignancy may be breast cancer or fibroadenomatosis. Available tissue indicates tissues that are readily available, such as, for example, buccal epithelium. In another embodiment, the selected malignancy is breast cancer and the nonassociated tissue is buccal epithelium. In another embodiment, the selected malignancy is fibroadenomatosis and the nonassociated tissue is buccal epithelium.

In another aspect, the present invention provides computer-controlled systems comprising a digital imager that provides digital images of a cell and an operably linked controller comprising computer-implemented programming that implements the methods discussed herein. Also provided are the computers or controllers themselves, as well as computer memories containing and implementing the procedures discussed herein and/or containing or implementing the algorithms discussed herein.

Correlation Algorithm for Cytogenetic Method of Breast Cancer Diagnosis

In one aspect, the present invention provides a method for the differential diagnosis of breast cancer and fibroadenomatosis, the method comprising the steps: a) measuring scanograms of interphase nuclei of samples of buccal epithelium obtained from a patient with confirmed breast cancer patient or confirmed fibroadenomatosis; b) measuring scanogram indices; c) constructing a correlation matrix; d) finding numbers $N_{BC}$ and $N_{FAM}$ of falling out beyond the confidence intervals constructed for breast cancer and fibroadenomatosis, wherein BC=breast cancer and FAM=fibroadenomatosis; and e) making a diagnosis regarding the presence or absence of breast cancer or fibroadenomatosis. In one embodiment, the interphase nuclei of the samples are stained with a Feulgen staining method. In another embodiment, the scanogram is from a patient potentially having a selected malignancy wherein the sample is not derived from diseased tissue. In another embodiment, the scanogram is a training scanogram. In another embodiment, the training scanogram is a scanogram obtained from a patient with confirmed breast cancer or confirmed fibroadenomatosis. In another embodiment, wherein the selected malignancy is breast cancer or fibroadenomatosis. In another aspect, the present invention provides a computer-controlled system comprising a digital imager that provides a scanogram of a cell, and an operably linked controller comprising computer-implemented programming implementing a method for the differential diagnosis of breast cancer and fibroadenomatosis, the method comprising the steps: a) measuring scanograms of interphase nuclei of samples of buccal epithelium obtained from a patient with confirmed breast cancer patient or confirmed fibroadenomatosis; b) measuring scanogram indices; c) constructing a correlation matrix; d) finding numbers $N_{BC}$ and $N_{FAM}$ of falling out beyond the confidence intervals constructed for breast cancer and fibroadenomatosis, wherein BC=breast cancer and FAM=fibroadenomatosis; and e) making a diagnosis regarding the presence or absence of breast cancer or fibroadenomatosis. In one embodiment, the interphase nuclei of the sample are stained with a Feulgen staining method. In another embodiment, the scanogram is from a patient potentially having a selected malignancy and the sample is not derived from diseased tissue. In another embodiment, the selected malignancy is breast cancer or fibroadenomatosis. In another embodiment, the scanogram is a training scanogram. In another embodiment, the training scanogram is a scanogram from a patient with confirmed breast cancer or confirmed fibroadenomatosis.

The term "scanogram indexes" as used herein are number characteristics of a scanogram (area, average density, etc.). The term "correlation matrix" as used herein refers to a matrix consisting of pairing coefficients of correlation between ith and jth indexes.

In another aspect, the present invention provides a method of determining quantitative estimates of malignancy associated changes in the cells of buccal epithelium to characterize the influence of a tumor on various organs and tissues of an organism, distant from the tumor. In one embodiment, the present invention provides a cytogenetic method for the differential diagnosis of breast cancer and fibroadenomatosis, the method comprising the steps: a) measuring scanograms of interphase nuclei of buccal epithelium; b) measuring scanogram indices; c) constructing correlation matrix; d) finding numbers $N_{BC}$ and $N_{FAM}$ of falling out beyond the confidence intervals constructed for BC and FAM groups; and e) making a diagnosis regarding the presence or absence of breast cancer or fibroadenomatosis.

In another embodiment, the present invention provides a cytogenetic method for the differential diagnosis of breast cancer and fibroadenomatosis, the method comprising the steps: a) obtaining RGB-images of interphase nuclei of buccal epithelium; b) measuring RGB indices; c) constructing correlation matrix; d) finding numbers $N_{BC}$ and $N_{FAM}$ of falling out beyond the confidence intervals constructed for BC and FAM groups; and e) making a diagnosis regarding the presence or absence of breast cancer or fibroadenomatosis.

In another embodiment, the present invention provides a cytogenetic method for the differential diagnosis of breast cancer and fibroadenomatosis wherein the method employs a recognition algorithm, based on mathematical/statistical analysis of correlation dependencies between the indices of scanograms of interphase nuclei of buccal epithelium.

In another embodiment, statistical relations between the cytospectrophotometric indices of the cells of the mammary gland and the epitheliocytes of buccal epithelium, in the presence of fibroadenomatosis and cancer of the mammary gland are established.

In another embodiment, the indices characterizing the state of chromatin and DNA content in the epithelial cells of a mammary gland are compared.

In another embodiment, the indices for the epitheliocytes of the buccal epithelium among themselves in the presence of the same processes is compared.

In another embodiment, the indices of the cells of the focus with the indices of the cells of the buccal epithelium are compared.

In another embodiment, individual cases of displasia and cancer of the mammary gland are tested.

In another embodiment, a recognition algorithm is formulated using statistical analysis of correlation dependencies between the indices of scanograms of interphase nuclei of buccal epithelium. In some such embodiments, digital images of cytological preparations are obtained and an average value of RGB components is analyzed.

An exemplary aspect of the present invention is described as follows. Women patients suffering from fibroadenoma, fibroadenomatosis, infiltrative lobular cancer, infiltrative ductal cancer, infiltrative ductal-lobular carcinoma, and scirrhus were considered. Smears from various depth of the spinous layer were obtained (conventionally they were denoted as median and deep), after gargling and removing the superficial cell layer of the buccal mucous. The smears were dried under room temperature and fixed for 30 minutes in Nikiforov's mixture. Then, a Feulgen reaction was made with cold hydrolysis in 5 N HCl for 15 minutes, at 21° C. to 22° C. The color brightness of the nuclei was registered by a light microscope, using yellow and violet filters. From 40 to 60 nuclei in each preparation were investigated.

A scanogram of the DNA distribution is a rectangular matrix $$R = \|r_{ij}\|_{i=\overline{1,m}}^{j=\overline{1,n}},$$

where $r_{ij}$ are values of colour brightness in an image of interphase nuclei of the cell expressed in range from 0 to 255. The scanograms obtained as a result of the investigations of the nuclei of the cells were analyzed using statistical methods.

Correlation Algorithm

A recognition algorithm for the diagnosis of breast cancer (BC) and fibroadenomatosis (FAM) was investigated, using statistical analysis of correlation dependencies between the indices of scanograms of interphase nuclei of buccal epithelium.

Digital images of cytological preparations of buccal epithelium were obtained using light microscope Olympus BX41. Then green and red components, and average value of red, green and blue components were analyzed. The photos were obtained in three variants: without optic filter, with orange filter (wave length λ=575) and violet filter (λ=400µ).

The test consisted of several stages. At all stages statistical analysis of the training samples were conducted first. Training samples consisted of 68 women with BC and 33 women with FAM, and control samples consisted of 45 women with BC and 22 women with FAM. Diagnoses of all patients with BC and FAM were verified exactly on the basis of post-operative histological analyses of the ablated tumor. Nuclei of the cells of buccal epithelium were detected automatically using this algorithm. Table 7 shows the morpho/densitometric indices of interphase nuclei of buccal epithelium.

TABLE 7

Morpho/densitometric indices of interphase nuclei of buccal epithelium

1. Nucleus area
2. Minimal brightness of nucleus
3. Maximal brightness of nucleus
4. Average brightness of nucleus
5. Standard deviation of brightness distribution in nucleus
6. Coefficient of skewness of brightness distribution in nucleus
7. Kurtosis of brightness distribution in nucleus
8. Shennon entropy of brightness distribution in nucleus
9. Energy of brightness distribution in nucleus
10. Relative brightness of nucleus
11. Ration "average brightness/nucleus area"
12. Product of relative brightness and area
13. Median of brightness distribution in nucleus
14. Low quartile of brightness distribution in nucleus
15. High quartile of brightness distribution in nucleus
16. 5%-percentile of brightness distribution in nucleus
17. 95%-percentile of brightness distribution in nucleus
18. Coefficient of spatial correlation of brightness distribution in nucleus by Moran
19. Perimeter of nucleus
20. Standard deviation of left part of brightness distribution in nucleus (from minimal brightness to median)
21. Standard deviation of right part of brightness distribution in nucleus (from to median)
22. Ratio of standard deviation of left and right parts of distributions
23. Form factor Area of nucleus was determined by semi-automatic detection. The following statistical parameters of the distribution of brightness levels were computed:

Standard Deviation:

$$\sigma \sqrt{\sum_{i=1}^{n}(x_i - \bar{x})^2 p_i} \quad \text{Equation [4]}$$

Asymmetry:

$$A = \frac{\sum_{i=1}^{n}(x_i - \bar{x})^3 p_i}{\sigma^3} \quad \text{Equation [5]}$$

Excess:

$$E = \frac{\sum_{i=1}^{n}(x_i - \bar{x})^4 p_i}{\sigma^4} - 3 \quad \text{Equation [6]}$$

Entropy:

$$H = -\sum_{i=1}^{n} p_i \ln p_i \quad \text{Equation [7]}$$

Energy:

$$E = \sum_{i=1}^{n} p_i^2. \quad \text{Equation [8]}$$

The coefficient of spatial autocorrelation of image by Moran was computed by the formula $$r = \frac{n \sum_{\substack{i=1 \\ i \neq j}}^{n} \sum_{j=1}^{n} w_{ij}(x_i - \bar{x})(x_j - \bar{x})}{\left(\sum_{i=1}^{n}(x_i - \bar{x})^2\right) \sum_{\substack{i=1 \\ i \neq j}}^{n} \sum_{j=1}^{n} w_{ij}}, \quad \text{Equation [9]}$$

where n is the number of pixels; $x_i$ is brightness of ith pixel; $\bar{x}$ is an average brightness; $w_{ij}$ is the weight that equals to $1/d_{ij}$, $d_{ij}$ is the distance between ith and jth pixels [see Bailey, T. C., Gatrell, A. C. Interactive Spatial Data Analysis. New York: Wiley. 1995. p. 543].

The Form Factor was computed by the formula:

$$F\text{Form} = \text{Perimeter}^2/\text{Square} \quad \text{Equation [10]}$$

Finally, for each patient P, a matrix $AP=(a_{ij})$ consisting of the correlation coefficients between the i-th and j-th indices of a scanogram of the nucleus was constructed. For training samples of BC and FAM the average value of each correlation coefficient was calculated and confidence intervals were determined, using the 3σ-rule and minimal and maximal order statistics.

The recognition algorithm for each correlation coefficient is based on counting the number of "falling out" beyond the confidence intervals, constructed by the 3s-rule and minimal and maximal order statistics, respectively. The obtained values are summed for each patient over all correlation coefficients computed for that patient. The results, denoted by $N_{BC}$ and $N_{FAM}$, are the numbers of "falling out" beyond the confidence intervals for BC and FAM, respectively. If $N_{FAM} > N_{BC}$, then the decision is made that the patient is suffering from BC, otherwise from FAM. If $N_{FAM} = N_{BC}$, then no decision is made. If $N_{BC} > N_{FAM}$, then the decision is that the patient is suffering from FAM, otherwise from BC. If $N_{FAM} = N_{BC}$, then no decision is reached.

The recognition algorithm was applied to different combinations of color components, obtained with and without orange and violet filters. FIG. 1 shows a schematic of the recognition algorithm.

Analysis of the results, obtained using the correlation algorithm, show that for 41 of 45 BC patients the following inequality holds $$N_{BC}^{(1)} \leq N_{FAM}^{(1)},$$

and for 4 BC patients there is $$N_{BC}^{(1)} > N_{FAM}^{(1)}.$$

Also, there are 8 FAM patients for whom $$N_{FAM}^{(2)} < N_{BC}^{(2)}$$

and for 41 of 45 BC-patients the inverse inequality is satisfied.

When considering the following test: patient has FAM if $n_{FAM}^{(2)} < n_{BC}^{(2)}$.

Then from the results obtained above it follows that all BC patients are correctly diagnosed, although there are only 8 of 21 correctly diagnosed FAM patients.

In some embodiments, the patient may be suspected of having a specific, selected malignancy and the sample can be from an associated or nonassociated tissue. For example, the selected malignancy may be breast cancer or fibroadenomatosis. Available tissue indicates tissues that are readily available, such as, for example, buccal epithelium. In another embodiment, the selected malignancy is breast cancer and the nonassociated tissue is buccal epithelium. In another embodiment, the selected malignancy is fibroadenomatosis and the nonassociated tissue is buccal epithelium.

In another aspect, the present invention provides computer-controlled systems comprising a digital imager that provides digital images of a cell and an operably linked controller comprising computer-implemented programming that implements the methods discussed herein. Also provided are the computers or controllers themselves, as well as computer memories containing and implementing the procedures discussed herein and/or containing or implementing the algorithms discussed herein.

Combined Correlation-Proximity Test for Breast Cancer and Fibroadnomatosis

In another aspect, the present invention provides a method for diagnosis of breast cancer and fibroadenomatosis, the method comprising the steps: a) obtaining scanograms from a sample of buccal epithelium from a confirmed breast cancer patient and/or a confirmed fibroadenomatosis patient; b) assigning a green component and a red component for each scanogram; c) finding the center; d) constructing concentric squares; e) computing the average p-statistics between the squares in breast cancer training samples and fibroadenomatosis training samples; f) finding minimal p-statistics and maximal p-statistics, wherein for an investigated scanogram, compute N(P), wherein if N(P)>0, then breast cancer; wherein if N(P)=0, then do not make any decision; wherein if N(P)<0, then fibroadenomatosis; thereby determining a diagnosis for breast cancer or fibroadenomatosis. In one embodiment, the scanogram further comprises a digital image of interphase nuclei from buccal epithelium. In another embodiment, the interphase nuclei is stained with a Feulgen staining method. In another aspect, the present invention provides a computer-controlled system comprising a digital imager that provides a scanogram of a cell, and an operably linked controller comprising computer-implemented programming implementing a method for diagnosis of breast cancer and fibroadenomatosis, the method comprising the steps: a) obtaining scanograms from a sample of buccal epithelium from a confirmed breast cancer patient and/or a confirmed fibroadenomatosis patient; b) assigning a green component and a red component for each scanogram; c) finding the center; d) constructing concentric squares; e) computing the average p-statistics between the squares in breast cancer training samples and fibroadenomatosis training samples; f) finding minimal p-statistics and maximal p-statistics, wherein for an investigated scanogram, compute N(P), wherein if N(P)>0, then breast cancer; wherein if N(P)=0, then do not make any decision; wherein if N(P)<0, then fibroadenomatosis; thereby determining a diagnosis for breast cancer or fibroadenomatosis. In one embodiment, the scanogram further comprises a digital image of interphase nuclei from buccal epithelium. In another embodiment, the interphase nuclei is stained with a Feulgen staining method.

The phrase "find the center" as used herein refers to calculate the numbers $$x^{(k)} = \frac{\sum_{i,j=1,b_{ij}>0}^{160} i}{n_b} \quad k = 1, 2$$

$$y^{(k)} = \frac{\sum_{i,j=1,b_{ij}>0}^{160} j}{n_b} \quad k = 1, 2$$

where $b_{ij}$ is brightness of pixel on intersection of ith row and jth column, $n_b$ is whole number of pixels where brightness is above zero.

The term "concentric squares" as used herein refer to the squares having joint center x(k), y(k). First square has side consisting of 3 pixel and center x(k), y(k). Next square has side consisting of 5 pixels and contain the previous square and so on. The walking around begins from upper left corners of squares.

The term "N(P)" as used herein refers to the difference between number of values that do not belong to their corresponding confidence interval for breast cancer (BC) and number of values that do not belong to their corresponding confidence interval for fibroadenomatosis (FAM). So, if N(P) is negative then patient has (FAM), if N(P) is positive the patient has BC and if N(P)=0 then the diagnosis is unknown.

Figure 6:
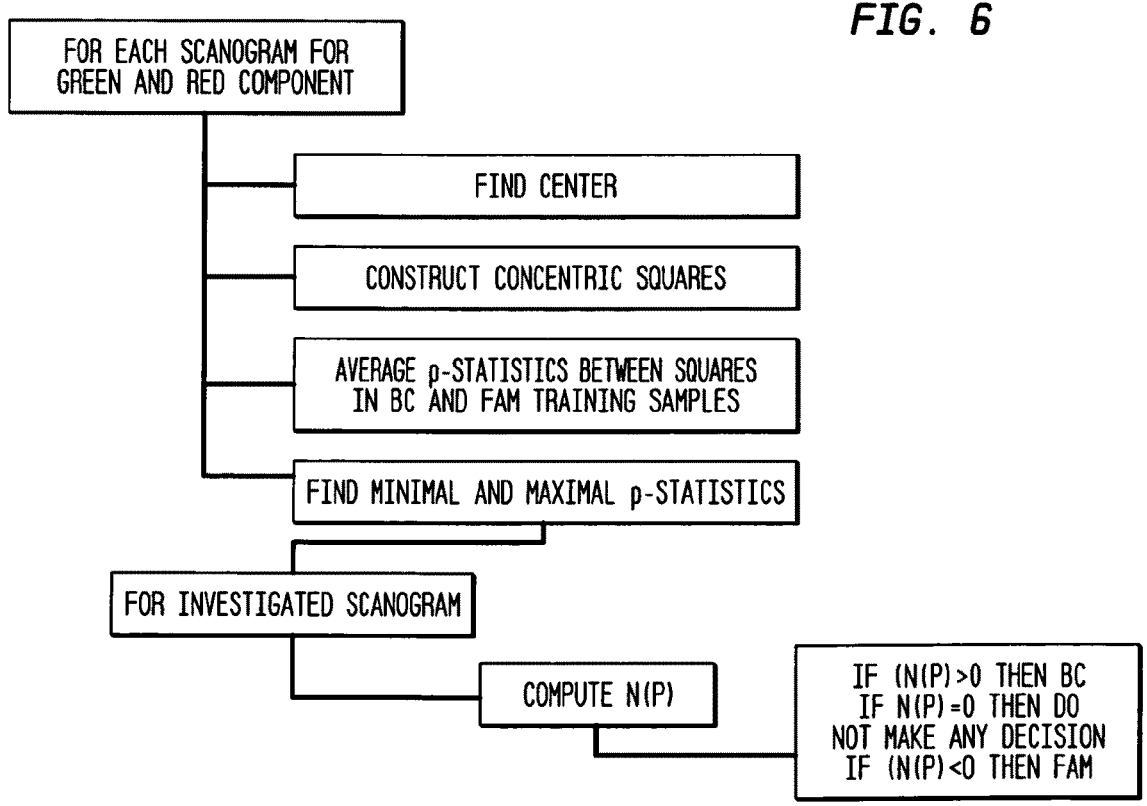
FIG. 6 shows a schematic diagram of the method of direct comparing scanograms and decision rule.

In another aspect, the present invention provides a diagnostic test method for breast cancer and fibroadenomatosis, the method comprising a) obtaining a scanograms from a breast cancer patient and/or a fibroadenomatosis patient; b) assigning a green component and a red component for each scanogram; c) finding the center; d) constructing concentric squares; e) computing the average p-statistics between squares in breast cancer training samples and fibroadenomatosis training samples; f) find minimal p-statistics and maximal p-statistics, wherein for an investigated scanogram, compute N(P), wherein if N(P)>0, then breast cancer; wherein if N(P)=0, then do not make any decision; and wherein if N(P)<0, then fibroadenomatosis, whereby a diagnosis for breast cancer or fibroadenomatosis is determined. FIG. 6 shows a schematic diagram of one embodiment of the present invention of a method of direct comparing scanograms and decision rule.

In another aspect, the present invention provides a diagnostic test for breast cancer and fibroadenomatosis. The test is based on mathematical/statistical analysis of proximity measure and correlation dependencies between the indices of interphase nuclei of buccal epitheliocytes, calculated with respect to their RGB-image after Feulgen staining.

In one embodiment, the present invention provides a diagnostic test for breast cancer and fibroadenomatosis, the test comprising the steps of: a) measuring RGB components of digital images of interphase nuclei of buccal epithelium; b) constructing a correlation matrix; c) obtaining proximity measures by comparing distributions of brightness of the images using p-statistics; d) measuring N(P) indices; e) identifying numbers N(P) as positive, zero, or negative to provide a diagnosis for breast cancer or fibroadenomatosis.

Figure 2:
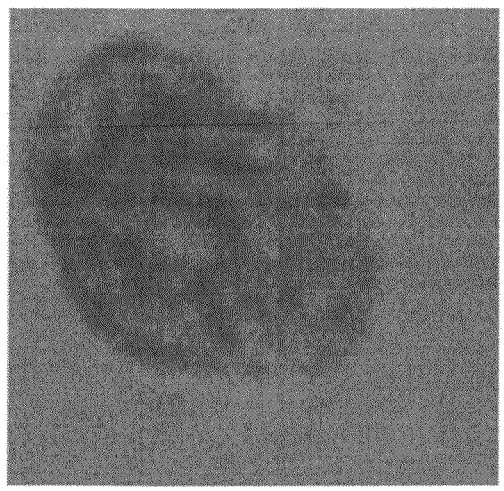
FIG. 2 shows the nuclei of a cell.
Figure 3:
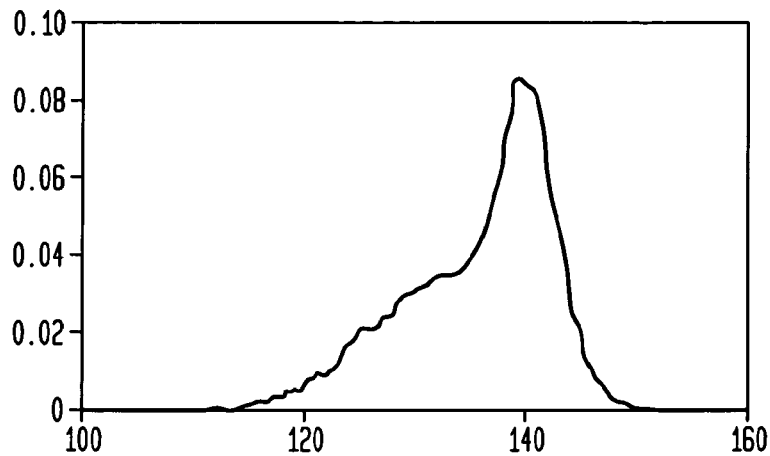
FIG. 3 shows the brightness profile of the cell shown in FIG. 2.

In another embodiment, the present invention provides a method for use in cytogenetical investigations, the method comprising a comparison of the proximity of the graphs of two functions defined on a square [0,1]×[0,1]. For example, consider the graphs which represent the brightness profile of the nuclei of a cell of buccal epithelium (FIG. 2-3); FIG. 2 shows the nuclei of a cell and FIG. 3 shows the brightness profile. In this case, proximity comparison of graphs is useful in the construction of a recognition algorithm for differential diagnosis of benign and cancerous tumors of the mammary gland (see Yu, I., et al., *Automedica.* 19(3-4):135-164. 2001; Andrushkiw, R., et al., *Computer-Aided Cytogenetic Method* of Cancer Diagnosis, Nova Science Publishers, NY. 2007; Klyushin, D. A., et al., *Ann. NY Acad. Sci.* 980: 1-12. 2002).

An exemplary embodiment of the present invention is described as follows. Preparations of cell nuclei of buccal epithelium were analyzed in magnification 10×100 (immersion system) using digital light microscope Olympus BX41, connected with digital photographic camera Olympus C-5050 and computer. Orange ($\lambda$=575µ) and violet ($\lambda$=400µ) filters were used. Digital images were coded with three color components: R (red), G (green) and B (blue). From each patient 40-100 images of the interphase cell nuclei of buccal epithelium were obtained. Each image consists of a matrix containing 160×160 integer numbers. Training samples consisting of 68 women with BC and 33 women with FAM, and control samples containing 45 women with BC and 22 women with FAM were used. Diagnoses of all patients with BC and FAM were verified exactly by post-operative histological analysis of the ablated tumor. Nuclei of buccal epithelium were detected automatically using the algorithm.

To discover "fine" biological effects p-statistics are used to compare the distributions of brightness. Suppose that $x_{(1)} \leq \ldots \leq x_{(n)}$ and $x'_{(1)} \leq \ldots \leq x'_{(m)}$ are variational series on samples $x=(x_1, \ldots, x_n) \in G$ $x'=(x'_1, \ldots, x'_m) \in G'$, respectively. If the order statistics $x_{(k)}$ occur in the variational series more then one time, then $x_{(k)}$ is the atom of the distribution $F_G(u)$. Suppose there are no atoms in the interval $[x_{(i)}, x_{(j)})$, then $$p(A_{ij}) = p(\tilde{x} \in (x_{(i)}, x_{(j)})) = \qquad \text{Equation [11]}$$

$$= p_{ij} = \frac{j-i}{n+1}$$

where $\tilde{x}$ is the next sample value from the general population G which does not depend on the sample $x=(x_1, \ldots, x_n) \in G$. In the case when the half-open interval $[x_{(i)}, x_{(j)})$ contains the atoms, one can represent it in the form of the sum of the adjacent component half-open intervals:

$$[x_{(i)}, x_{(j)}) = [x_{(i)}, x_{(i+1)}) \cup [x_{(i+1)}, x_{(i+2)}) \cup \ldots \cup [x_{(j-1)}, x_{(j)})$$

Suppose that the left end point of some component half-open interval $[x_{(k)}, x_{(k+1)})$ is the atom. Denote by $n_k$ the number of repetitions of $x_k$ in the sample $x=(x_1, \ldots, x_n)$ and let $$\gamma_k = \frac{n_k}{n}.$$

It is readily seen that on the basis of the law of large numbers for sufficiently large n one has:

$$\gamma_k \approx F(x_k+0) - F(x_k-0).$$

In this case the formula [11] is corrected as follows:

$$p(A_{kk+1}) = p(\tilde{x} \in [x_{(k)}, x_{(k+1)})) =$$

$$= p_{kk+1}$$

$$= p(\tilde{x} \in \{x_k\} \cup (x_k, x_{k+1})) =$$

$$= p(\tilde{x} = x_k) + p(\tilde{x} \in (x_k, x_{k+1})) \approx$$

$$\approx \gamma_k + \frac{1}{n+1}$$

Taking into account this correction, there is:

$$p(A_{ij}) = p(\tilde{x} \in (x_{(i)}, x_{(j)})) = p_{ij} =$$

$$= p(\tilde{x} \in [x_{(i)}, x_{(i+1)})) + +$$

$$p(\tilde{x} \in [x_{(i+1)}, x_{(i+2)})) + \ldots + +$$

$$p(\tilde{x} \in [x_{(j-1)}, x_{(j)})),$$

so that $$p_{ij} = \gamma_i + \gamma_{i+1} + \ldots + \gamma_{j-1} + \frac{j-i}{n+1}. \qquad \text{Equation [12]}$$

Note that formula [12] is correct, irrespective of whether the half-open interval $[x_{(i)}, x_{(j)})$ contains any atoms or does not. In the case when there are no atoms in $[x_{(i)}, x_{(j)})$ then $$\gamma_i + \gamma_{i+1} + \ldots + \gamma_{j-1} = 0,$$

and formula [12] reduces to formula [11]

Given a sample $x'=(x'_{(1)}, \ldots, x'_{(m)})$, one can determine the frequency $h_{ij}$ of the random event $A_{ij}$ and the confidence limits $p_{ij}^{(1)}, p_{ij}^{(2)}$ for the probability $p_{ij}$, corresponding to the given significance level $\beta$, such that $1-\beta=p(B)$, where $B=\{p_{ij} \in (p_{ij}^{(1)}, p_{ij}^{(2)})\}$. These limits can be calculated using the formulas:

$$p_{ij}^{(1)} = \frac{h_{ij}m + g^2/2 - g\sqrt{h_{ij}(1-h_{ij})m + g^2/4}}{m+g^2} \qquad (3)$$

$$p_{ij}^{(2)} = \frac{h_{ij}m + g^2/2 + g\sqrt{h_{ij}(1-h_{ij})m + g^2/4}}{m+g^2}$$

where g satisfies the condition $\phi(g) = 1 - \beta/2$ and $\phi(u)$ is the density function of the normal distribution (if m is small, then one can use the "3$\sigma$"-rules with g=3).

Denote by N all confidence intervals $I_{ij} = (p_{ij}^{(1)}, p_{ij}^{(2)})$ (N=n (n-1)/2) and by L the number of those $I_{ij}$ that contain the probability $p_{ij}$.

Let $h = \rho(F^*, F^{*\prime})$ $$= \rho(x, x')$$

$$= \frac{L}{N}.$$

Since h is the frequency of a random event $B = \{p_{ij} \in I_{ij}\}$ having the probability $p(B) = 1 - \beta$, it follows that by setting $h_{ij} = h$, m=N and g=3 in formulas (3) one obtains the confidence interval $I = (p^{(1)}, p^{(2)})$ containing the probability $p(B)$, which has the confidence level 0.95. The test of hypothesis H, with the significance level approximately equal to 0.05, may be formulated in the following way: if the confidence interval $I = (p^{(1)}, p^{(2)})$ contains the probability $p(B) = 1 - \beta$ then the hypothesis H is accepted, otherwise it is rejected. Statistics h is the proximity measure $\rho(x, x')$ between samples x and x'.

Thus, if the first sample contains pixel of the first image and the second sample contains pixel of the second image then p-statistics is a proximity measure between these images. However, the size of such samples varies from 5 to 10 pixels. This complicates computations. However, there is possibility to reduce this difficulty by computing p-statistics on sub-samples and averaging these values. There are several methods to break down the samples. One may use Hilbert scanning.

1. For each image determine the center point $c^{(k)}=(x^{(k)},y^{(k)})$, k=1, 2:

$$x^{(k)} = \frac{\sum_{i,j=1,b_{ij}>0}^{160} i}{n_b} \quad k=1,2$$

$$y^{(k)} = \frac{\sum_{i,j=1,b_{ij}>0}^{160} j}{n_b} \quad k=1,2$$

where $b_{ij}$ is brightness of pixel on the intersection of ith row and jth column, $n_b$ is the total number of pixels where brightness is above zero.

Starting from points $c^{(k)}=(x^{(k)},y^{(k)})$, k=1, 2, begin walking synchronously around the image, along the perimeters of the concentric squares. The first square has a side consisting of 3 pixels and center $c^{(k)}$. The next square has a side consisting of 5 pixels and contains the previous square, and so on. The walk should begin from the upper left corners of the squares.

Each pixel along the way is to be included in the sample. If the brightness of a pixel is equal to zero, the corresponding pixels are omitted. When the size of the samples reaches 100 and 500, one can compute the p-statistics.

The process of walking is finished when one of the images has no more pixels with brightness above zero, or the walk reaches the boundary of the image.

By averaging the p-statistics for all samples obtained along the way, one can obtain the proximity measure.

Correlation-Proximity Test

The combined test has several stages. At each stage the statistical analysis of the training samples is conducted first. Training samples consisting of 68 women with BC and 33 women with FAM, and control samples containing 45 women with BC and 22 women with FAM are used. Diagnoses of each patient was verified exactly on the basis of post-operative histological analysis of ablated tumor. Then, using the training samples one can determine confidence intervals for the bulk of the general population with the help of 3s-rule and minimal and maximal order statistics. The significance level of these confidence intervals was approximately 0.05.

On the first stage one can screen for FAM-patients using 33 BC and 33 FAM training samples containing green component of scanogram, and applying the 3s-rule.

Analysis showed that for 41 of 45 BC patients $n_{BC}^{(1)} \leq n_{FAM}^{(1)}$. There were only 4 BC patients for whom the inequality $n_{BC}^{(1)} > n_{FAM}^{(1)}$ held.

Next an analogous table for FAM patients is constructed. Analysis showed that there are only 8 FAM-patients for which the inequality $n_{FAM}^{(2)} < n_{BC}^{(2)}$ holds and for 41 of 45 BC-patients the inverse inequality is true.

One may propose the following test: patient has FAM if $n_{FAM}^{(2)} < n_{BC}^{(2)}$. Then, there are only 8 of 21 correctly diagnosed FAM-patients but one can correctly diagnose BC in patients omitted on the first stage.

One can obtain additional correctly diagnosed FAM patients using proximity measure. This test is based on the so-called index of belonging $N(P)=N_{BC}-N_{FAM}$ which can be positive, zero or negative.

By testing control samples, using green component without filter when n=500, one can obtain non-positive N(P) for all BC-patients and nonnegative N(P) for 2 FAM patients. So, one may consider these two additional patients correctly diagnosed.

Next, using a violet filter and green component, when n=100, one can correctly diagnose one more FAM patient. Finally, one more FAM patient is diagnosed correctly using yellow filter when n=500, with confidence interval constructed for 33 BC and 33 FAM patients using minimal and maximal intervals. In this case one BC patient is diagnosed incorrectly as a FAM-patient.

Thus, at the first stage one uses an incremental approach, gradually selecting 16 FAM-patients: 8+4+2+1+1 and making 5 incorrect diagnoses for BC patients.

One may denote the group of FAM-patients by ℵ, and the group of BC-patients as ℑ. Let ℜ = ℵ ∪ ℑ. Hereafter, this group is excluded from investigation and the diagnosis of FAM is considered finished.

A purpose of the second stage is to detect BC using proximity measure between scanograms. First, one can analyze statistically the green component of the training and control samples, using yellow filter when n=500. This sample is referred to as the base sample. Here, one can use confidence intervals constructed on the basis of training samples of 33 BC-patients and 33 FAM-patients using minimal and maximal order statistics.

Based on statistical data one may propose the following test of BC: if N(P) of green component, measured via violet filter, has negative value, then patient has BC. If N(P)=0, then one does not make a decision. If N(P)<0 the patient is diagnosed as FAM. This test produces 34 correct diagnoses, 10 fuzzy cases, and 1 error out of 45 patients. However this one error was counted on the first stage and must not be counted twice. On the other hand, for 11 FAM patients N(P)<0. However, 9 of 11 patients belong to ℑ, constructed on the first stage, and one incorrectly diagnoses only two FAM-patients.

The next phase of the second stage of the test involves statistical analysis of the red component which is measured using violet filter, when the length of the spiral is equal to n=500. This sample is additional. One may use confidence intervals constructed on the basis of training samples consisting of 33 BC-patients and 33 FAM-patients, using minimal and maximal order statistics.

One may consider making a diagnosis for BC patients from the base sample whose N(P) equals zero. Clearly, one cannot make any decision using only the base sample. However, since all N(P) indices in other base samples of these patients are negative, one must make a BC diagnosis for these patients. So, there are 5 incorrect diagnosis of BC and the probability of error of the 1$^{st}$ kind is 5/45=0.111≈11%.

Next, one may consider making the diagnosis for FAM patients from the base sample whose N(P) equals zero. Again, one cannot make any decision using only this base sample. However, using additional base samples one may find one correct diagnosis and one for which a decision can not be made.

Thus, using the combined correlation and proximity test the probability of error in the diagnoses of FAM was 3/21≈14% and the probability of error in the diagnosis of BC was 5/45≈11%. In the case of one patient, decision could not be reached.

In some embodiments, the patient may be suspected of having a specific, selected malignancy and the sample can be from an associated or nonassociated tissue. For example, the selected malignancy may be breast cancer or fibroadenomatosis. Available tissue indicates tissues that are readily available, such as, for example, buccal epithelium. In another embodiment, the selected malignancy is breast cancer and the nonassociated tissue is buccal epithelium. In another embodiment, the selected malignancy is fibroadenomatosis and the nonassociated tissue is buccal epithelium.

In another aspect, the present invention provides computer-controlled systems comprising a digital imager that provides digital images of a cell and an operably linked controller comprising computer-implemented programming that implements the methods discussed herein. Also provided are the computers or controllers themselves, as well as computer memories containing and implementing the procedures discussed herein and/or containing or implementing the algorithms discussed herein.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

The invention claimed is:

1. A method for diagnosis of breast cancer and fibroadenomatosis, the method comprising the steps:
    a) obtaining scanograms from a sample of buccal epithelium from a confirmed breast cancer patient and/or a confirmed fibroadenomatosis patient;
    b) assigning a green component and a red component for each scanogram;
    c) finding the center;
    d) constructing concentric squares;
    e) computing the average p-statistics between the squares in breast cancer training samples and fibroadenomatosis training samples;
    f) finding minimal p-statistics and maximal p-statistics, wherein for an investigated scanogram, compute N(P), wherein if N(P)>0, then breast cancer;
    wherein if N(P)=0, then do not make any decision;
    wherein if N(P)<0, then fibroadenomatosis;
    wherein N(P) is the difference between number of values that do not belong to their corresponding confidence interval for breast cancer and number of values that do not belong to their corresponding confidence interval for fibroadenomatosis;
    thereby determining a diagnosis for breast cancer or fibroadenomatosis.

2. The method of claim 1, wherein the scanogram further comprises a digital image of interphase nuclei from buccal epithelium.

3. The method of claim 2, wherein the interphase nuclei is stained with a Feulgen staining method.

4. A computer-controlled system comprising a digital imager that provides a scanogram of a cell, and an operably linked controller comprising computer-implemented programming implementing a method for diagnosis of breast cancer and fibroadenomatosis, the method comprising the steps:
    a) obtaining scanograms from a sample of buccal epithelium from a confirmed breast cancer patient and/or a confirmed fibroadenomatosis patient;
    b) assigning a green component and a red component for each scanogram;
    c) finding the center;
    d) constructing concentric squares;
    e) computing the average p-statistics between the squares in breast cancer training samples and fibroadenomatosis training samples;
    f) finding minimal p-statistics and maximal p-statistics, wherein for an investigated scanogram, compute N(P), wherein if N(P)>0, then breast cancer;
    wherein if N(P)=0, then do not make any decision;
    wherein if N(P)<0, then fibroadenomatosis;
    wherein N(P) is the difference between number of values that do not belong to their corresponding confidence interval for breast cancer and number of values that do not belong to their corresponding confidence interval for fibroadenomatosis;
    thereby determining a diagnosis for breast cancer or fibroadenomatosis.

5. The system of claim 4, wherein the scanogram further comprises a digital image of interphase nuclei from buccal epithelium.

6. The system of claim 5, wherein the interphase nuclei is stained with a Feulgen staining method.

* * * * *